US012509503B2

(12) United States Patent
Ellebedy et al.

(10) Patent No.: US 12,509,503 B2
(45) Date of Patent: Dec. 30, 2025

(54) PAN-NEURAMINIDASE INHIBITING ANTIBODIES

(71) Applicants: Washington University, St. Louis, MO (US); Icahn School of Medicine at Mount Sinai, New York, NY (US); The Scripps Research Institute, La Jolla, CA (US)

(72) Inventors: Ali Ellebedy, St. Louis, MO (US); Florian Krammer, New York, NY (US); Ian Wilson, La Jolla, CA (US)

(73) Assignees: Washington University, St. Louis, MO (US); The Scripps Research Institute, La Jolla, CA (US); Icahn School of Medicine at Mt. Sinai, New York, NY (US)

( * ) Notice: Subject to any disclaimer, the term of this patent is extended or adjusted under 35 U.S.C. 154(b) by 1066 days.

(21) Appl. No.: 17/615,309

(22) PCT Filed: May 29, 2020

(86) PCT No.: PCT/US2020/035323
§ 371 (c)(1),
(2) Date: Nov. 30, 2021

(87) PCT Pub. No.: WO2020/243572
PCT Pub. Date: Dec. 3, 2020

(65) Prior Publication Data
US 2022/0242935 A1    Aug. 4, 2022

Related U.S. Application Data

(60) Provisional application No. 62/855,358, filed on May 31, 2019.

(51) Int. Cl.
| | | |
|---|---|---|
| *C07K 16/00* | (2006.01) | |
| *A61K 39/395* | (2006.01) | |
| *C07K 16/10* | (2006.01) | |
| *C07K 16/40* | (2006.01) | |

(52) U.S. Cl.
CPC ......... *C07K 16/1018* (2013.01); *C07K 16/40* (2013.01); *C07K 2317/34* (2013.01); *C07K 2317/52* (2013.01); *C07K 2317/55* (2013.01); *C07K 2317/565* (2013.01); *C07K 2317/76* (2013.01)

(58) Field of Classification Search
None
See application file for complete search history.

(56) References Cited

U.S. PATENT DOCUMENTS

| | | | |
|---|---|---|---|
| 10,174,127 B2 * | 1/2019 | Bujny | C07K 16/40 |
| 2014/0314754 A1 | 10/2014 | Yusibov et al. | |
| 2014/0335126 A1 | 11/2014 | Haynes et al. | |

FOREIGN PATENT DOCUMENTS

| | | |
|---|---|---|
| JP | 2010503668 A | 2/2010 |
| WO | 2016100807 A2 | 6/2016 |

OTHER PUBLICATIONS

Almagro & Fransson, Frontiers in Bioscience 2008; 13:1619-33 (Year: 2008).*
Rudikoff et al. (Proc Natl Acad Sci USA 1982 vol. 79 p. 1979) (Year: 1979).*
MacCallum et al. J. Mol. Biol. (1996) 262, 732-745 (Year: 1996).*
Pascalis et al. (The Journal of Immunology (2002) 169, 3076-3084) (Year: 2002).*
Casset et al. (BBRC 2003, 307:198-205) (Year: 2003).*
Vajdos et al. (J. Mol. Biol. (2002) 320, 415-428) (Year: 2002).*
Chen et al. (J. Mol. Bio. (1999) 293, 865-881) (Year: 1999).*
Wu et al. (J. Mol. Biol. (1999) 294, 151-162) (Year: 1999).*
Padlan et al. (PNAS 1989, 86:5938-5942) (Year: 1989).*
Lamminmaki et al. (JBC 2001, 276:36687-36694) (Year: 2001).*
Notice of Reasons for Refusal for Japanese Application No. 2021-571517, mailed on May 7, 2024, 11 pages.
Chen Y-Q., et al., "Influenza Infection in Humans Induces Broadly Cross-Reactive and Protective Neuraminidase-Reactive Antibodies" Cell, Elsevier, Apr. 5, 2018, vol. 173, No. 2, pp. 417-429.
Extended European Search Report for European Application No. 20812656.5, mailed on Jan. 24, 2023, 18 pages.
International Preliminary Report on Patentability for International Application No. PCT/US2020/035323, mailed Dec. 9, 2021, 08 Pages.
International Search Report and Written Opinion for International Application No. PCT/US2020/035323, mailed Nov. 18, 2020, 12 Pages.
Partial Supplementary European Search Report for European Application No. 20812656.5, mailed Oct. 24, 2022, 19 Pages.
Wohlbold T.J., et al., "Hemagglutinin Stalk- and Neuraminidase-Specific Monoclonal Antibodies Protect against Lethal H10N8 Influenza Virus Infection in Mice", Journal of Virology, Jan. 15, 2016, vol. 90, No. 2, pp. 851-861, Retrieved from the Internet: URL: https://journals.asm.org/doi/pdf/10.1128/jvi.02275-15.

\* cited by examiner

*Primary Examiner* — Meera Natarajan
(74) *Attorney, Agent, or Firm* — Polsinelli PC

(57) ABSTRACT

The present invention relates to antibodies against influenza neuraminidase, compositions containing the antibodies and methods of using the antibodies.

20 Claims, 27 Drawing Sheets

Specification includes a Sequence Listing.

FIG. 1B

```
                                            CDR-H1
                                  ............................................50
                       ....|....|....|....|....|....|....|....|....|....|
>Inf.UCA    EVQLVESGGGVVRPGGSLRLSCAASGFTFDDYGMSWVRQAPGKGLEWVSG
>1G04H      ........R.........................................F...
>1E01H      ........R.........................................P.....F...
>1G01H      ........RAL...............X....A......V......F...

CDR-H2
            ...........                                         ----100
                       ....|....|....|....|....|....|....|....|....|....|
>Inf.UCA    INWNGSTGYADSVKGRFTISRDNAKNSLYLQMNSLRAEDTALYHCARVR
>1G04H      L.....DI.AFT................S...........D....F.Y....
>1E01H      L.....DI.AFT...............V.S..........D...F.Y....
>1G01H      L.....DI.A.T........V............HI..PKP......Y...TS

CDR-H3
               ...........        170
                       ....|....|....|....|....|....|
>Inf.UCA    TWGEYYTRKEFIRSWYFDLWGRGTLVTVSS
>1G04H      ..............................
>1E01H      ...D...G..I.N.................
>1G01H      S..D..RGP..KIT................

CDR-L1
                                                                    ----50
                       ....|....|....|....|....|....|....|....|....|....|
>Inf.UCA    DIQLTQSPSFLSASVGDRVTITCRASQGISSYLAWYQQKPGKAPKLLIYA
>1G04L      .............................D...F..........N...V...
>1E01L      .............................D...............N........
>1G01L      ...............I.............DG......R.....N......

CDR-L2                                      CDR-L3
                                                                    ----100
                       ....|....|....|....|....|....|....|....|....|....|
>Inf.UCA    ASTLQSGVPSRFSGSGSGTDFTLTISSLQPEDFATYYCQQLNSYPLFTFG
>1G04L      ..L..........D................................
>1E01L      ..L........AF..................N.K..........
>1G01L      ..L........Y..................N.D..........

....|...
>Inf.UCA    PGTKVDIK
>1G04L      ........
>1E01L      ........
>1G01L      ........
```

PAN-NEURAMINIDASE INHIBITING ANTIBODIES

STATEMENT REGARDING FEDERALLY SPONSORED RESEARCH OR DEVELOPMENT

This invention was made with Government support under HHAN272201400008C and U01AI41990 awarded by the National Institutes of Health. The Government has certain rights in the invention.

REFERENCE TO THE SEQUENCE LISTING

This application contains a Sequence Listing that has been submitted in ASCII format via EFS-Web and is hereby incorporated by reference in its entirety. The ASCII copy, created on May 5, 2022, is named Untitled_ST25.txt, and is 24,576 bytes in size.

FIELD OF THE INVENTION

The present invention relates to antibodies or antigen-binding fragments that are selective for neuraminidase of influenza viruses. Notably, the antibodies or antigen-binding fragments are selective for neuraminidases of both Influenza A and Influenza B viruses. Also provided are pharmaceutical compositions and methods of treating influenza using the antibodies or antigen-binding fragments provided herein.

BACKGROUND

Seasonal influenza virus infections cause significant morbidity and mortality every year around the globe. In addition, pandemics occur in irregular intervals and can claim millions of lives. Current seasonal influenza vaccines induce narrow, strain-specific immune responses and have variable effectiveness depending on how well they match circulating strains (1). These vaccines also do not protect against new pandemic viruses. Therefore, there is an urgent need to develop broadly protective or universal influenza virus vaccines (2). Current vaccines are designed to induce antibody responses against the major surface glycoprotein of the virus, the hemagglutinin (HA) (3). Antibodies to HA, specifically to its globular head domain, can block virus binding to its sialic acid receptor, but such activity is often restricted to the vaccine strain and lacks breadth. Antibodies to the HA stalk have been shown to have much greater breadth within and across influenza A groups 1 and 2, and rarely also to influenza B viruses (4-7).

The second major surface glycoprotein of the virus is neuraminidase (NA), which is a receptor destroying enzyme that cleaves terminal sialic acid from N-linked glycans (8). This activity is important for releasing incoming viruses trapped by glycans of natural defense proteins on mucosal surfaces and for releasing of nascent viruses budding from infected cells. Anti-NA antibodies can block this activity by directly binding to the enzymatic site of NA or by sterically hindering interactions between NA and its substrate (9, 10). Anti-NA monoclonal antibodies (mAbs) and NA vaccination have been shown to protect against influenza virus lethal challenge in animal models (9-15). Furthermore, NA vaccination in guinea pigs can prevent virus transmission (16). Most importantly, anti-NA antibody titers have been shown to independently correlate with protection from infection in field studies as well as in human challenge studies (17-19). Human influenza viruses can mutate the dominant antigenic sites in HA at a high rate, due to immune pressure, error rate of the polymerase and the high plasticity of its globular head domain (20). NA, on the other hand, has been shown to exhibit a slower drift that is discordant with that of HA (21, 22). Therefore, antibody responses against NA typically show broader cross-reactivity, but this breadth has been assumed to be limited to the respective subtype (N1-N9 for influenza A viruses) (8).

There is an urgent need for more effective antiviral therapies for influenza.

BRIEF SUMMARY

The present invention relates to an antibody or antigen-binding fragment thereof, comprising a) an immunoglobulin heavy chain variable region comprising an amino acid sequence having at least about 70% identity to SEQ ID NOs: 1, 2, 3, 7, 10, 13, 14, 40, 42 or 44; b) an immunoglobulin light chain variable region comprising an amino acid sequence having at least about 70% identity to any one of SEQ ID NOs: 4, 5, 6, 8, 9, 11, 12, 15, 16, 41, 43, and 45; or c) a combination thereof.

The invention also relates to an antibody or antigen-binding fragment thereof that specifically binds a neuraminidase of an influenza virus, comprising a) an immunoglobulin heavy chain variable region comprising a $CDR_{H1}$ having an amino acid sequence comprising SEQ ID NO: 1 or 13, a $CDR_{H2}$ having an amino acid sequence comprising SEQ ID NO: 2 or 7, a $CDR_{H3}$ having an amino acid sequence comprising SEQ ID NO: 3, 10 or 14 or a combination of any thereof, (b) an immunoglobulin light chain variable region comprising a $CDR_{L1}$ having an amino acid sequence comprising SEQ ID NO: 4, 8, 11 or 15, a $CDR_{L2}$ having an amino acid sequence comprising SEQ ID NO: 5 or 9, a $CDR_{L3}$ having an amino acid sequence comprising SEQ ID NO: 6, 12 or 16, or a combination of any thereof, or (c) a combination thereof.

Also provided are an antibody or antigen-binding fragment that binds a neuraminidase of an influenza virus wherein the antibody or antigen-binding fragment comprises an immunoglobulin heavy chain variable region comprising at least about 70% of SEQ ID NO: 40, 42 or 44.

Further provided is an antibody or antigen-binding fragment that binds a neuraminidase of an influenza virus, wherein the antibody or antigen-binding fragment comprises an immunoglobulin light chain variable region comprising at least about 70% of SEQ ID NO: 41, 43, or 45.

Also provided are an antibody or antigen-binding fragment that that is structurally similar to any of the antibodies or antigen binding fragments described herein.

Also provided are an antibody or antigen binding fragment having specific affinity for an N1 neuraminidase of an influenza virus, and wherein the antibody or antigen binding fragment binds to an active site residue of the N1 neuraminidase comprising at least about 70% of SEQ ID NO: 46 and containing at least one residue selected from R118, E119, L134, D151, R152, R156, W178, I222, R224, E276, E277, R371, and Y406 according to the amino acid numbering of SEQ ID NO: 46.

Further provided are nucleic acids comprising a nucleotide sequence encoding an immunoglobulin light chain variable region and/or an immunoglobulin heavy chain variable region of any antibody or antigen binding fragment provided herein. Also provided are expression vectors comprising the nucleic acids, host cells comprising the expression vectors and methods of producing the antibodies and antigen binding fragments herein.

Also provided are influenza vaccines comprising (a) an antibody or any antigen-binding fragments described herein and/or (b) a polypeptide or a nucleic acid encoding the polypeptide, the polypeptide comprising an amino acid sequence comprising at least about 70% identity to an epitope targeted by any antibody or antigen-binding fragment described herein.

Also disclosed are pharmaceutical compositions comprising any of the antibodies or antigen binding fragments disclosed herein and a pharmaceutically acceptable carrier.

Also provided are methods of preventing or treating influenza in a subject in need thereof, the methods comprising administering any antibody or antigen binding fragment described herein, any nucleic acid comprising a nucleotide sequence encoding at least a portion of an antibody or antigen binding fragment herein, any expression vector described herein, any vaccine described herein, or any composition comprising at least one of the antibodies disclosed herein to the subject.

Other objects and features will be in part apparent and in part pointed out hereinafter.

BRIEF DESCRIPTION OF THE DRAWINGS

FIG. 1B shows alignment of the amino-acid sequences of each mAb to the inferred unmutated common ancestor (UCA).

DETAILED DESCRIPTION

Figure 1A:
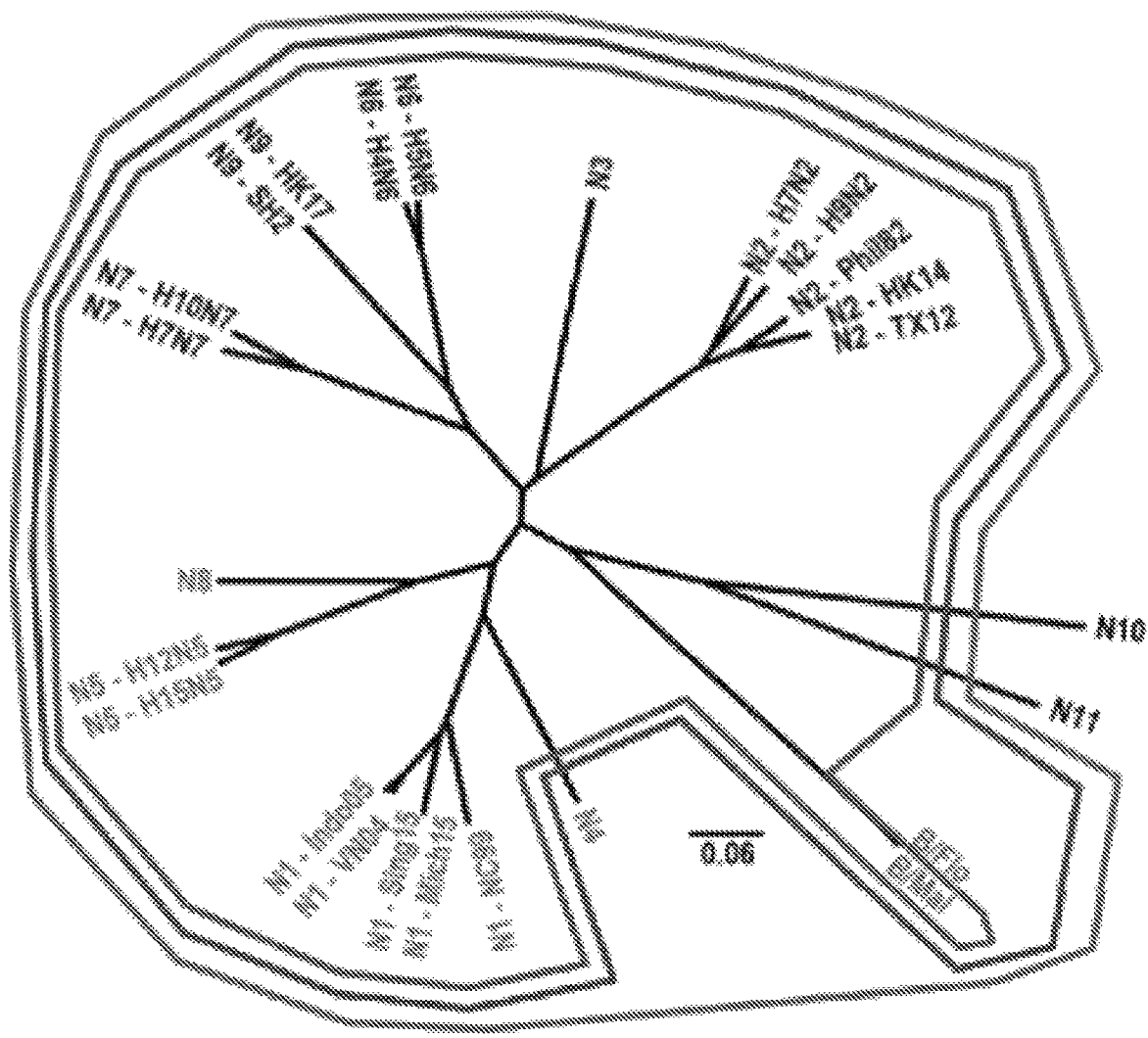
FIG. 1A shows a phylogenetic tree of influenza A and B virus NAs. The reactivity breadth of the three mAbs is indicated. The scale bar represents a 6% change in amino acids. The tree was built using amino acid sequences in ClustalOmega and visualized in FigTree.

The present invention relates to novel antibodies and antigen-binding fragments that show broad specificity to neuraminidases on a variety of influenza viruses. The antibodies and antigen-binding fragments herein advantageously can bind any known neuraminidase (and are not limited by type). In various embodiments, the antibodies and antigen-binding fragments comprise a) an immunoglobulin heavy chain variable region comprising an amino acid sequence having at least about 70% identity to SEQ ID NOs: 1, 2, 3, 7, 10, 13, 14, 40, 42 or 44; b) an immunoglobulin light chain variable region comprising an amino acid sequence having at least about 70% identity to any one of SEQ ID NOs: 4, 5, 6, 8, 9, 11, 12, 15, 16, 41, 43, and 45; or c) a combination thereof. In additional embodiments, the antibodies and antigen-binding fragments can comprise an immunoglobulin heavy chain variable region comprising at least one complementary determining region (CDR) having an amino acid sequence comprising any one of SEQ ID NOs: 1, 2, 3, 7, 10, 13, and 14 and/or an immunoglobulin light chain variable region comprising at least one complementary determining region (CDR) having an amino acid sequence comprising any one of SEQ ID NOs: 4, 5, 6, 8, 9, 11, 12, 15, and 16. In various embodiments, the antibodies and antigen-binding fragments comprise an immunoglobulin heavy chain variable region comprising at least about 70% of SEQ ID NO: 40, 42 or 44. In various embodiments, the antibodies and antigen-binding fragments comprise an immunoglobulin light chain variable region comprising at least about 70% of SEQ ID NO: 41, 43, or 45. Specific light and heavy chains of the antibodies of the present invention are described in more detail herein.

Definitions

As used herein, the term "antigen-binding fragment" means any antigen-binding fragment of an antibody, including an intact antibody or antigen-binding fragment that has been modified, engineered or chemically conjugated. Examples of antibodies that have been modified or engineered are chimeric antibodies, humanized antibodies, and multispecific antibodies (e.g., bispecific antibodies. Antigen-binding fragments include, inter alia, Fab, F(ab'), F(ab')2, Fv, dAb, Fd, complementarity determining region (CDR) fragments, single-chain antibodies (scFv), bivalent single-chain antibodies, single-chain phage antibodies, diabodies, triabodies, tetrabodies, (poly)peptides that contain at least a fragment of an immunoglobulin that is sufficient to confer specific antigen binding to the (poly)peptide, etc.). Regardless of structure, the antigen-binding fragment binds with the same antigen that is recognized by the intact immunoglobulin. An antigen-binding fragment can comprise a peptide or polypeptide comprising an amino acid sequence of at least 2, 5, 10, 15, 20, 25, 30, 35, 40, 50, 60, 70, 80, 90, 100, 125, 150, 175, 200, or 250 contiguous amino acid residues of the amino acid sequence of the binding molecule The above fragments may be produced synthetically or by enzymatic or chemical cleavage of intact immunoglobulins or they may be genetically engineered by recombinant DNA techniques. The methods of production are well known in the art and are described, for example, in Antibodies: A Laboratory Manual, Edited by: E. Harlow and D, Lane (1988), Cold Spring Harbor Laboratory, Cold Spring Harbor, N.Y.

The term "complementarity determining regions" (CDR) as used herein means sequences within the variable regions of antibodies that usually contribute to a large extent to the antigen binding site which is complementary in shape and charge distribution to the epitope recognized on the antigen. The CDR regions can be specific for linear epitopes, discontinuous epitopes, or conformational epitopes of proteins or protein fragments, either as present on the protein in its native conformation or, in some cases, as present on the proteins as denatured, e.g., by solubilization in SDS. Epitopes may also consist of posttranslational modifications of proteins.

"Influenza A virus" as used herein refers to a type of influenza virus that can be further characterized into different "subtypes" that are characterized by various combinations of the hemagglutinin (H) and neuraminidase (N) viral surface proteins. There are 18 different hemagglutinin subtypes and 9 different neuraminidase subtypes (H1 through H18 and N1 through N9) of Influenza A viruses. Influenza A neuraminidases are further divided into subtypes (Group 1 and Group 2). Group 1 contains N1, N4, N5, and N8 and Group 2 contains N2, N3, N6, N7, and N9. According to the present invention influenza A virus subtypes may be referred to by their H number, such as for example "influenza virus comprising HA of the H1 or H5 subtype", or "H1 influenza virus" "H5 influenza virus", or by referring to their N number, such as for example "influenza virus comprising NA of the N1 or N2 subtype", or by a combination of a H number and an N number, such as for example "influenza virus subtype "H5N1 or H3N2". The term influenza virus "subtype" specifically includes all individual influenza virus "strains" within each subtype, which usually result from mutations and show different pathogenic profiles. Such strains may also be referred to as various "isolates" of a viral subtype. Accordingly, as used herein, the terms "strains" and "isolates" may be used interchangeably. The current nomenclature for human influenza virus strains or isolates includes the geographical location of the first isolation, strain number and year of isolation, usually with the antigenic description of HA and NA given in brackets, e.g. A/Moscow/10/00 (H3N2). Non-human strains also include the host of origin in the nomenclature.

"Influenza B virus" as used herein, refers to a second category (type) of influenza virus. Unlike influenza A, influenza B viruses are not divided into subtypes but can be broken down into lineages and strains (e.g., B/Yamagata and B/Victoria). However, influenza B viruses do contain hemagglutinin and neuraminidase proteins which are classified herein as "Type B hemagglutinin" and Type B neuraminidase", respectively.

The term "host", as used herein, is intended to refer to an organism or a cell into which a vector such as a cloning vector or an expression vector has been introduced. The organism or cell can be prokaryotic or eukaryotic. Preferably, the hosts are isolated host cells, e.g. host cells in culture. The term "host cells" merely signifies that the cells are modified for the (over)-expression of the antibodies of the invention and include B-cells that originally express these antibodies and which cells have been modified to over-express the binding molecule by immortalization, amplification, enhancement of expression etc.

Amino acid sequence identity percent (%) is understood as the percentage of nucleotide or amino acid residues that are identical with nucleotide or amino acid residues in a candidate sequence in comparison to a reference sequence when the two sequences are aligned. To determine percent identity, sequences are aligned and if necessary, gaps are introduced to achieve the maximum percent sequence identity. Sequence alignment procedures to determine percent identity are well known to those of skill in the art. Often publicly available computer software such as BLAST, BLAST2, ALIGN2 or Megalign (DNASTAR) software is used to align sequences. Those skilled in the art can determine appropriate parameters for measuring alignment, including any algorithms needed to achieve maximal alignment over the full-length of the sequences being compared. When sequences are aligned, the percent sequence identity of a given sequence A to, with, or against a given sequence B (which can alternatively be phrased as a given sequence A that has or comprises a certain percent sequence identity to, with, or against a given sequence B) can be calculated as: percent sequence identity=(X/Y)*100, where X is the number of residues scored as identical matches by the sequence alignment program's or algorithm's alignment of A and B and Y is the total number of residues in B. If the length of sequence A is not equal to the length of sequence B, the percent sequence identity of A to B will not equal the percent sequence identity of B to A.

The term "operably linked" refers to two or more nucleic acid sequence elements that are usually physically linked and are in a functional relationship with each other. For instance, a promoter is operably linked to a coding sequence, if the promoter is able to initiate or regulate the transcription or expression of a coding sequence, in which case the coding sequence should be understood as being "under the control of" the promoter.

By "pharmaceutically acceptable excipient" is meant any inert substance that is combined with an active molecule such as a drug, agent, or antibody for preparing an agreeable or convenient dosage form. The "pharmaceutically acceptable excipient" is an excipient that is non-toxic to recipients at the used dosages and concentrations, and is compatible with other ingredients of the formulation comprising the drug, agent or binding molecule. Pharmaceutically acceptable excipients are widely applied and known in the art.

The term "specifically binding", as used herein, in reference to the interaction of an antibody, and its binding partner, e.g. an antigen, means that the interaction is dependent upon the presence of a particular structure, e.g. an antigenic determinant or epitope, on the binding partner. In other words, the antibody preferentially binds or recognizes the binding partner even when the binding partner is present in a mixture of other molecules or organisms. The binding may be mediated by covalent or non-covalent interactions or a combination of both. In yet other words, the term "specifically binding" means immunospecifically binding to an antigenic determinant or epitope and not immunospecifically binding to other antigenic determinants or epitopes. An antibody that immunospecifically binds to an antigen may bind to other peptides or polypeptides with lower affinity as determined by, e.g., radioimmunoassays (RIA), enzyme-linked immunosorbent assays (ELISA), BIACORE, or other assays known in the art. Antibodies or fragments thereof that immunospecifically bind to an antigen may be cross-reactive with related antigens, carrying the same epitope. Preferably, antibodies or fragments thereof that immunospecifically bind to an antigen do not cross-react with other antigens.

The term "neutralizing" as used herein in relation to the antibodies of the invention refers to antibodies that inhibit an influenza virus from replication, in vitro and/or in vivo, regardless of the mechanism by which neutralization is achieved, or assay that is used to measure the neutralization activity.

The term "therapeutically effective amount" refers to an amount of the antibodies as defined herein that is effective for preventing, ameliorating and/or treating a condition resulting from infection with an influenza A virus. Amelioration as used in herein may refer to the reduction of visible or perceptible disease symptoms, viremia, or any other measurable manifestation of influenza infection.

The term "treatment" refers to therapeutic treatment as well as prophylactic or preventative measures to cure or halt or at least retard disease progress. Those in need of treatment include those already inflicted with a condition resulting from infection with influenza virus as well as those in which infection with influenza virus is to be prevented. Subjects partially or totally recovered from infection with influenza virus might also be in need of treatment. Prevention encompasses inhibiting or reducing the spread of influenza virus or inhibiting or reducing the onset, development or progression of one or more of the symptoms associated with infection with influenza virus.

The term "vector" denotes a nucleic acid molecule into which a second nucleic acid molecule can be inserted for introduction into a host where it will be replicated, and in some cases expressed. In other words, a vector is capable of transporting a nucleic acid molecule to which it has been linked. Cloning as well as expression vectors are contemplated by the term "vector", as used herein. Vectors include, but are not limited to, plasmids, cosmids, bacterial artificial chromosomes (BAC) and yeast artificial chromosomes (YAC) and vectors derived from bacteriophages or plant or animal (including human) viruses. Vectors comprise an origin of replication recognized by the proposed host and in case of expression vectors, promoter and other regulatory regions recognized by the host. A vector containing a second nucleic acid molecule is introduced into a cell by transformation, transfection, or by making use of viral entry mechanisms. Certain vectors are capable of autonomous replication in a host into which they are introduced (e.g., vectors having a bacterial origin of replication can replicate in bacteria). Other vectors can be integrated into the genome of a host upon introduction into the host, and thereby are replicated along with the host genome.

The term "structurally similar" as it relates to a polypeptide (e.g., an antibody or antigen-binding fragment thereof)

refers to a polypeptide or protein that has one or more conservative substitutions and/or chemical modifications relative to the reference polypeptide but that retains the overall secondary, tertiary and/or quaternary structure of the reference polypeptide or protein. A polypeptide or protein "structurally similar" to another polypeptide or protein would be expected to have similar binding affinity to the reference protein's binding target.

Generally, conservative substitutions can be made at any position so long as the required activity is retained. So-called conservative exchanges can be carried out in which the amino acid which is replaced has a similar property as the original amino acid, for example the exchange of Glu by Asp, Gln by Asn, Val by Ile, Leu by Ile, and Ser by Thr. For example, amino acids with similar properties can be Aliphatic amino acids (e.g., Glycine, Alanine, Valine, Leucine, Isoleucine); Hydroxyl or sulfur/selenium-containing amino acids (e.g., Serine, Cysteine, Selenocysteine, Threonine, Methionine); Cyclic amino acids (e.g., Proline); Aromatic amino acids (e.g., Phenylalanine, Tyrosine, Tryptophan); Basic amino acids (e.g., Histidine, Lysine, Arginine); or Acidic and their Amide (e.g., Aspartate, Glutamate, Asparagine, Glutamine). Deletion is the replacement of an amino acid by a direct bond. Positions for deletions include the termini of a polypeptide and linkages between individual protein domains. Insertions are introductions of amino acids into the polypeptide chain, a direct bond formally being replaced by one or more amino acids. Amino acid sequence can be modulated with the help of art-known computer simulation programs that can produce a polypeptide with, for example, improved activity or altered regulation. On the basis of this artificially generated polypeptide sequences, a corresponding nucleic acid molecule coding for such a modulated polypeptide can be synthesized in-vitro using the specific codon-usage of the desired host cell.

Neuraminidase Specificity and Antibody Properties

The present invention is based on the discovery of highly active heterosubtypic anti-NA antibodies that can inhibit influenza A as well as B virus. Earlier antibody characterization and vaccination studies suggested that, while protection can be very broad within a subtype, immunity to NA is not heterosubtypic (compared to anti-HA stalk antibodies that typically bind across different subtypes) (9-15). Attempts to raise heterosubtypic anti-NA mAbs in rabbits against a conserved, linear peptide yielded mAbs with low NI activity and little protective effect (28, 29). A small number of human anti-NA mAbs have recently been reported that did show some cross-reactive binding but did not have any anti-viral activity in vitro or in vivo (10). In contrast, the inventive monoclonal antibodies reported here are highly active and mediate strong protection in vivo.

Therefore, in various embodiments, the antibody or antigen-binding fragment can selectively bind to a neuraminidase of an influenza virus. The antibodies and antigen binding fragments described herein can have important applications, both for therapeutic and prophylactic treatment of influenza infections.

Therapeutic Use to Manage Acute Infections

Neuraminidase is a validated drug target and several small molecules that inhibit its activity are influenza therapeutics. Like the three mAbs reported here, these small molecules target the active site of the NA. Therefore, and because of the extensive breadth of these mAbs, they could potentially be used as antivirals for treatment of seasonal, pandemic and zoonotic influenza virus infection in humans. While small molecules certainly have advantages, the therapeutic window of these drugs is restricted to 48 hours post-onset of symptoms. In the mouse model, our mAbs showed solid protection when administered as late as 72 hours following a lethal influenza virus challenge, suggesting that they might have a longer therapeutic window. The basis for this effect might be their strong NI activity combined with effector function and potentially modulation of the immune response to infection (30).

Vaccines for Prophylactic Treatment

In addition to the potential of these mAbs to serve as therapeutics, they might also be useful for antibody-guided vaccine design. Currently licensed influenza virus vaccines, including inactivated and live attenuated vaccines, are poor inducers of anti-NA immunity (8). However, recombinant NA-based vaccines as well as NA virus-like particles have been shown to induce high titers of anti-NA antibodies that can broadly protect in lethal mouse and ferret challenge models (13-15). Furthermore, recombinant NA-based vaccines have been shown to inhibit influenza virus transmission in the guinea pig model (16). While broad protection within a subtype was observed in these studies, heterosubtypic immunity was not detected although it was explicitly tested in the mouse model (13). However, sequential prime-boost regimens with recombinant NA vaccines that include different subtypes might result in the induction of 1G01-like antibodies. Furthermore, scaffolded/stabilized constructs that represent the 1G01 epitope might be able to induce similar heterosubtypic antibodies as well. One complication with the development of these vaccines might be that many species that are used as animal models for influenza virus vaccines do not have antibodies with long CDR H3 regions as featured by the three reported mAbs. Therefore, mice with a humanized immunoglobulin locus might be a better model for testing these vaccines.

In summary, three mAbs were synthesized that are clonally related and bind to the influenza virus NA by inserting a long CDR H3 into the enzymatic active site, taking up the space usually occupied by sialic acid. All three mAbs show broad binding with 1G01 inhibiting all influenza A virus NA subtypes and influenza B virus NA, making these mAbs promising candidates for therapeutic development. These antibodies are highly active inhibitors of NA activity in vitro and provide broad protection from mortality and morbidity in vivo. The discovery of these mAbs raises the hope that similar antibodies can be induced in the population if the right vaccination regimen is given. Knowledge about the binding mode and epitope of these mAbs may then guide the development of NA-based universal influenza virus vaccines.

Antibody Structure and Sequences Thereof

The general structure of an IgG antibody is shown in FIG. 5. Briefly, there are two major subunits: the heavy chain and the light chain connected via disulfide bonds. Each heavy chain and light chain is further divided into a variable or a constant region. The variable regions interacts most directly with the antigen and further comprise three hyper variable regions (complementary determining domains, CDRs). Thus, a single antibody comprising 2 heavy chains and 2 light chains comprises a total of 12 CDRs (3 for each heavy chain and each light chain). However, each of the variable regions, particularly the CDRs, possess some degree of affinity for the antigen and maximum affinity can be achieved with a single heavy chain coupled to a single light chain. For this reason, a typical IgG antibody is considered divalent and can potentially target two different antigens simultaneously depending on the identity of the heavy and light chains. The variable region of the antibody (both the heavy and light chains) is collectively known as the Fab fragment and can be cleaved from the constant region (known as the Fc portion) to form an antigen-binding fragment. In addition, as noted each of the CDRs possess some degree of affinity for the antigen, and can each be considered an antigen-binding fragment. An antibody fragment can have an equivalent binding affinity for the target as the parent antibody. Both divalent and monovalent antibody fragments are included in the present invention.

Therefore, in various embodiments, the antibody or antibody binding fragment comprises a heavy chain variable region (or fragment thereof) and/or a light chain variable region (or fragment thereof). The heavy chain variable region comprises three complementary defining regions (CDRs) classified as $CDR_{H1}$, $CDR_{H2}$, and $CDR_{H3}$. Likewise, the light chain variable region comprises three complementarity determining regions (CDRs) classified as $CDR_{L1}$, $CDR_{L2}$, and $CDR_{L3}$. Suitable CDR sequences that may be incorporated in the antibodies and antibody fragments of the present invention are described in Table 1 along with sequences that correspond to a hypothetical "common ancestor" similar to all of them and the antibodies from which they originate. Amino acid substitutions in the sequences relative to the "common ancestor" sequence are identified by bold and underlined letters.

TABLE 1

Illustrative CDR sequences for Anti-NA antibodies

| CDR Name | SEQ ID NO: | Sequence | Origin |
|---|---|---|---|
| $CDR_{H1}$ | SEQ ID NO: 1 | GFTFDDYGM | Common Ancestor<br>mAB 1 (1G04)<br>mAB 2 (1E04) |
|  | SEQ ID NO: 13 | GFKFDDYAM | mAB 3 (1G01) |
| $CDR_{H2}$ | SEQ ID NO: 2 | INWNGGSTG | Common Ancestor<br>mAB 1 (1G04)<br>mAB 2 (1E04) |
|  | SEQ ID NO: 7 | LNWNGDITA |  |
|  |  |  | mAB 3 (1G01) |

TABLE 1-continued

Illustrative CDR sequences for Anti-NA antibodies

| CDR Name | SEQ ID NO: | Sequence | Origin |
|---|---|---|---|
| $CDR_{H3}$ | SEQ ID NO: 3 | TWGEYTTREEPIHSWY | Common Ancestor<br>mAB 1 (1G04) |
|  | SEQ ID NO: 10 | TWGDYTTGEEIINSWY | mAB 2 (1E04) |
|  | SEQ ID NO: 14 | SWGDYTRGPEPKITWY | mAB 3 (1G01) |
| $CDR_{L1}$ | SEQ ID NO: 4 | GISSYL | Common Ancestor |
|  | SEQ ID NO: 8 | DISSFL | mAB 1 (1G04) |
|  | SEQ ID NO: 11 | DISSYL | mAB 2 (1E04) |
|  | SEQ ID NO: 15 | GIDGYL | mAB 3 (1G01) |
| $CDR_{L2}$ | SEQ ID NO: 5 | STL | Common Ancestor |
|  | SEQ ID NO: 9 | SLL | mAB 1 (1G04)<br>mAB 2 (1E04)<br>mAB 3 (1G01) |
| $CDR_{L3}$ | SEQ ID NO: 6 | LNSYPLETF | Common Ancestor<br>mAB 1 (1G04) |
|  | SEQ ID NO: 12 | LKSYPLETF | mAB 2 (1E04) |
|  | SEQ ID NO: 16 | LDSYPLETF | mAB 3 (1G01) |

The CDRs are spaced out along the light and heavy chains and are flanked by four relatively conserved regions known as framework regions (FRs). Thus, the heavy chain variable region comprises four framework regions (FRs) classified as $FR_{H1}$, $FR_{H2}$, $FR_{H3}$, and $FR_{H4}$ and the light chain variable region comprises four framework regions (FRs) classified as $FR_{L1}$, $FR_{L2}$, $FR_{L3}$, and $FR_{L4}$. Representative sequences for the framework regions in the antibodies described herein are shown in Table 2 below. As above, a hypothetical 'common ancestor' is also included and amino acid substitutions relative to the "common ancestor" sequences are shown in bold and underline.

TABLE 2

Illustrative FR sequences for Anti-NA antibodies

| FR Name | SEQ ID NO: | Sequence | Origin |
|---|---|---|---|
| $FR_{H1}$ | SEQ ID NO: 17 | EVQLVESGGGVVRPGGSLRLSCAAS | Common Ancestor |
|  | SEQ ID NO: 25 | EVQLVESGGRVVRPGGSLRLSCAAS | mAB 1 (1G04)<br>mAB 2 (1E04) |
|  | SEQ ID NO: 34 | EVQLVESGGRALRPGGSLRLSCAAS | mAB 3 (1G01) |
| $FR_{H2}$ | SEQ ID NO: 18 | SWVRQAPGKGLEWVSG | Common Ancestor |
|  | SEQ ID NO: 26 | SWVRQAPGKGLEFVSG | mAB 1 (1G04) |
|  | SEQ ID NO: 30 | SWVRQPPGKGLEFVSG | mAB 2 (1E04) |
|  | SEQ ID NO: 35 | SWVRQVPGKGLEFVSG | mAB 3 (1G01) |
| $FR_{H3}$ | SEQ ID NO: 19 | YADSVKGRETISRDNAKNSLYLQMNSLRAEDTALYHCARVR | Common Ancestor |
|  | SEQ ID NO: 27 | FTDSVKGRETISRDNAKSSLYLQMNSLRADDTAFYYCARVR | mAB 1 (1G04) |
|  | SEQ ID NO: 31 | FTDSVKGRETISRDNVKSLYLQMNSLRADDTAFYYCARVR | mAB 2 (1E04) |
|  | SEQ ID NO: 36 | YTDSVKGRETVSRDNAKNSLYLHINSPKPEDTALYYCARTS | mAB 3 (1G01) |
| $FR_{H4}$ | SEQ ID NO: 20 | FDLWGRGTLVTVSS | Common Ancestor<br>mAB 1 (1G04)<br>mAB 2 (1E04)<br>mAB 3 (1G01) |

TABLE 2-continued

Illustrative FR sequences for Anti-NA antibodies

| FR Name | SEQ ID NO: | Sequence | Origin |
|---|---|---|---|
| $FR_{L1}$ | SEQ ID NO: 21 | DIQLTQSPSFLSASVGDRVTITCRASQ | Common Ancestor mAB 1 (1G04) mAB 2 (1E04) |
|  | SEQ ID NO: 37 | DIQLTQSPSFLSASVGDR*I*TITCRASQ | mAB 3 (1G01) |
| $FR_{L2}$ | SEQ ID NO: 22 | AWYQQKPGKAPKLLIYAA | Common Ancestor |
|  | SEQ ID NO: 28 | AWYQQKPGNAPKVLIYAA | mAB 1 (1G04) |
|  | SEQ ID NO: 32 | AWYQQKPGNAPKLLIYAA | mAB 2 (1E04) |
|  | SEQ ID NO: 38 | AWYQQRPGKAPNLLIYAA | mAB 3 (1G01) |
| $FR_{L3}$ | SEQ ID NO: 23 | SGVPSRFSGSGSGTEFTLTISSLQPEDFAT YYCQQ | Common Ancestor |
|  | SEQ ID NO: 29 | SGVPSRFSGSGSGTFFTLTISSLQPEDFAT YYCQQ | mAB 1 (1G04) |
|  | SEQ ID NO: 33 | SGVPSRFSAFGSGTEFTLTISSLQPEDFAT YYCQH | mAB 2 (1E04) |
|  | SEQ ID NO: 39 | SGVPSRFSGSGYGTEFTLTISSLQPEDFAT YYCQH | mAB 3 (1G01) |
| $FR_{L4}$ | SEQ ID NO: 24 | GPGTKVDIK | Common Ancestor mAB 1 (1G04) mAB 2 (1E04) mAB 3 (1G01) |

Any of the $CDR_H$ regions may be combined with one or more of the $FR_H$ sequences described above to form a heavy chain variable region. In various embodiments, suitable heavy chain variable regions can comprise any one of SEQ ID NOs: 40, 42, or 44. Moreover, since many conservative substitutions may be envisioned by one of ordinary skill in the art, the antibody or antibody binding fragment can comprise a heavy chain variable region comprising at least about 70% sequence identity to any one of SEQ ID NOs: 40, 42 and 44. For example, the antibody or antibody binding fragment can comprise a heavy chain variable region comprising at least about 75%, at least about 80%, at least about 85%, at least about 90%, at least about 95%, at least about 96%, at least about 97%, at least about 98%, at least about 99%, at least about 99.5%, or at least about 99.9% sequence identity to any one of SEQ ID NOs: 40, 42 and 44. Likewise, any of the $CDR_L$ regions may be combined with one or more of the $FR_L$ sequences described above to form a light chain variable region. In various embodiments, suitable light chain variable regions can comprise any one of SEQ ID NOs: 41, 43 or 45. Moreover, since many conservative substitutions may be envisioned by one of ordinary skill in the art without affecting the activity of the antibody, the antibody or antibody binding fragment can comprise a light chain variable region comprising at least about 70% sequence identity of any one of SEQ ID NOs: 41, 43 and 45. For example the antibody or antibody binding fragment can comprise a light chain variable region comprising at least about 75%, at least about 80%, at least about 85%, at least about 90%, at least about 95%, at least about 96%, at least about 97%, at least about 9800, at least about 990%, at least about 99.500 or at least about 99.900 sequence identity to any one of SEQ TD NOs: 41, 43 and 45.

For ease of reference, sequences for SEQ TDs 40-45 are described in Table 3 below. In the table, CDR sequences within each chain are underlined and point mutations relative to a "common ancestor" are bold and italicized.

TABLE 3

Illustrative Heavy Chain or Light Chain Variable Regions for Anti-NA Antibodies

| Chain Type | SEQ ID NO: | SEQUENCE |
|---|---|---|
| Heavy Chain Variable Region | SEQ ID NO: 40 | EVQLVESGG*R*VVRPGGSLRLSCAASGFTFDDYGMSWVRQAPGKGLE*F* VSG**LNWNG*DITAFT*DSVKGRETISRDNAKSSLYLQMNSLRADDTAFYY CARVRTWGEYTTREEPIHSWY FDLW**GRGTLVTVSS |
|  | SEQ ID NO: 42 | EVQLVESGG*R*VVRPGGSLRLSCAASGFTFDDYGMSWVRQ*P*PGKGLE*F* VSG**LNWNG*DITAFT*DSVKGRETISRDN*V*KSSLYLQMNSLRADDTAFYY CARVRTWG*DYTT*GEE*IIN*SWYFDLW**GRGTLVTVSS |
|  | SEQ ID NO: 44 | EVQLVESGG*RAL*RPGGSLRLSCAAS**GF*K*FDDYAMSWVRQ*V*PGKGLE*F* VSGLNWNG*DITAYT*DSVKGRET*V*SRDNAKNSLYL*H*****INS*PKP*EDTALY*Y* CAR*TSSWG*DYTR*GPE*PKIT*WYFDLW**GRGTLVTVSS |
| Light Chain variable region | SEQ ID NO: 41 | DIQLTQSPSFLSASVGDRVTITCRASQ**DISS*F*LAWYQQKPG*N*APKVLIY AASLLSGVPSRFSGSGSGT*F*FTLTISSLOPEDFATYYCQQLNSYPLET**FGP GTKVDIK |
|  | SEQ ID NO: 43 | DIQLTQSPSFLSASVGDRVTITCRASQ***DISSY*LAWYQQKPG*N*APKLLIYA ASLLSGVPSRFS*AF*GSGTEFTLTISSLOPEDFATYYCQ*H*LK*SYPLET**FGPG TKVDIK |

TABLE 3-continued

Illustrative Heavy Chain or Light Chain Variable Regions for Anti-NA Antibodies

| Chain Type | SEQ ID NO: | SEQUENCE |
|---|---|---|
| | SEQ ID NO: 45 | DIQLTQSPSFLSASVGDR*ITITCRASQGIDGY*LAWYQQ*R*PGKAP*N*LLIYA AS*LL*SGVPSRFSGSG*YG*TEFTLTISS*LQ*PEDFATYYCQ*HLD*SYPLETFGPG TKVDIK |

As may be envisioned by one of ordinary skill in the art, the various CDR sequences and FR sequences may be combined in various ways to form new antibodies. Specific combinations of the CDR sequences within or exclusive of the full heavy or light chain variable regions of Table 3, are described in more detail below.

In various embodiments, the antibody or antigen-binding fragment thereof comprises a) an immunoglobulin heavy chain variable region comprising an amino acid sequence having at least about 70%, at least about 75%, at least about 80%, at least about 85%, at least about 90%, at least about 95%, at least about 96%, at least about 97%, at least about 98%, at least about 99%, at least about 99.5%, or at least about 99.9% identity to SEQ ID NOs: 1, 2, 3, 7, 10, 13, 14, 40, 42 or 44; b) an immunoglobulin light chain variable region comprising an amino acid sequence having at least about 70%, at least about 75%, at least about 80%, at least about 85%, at least about 90%, at least about 95%, at least about 96%, at least about 97%, at least about 98%, at least about 99%, at least about 99.5% or at least about 99.9% identity to any one of SEQ ID NOs: 4, 5, 6, 8, 9, 11, 12, 15, 16, 41, 43, and 45; or c) a combination thereof.

In various embodiments, the antibody or antigen-binding fragment thereof comprises an immunoglobulin heavy chain comprising a $CDR_{H1}$ having an amino acid sequence comprising SEQ ID NO: 1 or 13, a $CDR_{H2}$ having an amino acid sequence comprising SEQ ID NO: 2 or 7, a $CDR_{H3}$ having an amino acid sequence comprising SEQ ID NO: 3, 10 or 14, or a combination of any thereof.

In further embodiments, the antibody or antigen-binding fragment thereof can comprise an immunoglobulin light chain variable region comprising a $CDR_{L1}$ having an amino acid sequence comprising SEQ ID NO: 4, 8, 11 or 15, a $CDR_{L2}$ having an amino acid sequence comprising SEQ ID NO: 5 or 9, a $CDR_{L3}$ having an amino acid sequence comprising SEQ ID NO: 6, 12 or 16, or a combination of any thereof.

In some embodiments, the antibody or antigen-binding fragment comprises: a) an immunoglobulin heavy chain variable region comprising a $CDR_{H1}$ having an amino acid sequence comprising SEQ ID NO: 1 or 13, a $CDR_{H2}$ having an amino acid sequence comprising SEQ ID NO: 2 or 7, or a $CDR_{H3}$ having an amino acid sequence comprising SEQ ID NO: 3, 10 or 14; and (b) an immunoglobulin light chain variable region comprising a $CDR_{L1}$ having an amino acid sequence comprising SEQ ID NO: 4, 8, 11 or 15, a $CDR_{L2}$ having an amino acid sequence comprising SEQ ID NO: 5 or 9, or a $CDR_{L3}$ having an amino acid sequence comprising SEQ ID NO: 6, 12 or 16.

In some embodiments, the immunoglobulin heavy chain variable region of the antibody or antigen-binding fragment can comprise a $CDR_{H1}$ having an amino acid sequence comprising SEQ ID NO: 1 or 13, a $CDR_{H}2$ having an amino acid sequence comprising SEQ ID NO: 2 or 7, and a $CDR_{H3}$ having an amino acid sequence comprising SEQ ID NO: 3, 10 or 14.

In still further embodiments, the immunoglobulin heavy chain variable region of the antibody or antigen-binding fragment can comprise a $CDR_{H1}$ having an amino acid sequence comprising SEQ ID NO: 1 or 13.

For example, the heavy chain variable region of the antibody or antigen-binding fragment can comprise a $CDR_{H1}$ having an amino acid sequence comprising SEQ ID NO: 1.

For example, the heavy chain variable region of the antibody or antigen-binding fragment can comprise a $CDR_{H1}$ having an amino acid sequence comprising SEQ ID NO: 13.

In further embodiments, the immunoglobulin heavy chain variable region of the antibody or antigen-binding fragment can comprise a $CDR_{H2}$ having an amino acid sequence comprising SEQ ID NO: 7.

In still further embodiments, the immunoglobulin heavy chain variable region of the antibody or antigen-binding fragment can comprise a $CDR_{H3}$ having an amino acid sequence comprising SEQ ID NO: 3, 10 or 14.

For example, the heavy chain variable region of the antibody or antigen-binding fragment can comprise a $CDR_{H3}$ having an amino acid sequence comprising SEQ ID NO: 3.

For example, the heavy chain variable region of the antibody or antigen-binding fragment can comprise a $CDR_{H3}$ having an amino acid sequence comprising SEQ ID NO: 10.

For example, the heavy chain variable region of the antibody or antigen-binding fragment can comprise a $CDR_{H3}$ having an amino acid sequence comprising SEQ ID NO: 14.

For example, the immunoglobulin heavy chain variable region of the antibody or antigen-binding fragment can comprise
  a) a $CDR_{H1}$ having an amino acid sequence comprising SEQ ID NO: 1, a $CDR_{H2}$ having an amino acid sequence comprising SEQ ID NO: 7, and a $CDR_{H3}$ having an amino acid sequence comprising SEQ ID NO: 3 or SEQ ID NO: 10; or
  b) a $CDR_{H1}$ having an amino acid sequence comprising SEQ ID NO: 13, a $CDR_{H2}$ having an amino acid sequence comprising SEQ ID NO: 7, and a $CDR_{H3}$ having an amino acid sequence comprising SEQ ID NO: 14.

In further embodiments, the immunoglobulin light chain variable region of the antibody or antigen-binding fragment can comprise a $CDR_{L1}$ having an amino acid sequence comprising SEQ ID NO: 4, 8, 11 or 15, a $CDR_{L2}$ having an amino acid sequence comprising SEQ ID NO: 5 or 9, and a $CDR_{L3}$ having an amino acid sequence comprising SEQ ID NO: 6, 12 or 16.

In some embodiments, the immunoglobulin light chain variable region of the antibody or antigen-binding fragment can comprise a $CDR_{L1}$ having an amino acid sequence comprising any one of SEQ ID NOs: 8, 11 or 15.

For example, the immunoglobulin light chain variable region of the antibody or antigen-binding fragment can comprise a $CDR_{L1}$ having an amino acid sequence comprising SEQ ID NO: 8.

As another example, the immunoglobulin light chain variable region of the antibody or antigen-binding fragment can comprise a $CDR_{L1}$ having an amino acid sequence comprising SEQ ID NO: 11.

As a further example, the immunoglobulin light chain variable region of the antibody or antigen-binding fragment can comprise a $CDR_{L1}$ having an amino acid sequence comprising SEQ ID NO: 15.

In some embodiments, the immunoglobulin light chain variable region of the antibody or antigen-binding fragment can comprise a $CDR_{L2}$ having an amino acid sequence comprising SEQ ID NO: 9.

In further embodiments, the immunoglobulin light chain variable region of the antibody or antigen-binding fragment can comprise a $CDR_{L3}$ having an amino acid sequence comprising SEQ ID NO: 6, 12 or 16.

For example, immunoglobulin light chain variable region of the antibody or antigen-binding fragment can comprise a $CDR_{L3}$ having an amino acid sequence comprising SEQ ID NO: 6.

For example, the immunoglobulin light chain variable region of the antibody or antigen-binding fragment can comprise a $CDR_{L3}$ having an amino acid sequence comprising SEQ ID NO: 12.

As another example, the immunoglobulin light chain variable region of the antibody or antigen-binding fragment can comprise a $CDR_{L3}$ having an amino acid sequence comprising SEQ ID NO: 16.

For example, in various embodiments, the immunoglobulin light chain variable region of the antibody or antigen-binding fragment can comprise:
  a) a $CDR_{L1}$ having an amino acid sequence comprising SEQ ID NO: 8, a $CDR_{L2}$ having an amino acid sequence comprising SEQ ID NO: 9, and a $CDR_{L3}$ having an amino acid sequence comprising SEQ ID NO: 6; or
  b) a $CDR_{L1}$ having an amino acid sequence comprising SEQ ID NO: 11, a $CDR_{L2}$ having an amino acid sequence comprising SEQ ID NO: 9, and a $CDR_{L3}$ having an amino acid sequence comprising SEQ ID NO: 12; or
  c) a $CDR_{L1}$ having an amino acid sequence comprising SEQ ID NO: 15, a $CDR_{L2}$ having an amino acid sequence comprising SEQ ID NO: 9, and a $CDR_{L3}$ having an amino acid sequence comprising SEQ ID NO: 16.

Accordingly, in various embodiments, the antibody or antigen binding fragment can comprise: (a) an immunoglobulin heavy chain variable region comprising a CDRH1 having an amino acid sequence comprising SEQ ID NO: 1 or 13, a CDRH2 having an amino acid sequence comprising SEQ ID NO: 2 or 7, and a CDRH3 having an amino acid sequence comprising SEQ ID NO: 3, 10 or 14; and (b) an immunoglobulin light chain variable region comprising a CDRL1 having an amino acid sequence comprising SEQ ID NO: 4, 8, 11 or 15, a CDRL2 having an amino acid sequence comprising SEQ ID NO: 5 or 9, and a CDRL3 having an amino acid sequence comprising SEQ ID NO: 6, 12 or 16.

An illustrative antibody of the present invention can comprise a) an immunoglobulin heavy chain variable region comprising a CDRH1 having an amino acid sequence comprising SEQ ID NO: 1, a CDRH2 having an amino acid sequence comprising SEQ ID NO: 7, and a CDRH3 having an amino acid sequence comprising SEQ ID NO: 3; and b) an immunoglobulin light chain variable region comprising a CDRL1 having an amino acid sequence comprising SEQ ID NO: 8, a CDRL2 having an amino acid sequence comprising SEQ ID NO: 9, and a CDRL3 having an amino acid sequence comprising SEQ ID NO: 6.

A second illustrative antibody of the present invention can comprise a) an immunoglobulin heavy chain variable region comprising a CDRH1 having an amino acid sequence comprising SEQ ID NO: 1, a CDRH2 having an amino acid sequence comprising SEQ ID NO: 7, and a CDRH3 having an amino acid sequence comprising SEQ ID NO: 10; and b) an immunoglobulin light chain variable region comprising a CDRL1 having an amino acid sequence comprising SEQ ID NO: 11, a CDRL2 having an amino acid sequence comprising SEQ ID NO: 9, and a CDRL3 having an amino acid sequence comprising SEQ ID NO: 12.

A third illustrative antibody of the present invention can comprise a) an immunoglobulin heavy chain variable region comprising a CDRH1 having an amino acid sequence comprising SEQ ID NO: 13, a CDRH2 having an amino acid sequence comprising SEQ ID NO: 7, and a CDRH3 having an amino acid sequence comprising SEQ ID NO: 14; and b) an immunoglobulin light chain variable region comprising a CDRL1 having an amino acid sequence comprising SEQ ID NO: 15, a CDRL2 having an amino acid sequence comprising SEQ ID NO: 9, and a CDRL3 having an amino acid sequence comprising SEQ ID NO: 16.

In various embodiments, the antibody or antigen-binding fragment thereof comprises an immunoglobulin heavy chain variable region comprising an amino acid sequence having at least about 70%, at least about 75%, at least about 80%, at least about 85%, at least about 90%, at least about 95%, at least about 96%, at least about 97%, at least about 98%, at least about 99%, at least about 99.5%, or at least about 99.9% identity to SEQ ID NOs: 1, 2, 3, 7, 10, 13, 14, 40, 42 or 44. In various embodiments, the antibody or antigen-binding fragment comprises an immunoglobulin heavy chain variable region comprising at least about 70% identity to SEQ ID NO: 40, 42 or 44. For example, in various embodiments, the antibody or antigen-binding fragment can comprise an immunoglobulin heavy chain variable region comprising at least about 75%, at least about 80%, at least about 85%, at least about 90%, at least about 95%, at least about 96%, at least about 97%, at least about 98%, at least about 99% at least about 99.5%, or at least about 99.9% identity to SEQ ID NOs: 40, 42 or 44.

In some embodiments, the immunoglobulin heavy chain variable region comprises at least about 70% identity to SEQ ID NOs: 40, 42 or 44 and further comprises at least one of SEQ ID NO: 1, 3, 7, 10, 13 or 14.

In some embodiments, the immunoglobulin heavy chain variable region comprises at least about 70% identity to SEQ ID NOs: 40, 42 or 44 and further comprises at least one of SEQ ID NO: 1, 3, or 7. For example, the immunoglobulin heavy chain variable region can comprise SEQ ID NO: 1, 3 and 7.

In some embodiments, immunoglobulin heavy chain variable region comprises at least about 70% identity to SEQ ID NO: 40, 42 or 44 and further comprises at least one of SEQ ID NOs: 1, 7 or 10. For example, the immunoglobulin heavy chain variable region can comprise SEQ ID NOs: 1, 7, and 10.

In some embodiments, the immunoglobulin heavy chain variable region comprises at least about 70% identity to SEQ ID NO: 40, 42 or 44 and further comprises at least one of SEQ ID NOs: 7, 13, or 14. For example, the immunoglobulin heavy chain variable region can comprise SEQ ID NOs: 7, 13 and 14.

In some embodiments, the immunoglobulin heavy chain variable region comprises at least about 70% identity to SEQ ID NO: 40, 42 or 44 and further comprises a CDRH1 comprising SEQ ID NO: 1 or 13.

In some embodiments, the immunoglobulin heavy chain variable region comprises at least about 70% identity to SEQ ID NO: 40, 42 or 44 and further comprises a CDRH2 comprising SEQ ID NO: 2 or 7.

In some embodiments, the immunoglobulin heavy chain variable region comprises at least about 70% identity to SEQ ID NO: 40, 42 or 44 and further comprises a CDRH3 comprising SEQ ID NO: 3, 10 or 14.

In various embodiments, the antibody or antigen-binding fragment thereof comprises an immunoglobulin light chain variable region comprising an amino acid sequence having at least about 70%, at least about 75%, at least about 80%, at least about 85%, at least about 90%, at least about 95%, at least about 96%, at least about 97%, at least about 98%, at least about 99%, at least about 99.5%, or at least about 99.9% identity to SEQ ID NOs: 4, 5, 6, 8, 9, 11, 12, 15, 16, 41, 43, or 45. In various embodiments, the antibody or antigen binding fragment can comprise an immunoglobulin light chain variable region comprising at least about 70% identity to any one of SEQ ID NOs: 41, 43, or 45. For example, in various embodiments, the antibody or antigen-binding fragment can comprise an immunoglobulin light chain variable region comprising at least about 75%, at least about 80%, at least about 85%, at least about 90%, or at least about 95%, at least about 96%, at least about 97%, at least about 98%, at least about 99%, at least about 99.5%, or at least about 99.9% of SEQ ID NOs: 41, 43, or 45.

In some embodiments, the immunoglobulin light chain variable region comprises at least about 70% sequence identity to any one of SEQ ID NOs: 41, 43, or 45 and further comprises at least one of SEQ ID NOs: 6, 8, 9, 11, 12, 15, or 16.

In some embodiments, the immunoglobulin light chain variable region comprises at least about 70% sequence identity to any one of SEQ ID NOs: 41, 43, or 45 and further comprises at least one of SEQ ID NO: 6, 8 or 9. For example, the immunoglobulin light chain variable region comprises SEQ ID NO: 6, 8, and 9.

In some embodiments, the immunoglobulin light chain variable region comprises at least about 70% sequence identity to any one of SEQ ID NOs: 41, 43, or 45 and further comprises at least one of SEQ ID NOs: 9, 11, or 12. For example, the immunoglobulin light chain variable region can comprise SEQ ID NOs: 9, 11, and 12.

In some embodiments, the immunoglobulin light chain variable region comprises at least about 70% sequence identity to any one of SEQ ID NOs: 41, 43, or 45 and further comprises at least one of SEQ ID NOs: 9, 15 or 16. For example, the immunoglobulin light chain variable region can comprise SEQ ID NOs: 9, 15 and 16.

In some embodiments, the immunoglobulin light chain variable region comprises at least about 70% sequence identity to any one of SEQ ID NOs: 41, 43, or 45 and further comprises a CDRL1 comprising any one of SEQ ID NO: 4, 8, 11 or 15.

In some embodiments, the immunoglobulin light chain variable region comprises at least about 70% sequence identity to any one of SEQ ID NOs: 41, 43, or 45 and further comprises a CDRL2 comprising SEQ ID NO: 5 or 9.

In some embodiments, the immunoglobulin light chain variable region comprises at least about 70% sequence identity to any one of SEQ ID NOs: 41, 43, or 45 and further comprises a CDRL3 comprising any one of SEQ ID NOs: 6, 12 or 16.

In some embodiments, the antibody or antigen binding fragment can comprise an immunoglobulin heavy chain variable region comprising at least about 70%, at least about 75%, at least about 80%, at least about 85%, at least about 90%, or at least about 95%, at least about 96%, at least about 97%, at least about 98%, at least about 99%, at least about 99.5%, or at least about 99.9% sequence identity to any one of SEQ ID NOs: 40, 42 and 44 and an immunoglobulin light chain variable region comprising at least about 70%, at least about 75%, at least about 80%, at least about 85%, at least about 90%, or at least about 95%, at least about 96%, at least about 97%, at least about 98%, at least about 99%, at least about 99.5%, or at least about 99.9% sequence identity to any one of SEQ ID NOs: 41, 43, and 45.

In some embodiments, the antibody or antibody-binding fragment can comprise an immunoglobulin heavy chain variable region comprising any one of SEQ ID NO: 40, 42 and 44 and an immunoglobulin light chain variable region comprising any one of SEQ ID NO 41, 43 and 45.

For example, in some embodiments the antibody or antibody-binding fragment can comprise an immunoglobulin heavy chain variable region comprising SEQ ID NO: 40 and an immunoglobulin light chain variable region comprising SEQ ID NO 41, 43 and 45.

In some embodiments, the antibody or antibody-binding fragment can comprise an immunoglobulin heavy chain variable region comprising SEQ ID NO: 42 and an immunoglobulin light chain variable region comprising SEQ ID NO 41, 43 and 45.

In further embodiments, the antibody or antibody-binding fragment can comprise an immunoglobulin heavy chain variable region comprising SEQ ID NO: 44 and an immunoglobulin light chain variable region comprising SEQ ID NO 41, 43 and 45.

In other embodiments, the antibody or antibody binding fragment comprises an immunoglobulin heavy chain variable region comprising SEQ ID NO: 40, 42 or 44 and an immunoglobulin light chain variable region comprising SEQ ID NO 41.

In some embodiments, the antibody or antibody binding fragment comprises an immunoglobulin heavy chain variable region comprising SEQ ID NO: 40, 42 or 44 and an immunoglobulin light chain variable region comprising SEQ ID NO 43.

In some embodiments, the antibody or antibody binding fragment comprises an immunoglobulin heavy chain variable region comprising SEQ ID NO: 40, 42 or 44 and an immunoglobulin light chain variable region comprising SEQ ID NO 45.

An illustrative antibody or antibody binding fragment provided herein may comprise an immunoglobulin heavy chain variable region comprising SEQ ID NO: 40 and an immunoglobulin light chain variable region comprising SEQ ID NO: 41.

A second illustrative antibody or antibody binding fragment provided herein may comprise an immunoglobulin heavy chain variable region comprising SEQ ID NO: 42 and an immunoglobulin light chain variable region comprising SEQ ID NO: 43.

A third illustrative antibody or antibody binding fragment provided herein may comprise an immunoglobulin heavy chain variable region comprising SEQ ID NO: 44 and an immunoglobulin light chain variable region comprising SEQ ID NO: 45.

Derivatives and Synthetically Synthesized Antibodies or Binding Moieties.

Also provided are peptides, polypeptides and/or proteins derived from any of the antibodies or antibody binding fragments described herein. Generally, as used herein, the derivatives provided here are substantially similar to the antibodies or antibody binding fragments described herein. For example, they may contain one or more conservative substitutions in their amino acid sequences or may contain a chemical modification. The derivatives and modified peptides/polypeptides/proteins all are considered "structurally similar" which means they retain the structure of the parent molecule and are expected to interact with the antigen in the same way as the parent molecule.

A class of synthetically derived antibodies or antigen-binding moieties can be generated by conservatively mutating resides on the parent molecule to generate a peptide, polypeptide or protein maintaining the same activity as the parent molecule. Representative conservative substitutions are known in the art and are also summarized here.

Generally, conservative substitutions can be made at any position so long as the required activity is retained. So-called conservative exchanges can be carried out in which the amino acid which is replaced has a similar property as the original amino acid, for example the exchange of Glu by Asp, Gln by Asn, Val by Ile, Leu by Ile, and Ser by Thr. For example, amino acids with similar properties can be Aliphatic amino acids (e.g., Glycine, Alanine, Valine, Leucine, Isoleucine); Hydroxyl or sulfur/selenium-containing amino acids (e.g., Serine, Cysteine, Selenocysteine, Threonine, Methionine); Cyclic amino acids (e.g., Proline); Aromatic amino acids (e.g., Phenylalanine, Tyrosine, Tryptophan); Basic amino acids (e.g., Histidine, Lysine, Arginine); or Acidic and their Amide (e.g., Aspartate, Glutamate, Asparagine, Glutamine). Deletion is the replacement of an amino acid by a direct bond. Positions for deletions include the termini of a polypeptide and linkages between individual protein domains. Insertions are introductions of amino acids into the polypeptide chain, a direct bond formally being replaced by one or more amino acids. Amino acid sequence can be modulated with the help of art-known computer simulation programs that can produce a polypeptide with, for example, improved activity or altered regulation. On the basis of this artificially generated polypeptide sequences, a corresponding nucleic acid molecule coding for such a modulated polypeptide can be synthesized in-vitro using the specific codon-usage of the desired host cell A second way to generate a functional peptide/polypeptide or protein based on the sequences provided herein is through the use of computational, "in-silico" design. For example, computationally designed antibodies or antigen-binding fragments may be designed using standard methods of the art. For example, see Strauch E M et al., (Nat Biotechnol. 2017 July; 35(7):667-671), Fleishman S J et al., (Science. 2011 May 13; 332(6031):816-21), and Koday M T et al., (PLoS Pathog. 2016 Feb. 4; 12(2):e1005409), each incorporated by reference in their entirety.

In various embodiments, an antibody or antibody binding fragment thereof is provided that is structurally similar to any of the antibodies described herein. For example, the antibody or antigen binding fragment can be structurally similar to a single CDR loop. For example, the antibody or antigen binding fragment can be structurally similar to a $CDR_{H3}$ loop, e.g., a loop comprising SEQ ID NOs: 3, 10, 14 or any combination thereof.

Also provided are antibodies or antigen-binding fragments that comprise a polypeptide that has a tertiary structure that is structurally similar to a polypeptide having an amino acid sequence of any one of SEQ ID NOs: 1 to 45. Specifically, the polypeptide may have a tertiary structure that is structurally similar to a single $CDR_{H3}$ loop comprising any one of SEQ ID NOs: 3, 10, and 14.

Binding and Function of the Antibodies and Antigen-Binding Fragments

The antibodies and antigen binding fragments thereof described herein can bind to an influenza virus. In various embodiments, the antibody or antigen binding fragment can bind to a neuraminidase of an influenza virus. In various embodiments, the neuraminidase is an influenza type A neuraminidase. In various embodiments, the neuraminidase is any one of N1 to N9 type neuraminidases. As described above, type A influenza viruses are classified based on their hemagglutinin and neuraminidases. Therefore, in various embodiments, the antibody or antigen binding fragment has a binding affinity for a neuraminidase expressed by an HXN1, HXN2, HXN3, HXN4, HXN5, HXN6, HXN7, HXN8, or HXN9 where "X" is any integer between 1 and 18. In various embodiments, the neuraminidase is a Type B neuraminidase. An advantage of the present invention is the general affinity these antibodies and/or antigen binding fragment have to all neuraminidases (i.e., they are not selective only to type A neuraminidases at the exclusion of Type B). In various embodiments, the neuraminidase may be expressed on the surface of the influenza virus. Further, the antibodies and antigen binding fragments herein may have a certain affinity for a specific epitope on the neuraminidase. The epitope may comprise, for example, an active site of an N1 neuraminidase, such as provided herein as SEQ ID NO: 46.

In various embodiments, the antibody or antigen binding fragment interacts with at least one active site residue of the neuraminidase. For example, the antibody or antigen binding fragment can interact with at least one active site residue of an N1 residue. A representative amino acid sequence (SEQ ID NO: 46) of an active site of the N1 neuraminidase (CA04N1) is shown in the table below.

```
N1 Neuraminidase Sequence CA04N1
Strain: A/California/04/2009
                                    SEQ ID NO: 46
MNPNQKIITIGSVCMTIGMANLILQIGNIISIWISHSIQLG

NQNQIETCNQSVITYENNTWVNQTYVNISNTNFAAGQS

VVSVKLAGNSSLCPVSGWAIYSKDNSVRIGSKGDVFVI

REPFISCSPLECRTFFLTQGALLNDKHSNGTIKDRSPYRT

LMSCPIGEVPSPYNSRFESVAWSASACHDGINWLTIGIS

GPDNGAVAVLKYNGIITDTIKSWRNNILRTQESECACV

NGSCFTVMTDGPSNGQASYKIFRIEKGKIVKSVEMNAP

NYHYEECSCYPDSSEITCVCRDNWHGSNRPWVSFNQNL

EYQIGYICSGIFGDNPRPNDKTGSCGPVSSNGANGVKGF
```

-continued

```
SFKYGNGVWIGRTKSISSRNGFEMIWDPNGWTGTDNNF

SIKQDIVGINEWSGYSGSFVQHPELTGLDCIRPCFWVELI

RGRPKENTIWTSGSSISFCGVNSDTVGWSWPDGAELPFT

IDK*
```

In various embodiments, the antibody or antibody binding fragment described herein can interact with one or more residue selected from the group consisting of: R118, E119, D151, R152, I222, R224, E276, E277, R371, and Y406 according to the amino acid numbering of SEQ ID NO: 46. Preferably, when the antibody or antibody-binding fragment interacts with one or more of these residues, it comprises a $CDR_{H3}$ region comprising SEQ ID NO: 3.

In various embodiments, the antibody or antibody binding fragment described herein can interact with one or more residue selected from the group consisting of: R118, E119, D151, R152, I222, R224, E277, R371, and Y406 according to the amino acid numbering of SEQ ID NO: 46. Preferably, when the antibody or antibody-binding fragment interacts with one or more of these residues, it comprises a $CDR_{H3}$ region comprising SEQ ID NO: 10.

In various embodiments, the antibody or antibody binding fragment described herein can interact with one or more residue selected from the group consisting of: R118, E119, L134, D151, R152, R156, W178, I222, R224, E276, E277, R371, and Y406 according to the amino acid numbering of SEQ ID NO: 46. Preferably when the antibody or antibody-binding fragment interacts with one or more of these residues it comprises a $CDR_{H3}$ region of SEQ ID NO: 14.

Therefore an antibody or antigen-binding fragment having specific affinity for an N1 neuraminidase of an influenza virus is provided, wherein the antibody or antigen binding fragment binds to an active site residue of the N1 neuraminidase comprising at least about 70% of SEQ ID NO: 46 and containing at least one residue selected from R118, E119, L134, D151, R152, R156, W178, I222, R224, E276, E277, R371, and Y406 according to the amino acid numbering of SEQ ID NO: 46.

The binding of the antibody or antigen-binding fragment can neutralize or inhibit the ability of the neuraminidase to do its normal function which is to cleave sialic acid receptors to facilitate the release of viral particles from infected cells. In various embodiments, the antibodies and/or binding fragment inhibit the function of the neuraminidase to cleave its substrate with an IC50 of about 0.0001 μg/ml to about 30 μg/ml. For example, the antibody or antigen-binding fragment can have an IC50 of about 0.001 μg/ml to about 30 μg/ml. The inhibitory function of the antibody or antigen binding fragment can be determined by measuring, for example, the ability of the neuraminidase to cleave its substrate (sialic acid) in the presence or absence of the antibody or antigen-binding fragment.

Humanized, Monoclonal and IgG Antibodies

In various embodiments, the antibody or antigen binding fragment described herein is humanized. "Humanized" antibodies are generally chimeric or mutant monoclonal antibodies from mouse, rat, hamster, rabbit or other species, bearing human constant and/or variable region domains or specific changes. Techniques for generating a so-called "humanized" antibody are well known to those of skill in the art.

In various embodiments, the antibody or antigen binding fragment described herein is a monoclonal antibody. As used herein, the term "monoclonal antibodies" refer to antibodies or antigen binding fragments that bind to the same epitope of an antigen.

In various embodiments, the antibody or antigen binding fragment described herein is an IgG type antibody.

In various embodiments, the antibody or antigen binding fragment comprises a hinge region or Fc region that contains at least one amino acid substitution, deletion, or insertion relative to the sequence of a wild-type hinge region or a wild-type Fc region. For example, in some embodiments, the antibody or antigen bind fragment comprises an Fc region that contains at least one amino acid substitution, deletion, or insertion relative to the sequence of a wild-type Fc region. In various embodiments, the substitution, deletion, or insertion prevents or reduces recycling of the antibody or antigen-binding fragment.

In various embodiments, the antibody or antigen binding fragment comprises a heavy chain variable region and/or a light chain variable region having an amino acid sequence comprising at least one amino acid substitution, insertion, or deletion as compared to any of SEQ ID NOs: 40-46.

Antibody Production

Methods for producing antibodies of the invention are known in the art. For example, DNA molecules encoding light chain variable regions and/or heavy chain variable regions can be chemically synthesized. Synthetic DNA molecules can be ligated to other appropriate nucleotide sequences, including, e.g., constant region coding sequences, and expression control sequences, to produce conventional gene expression constructs encoding the desired antibody. Production of defined gene constructs is within routine skill in the art.

Nucleic acids encoding desired antibodies can be incorporated (ligated) into expression vectors, which can be introduced into host cells through conventional transfection or transformation techniques. Illustrative host cells are *E. coli* cells, Chinese hamster ovary (CHO) cells, HeLa cells, baby hamster kidney (BHK) cells, monkey kidney cells (COS), human hepatocellular carcinoma cells (e.g., Hep G2), and myeloma cells that do not otherwise produce IgG protein. Transformed host cells can be grown under conditions that permit the host cells to express the genes that encode the immunoglobulin light and/or heavy chain variable regions.

Specific expression and purification conditions will vary depending upon the expression system employed. For example, if a gene is to be expressed in *E. coli*, it is first cloned into an expression vector by positioning the engineered gene downstream from a suitable bacterial promoter, e.g., Trp or Tac, and a prokaryotic signal sequence. The expressed secreted protein accumulates in refractile or inclusion bodies, and can be harvested after disruption of the cells by French press or sonication. The refractile bodies then are solubilized, and the proteins refolded and cleaved by methods known in the art.

If the engineered gene is to be expressed in eukaryotic host cells, e.g., CHO cells, it is first inserted into an expression vector containing a suitable eukaryotic promoter, a secretion signal, a poly A sequence, and a stop codon, and, optionally, may contain enhancers, and various introns. This expression vector optionally contains sequences encoding all or part of a constant region, enabling an entire, or a part of, a heavy or light chain to be expressed. The gene construct can be introduced into eukaryotic host cells using conventional techniques. The host cells express VL or VH fragments, VL-VH heterodimers, VH-VL or VL-VH single chain polypeptides, complete heavy or light immunoglobulin chains, or portions thereof, each of which may be attached to a moiety having another function (e.g., cytotoxicity). In some embodiments, a host cell is transfected with a single vector expressing a polypeptide expressing an entire, or part of, a heavy chain (e.g., a heavy chain variable region) or a light chain (e.g., a light chain variable region). In other embodiments, a host cell is transfected with a single vector encoding (a) a polypeptide comprising a heavy chain variable region and a polypeptide comprising a light chain variable region, or (b) an entire immunoglobulin heavy chain and an entire immunoglobulin light chain. In still other embodiments, a host cell is co-transfected with more than one expression vector (e.g., one expression vector encoding a polypeptide comprising an entire, or part of, a heavy chain or heavy chain variable region, and another expression vector encoding a polypeptide comprising an entire, or part of, a light chain or light chain variable region).

A polypeptide comprising an immunoglobulin heavy chain variable region or light chain variable region can be produced by growing (culturing) a host cell transfected with an expression vector encoding such variable region, under conditions that permit expression of the polypeptide. Following expression, the polypeptide can be harvested and purified or isolated using techniques known in the art, e.g., using affinity tags such as glutathione-S-transferase (GST) and histidine tags.

A monoclonal antibody that binds a neuraminidase protein, or an antigen-binding fragment of the antibody, can be produced by growing (culturing) a host cell transfected with: (a) an expression vector that encodes a complete or partial immunoglobulin heavy chain, and a separate expression vector that encodes a complete or partial immunoglobulin light chain; or (b) a single expression vector that encodes both chains (e.g., complete or partial heavy and light chains), under conditions that permit expression of both chains. The intact antibody (or antigen-binding fragment of the antibody) can be harvested and purified or isolated using techniques known in the art, e.g., Protein A, Protein G, affinity tags such as glutathione-S-transferase (GST) and histidine tags. It is within ordinary skill in the art to express the heavy chain and the light chain from a single expression vector or from two separate expression vectors.

Therefore, in various embodiments, a nucleic acid is provided, the nucleic acid comprising a nucleotide sequence encoding the antibody or antigen-binding fragment described herein. The skilled man will appreciate that functional variants of these nucleic acid molecules are also intended to be a part of the present invention. Functional variants are nucleic acid sequences that can be directly translated, using the standard genetic code, to provide an amino acid sequence identical to that translated from the parental nucleic acid molecules.

The nucleic acid can comprise, for example, a nucleotide sequence comprising any one of SEQ ID NOs: 47-52 as described in the following Table.

| Name (SEQ ID NO:) | Sequence |
|---|---|
| 1G01_H<br>*Homo sapiens* [clone = 1G01H]<br>Human heavy chain clone 1G01<br>immunoglobulin variable region,<br>mRNA. partial CDS<br>(SEQ ID NO: 47) | gaggtgcagctggtggagtctggggg<br>acgtgcgctacggcctgggggtccct<br>gagactctcctgtgcagcctctggatt<br>caagtttgatgattatgccatgagctg<br>ggtccgccaggttccagggaagggac<br>tggagtttgtctctggtcttaattgga<br>atggtgacatcacagcttatacagact<br>ctgtgaagggccgattcactgtctcca<br>gagacaacgccaagaactccctgtatc<br>tgcacatcaacagtccgaagcccgag<br>gacacggccctctattattgtgcgaga<br>actagctcatggggcgattatacaaga<br>gggcctgagccaaagattacctggtac<br>ttcgatctctggggccggggcactctg<br>gtcaccgtctcctcag |
| 1G04_H<br>*H. sapiens* [clone = 1G04H]<br>Human heavy chain clone 1G04<br>immunoglobulin variable region,<br>mRNA. partial CDS<br>(SEQ ID NO: 48) | gaggtgcagctggtggagtctggggg<br>acgtgtggtacggccgggggatccct<br>gcgactctcctgtgcagcctctggatt<br>cacctttgatgactatggcatgagctg<br>ggtccgccaagctccagggaaggggc<br>tggaatttgtctctggtcttaactgga<br>atggagatatcacagctttcacagact<br>ctgtgaagggccgattcaccatctcca<br>gagacaacgccaagagctccctgtatc<br>tgcaaatgaacagtctgagagccgac<br>gacacggccttctattactgtgcgaga<br>gtgcggacgtggggcgagtatacaac<br>aagagaggagccaattcacagctggt<br>acttcgatctctggggccgtggcaccc<br>tggtcaccgtctcctcag |
| 1E01_H<br>*H. sapiens* [clone = 1E01H]<br>Human heavy chain clone 1E01<br>immunoglobulin variable region,<br>mRNA. partial CDS<br>(SEQ ID NO: 49) | gaggtgcagctggtggagtctggggg<br>acgtgtggtacggccgggggggtccct<br>gagactctcctgtgccgcctctggatt<br>cacgtttgatgattatggcatgagttg<br>ggtacgccaacctccagggaaggggc<br>tggagtttgtctctggtcttaactgga<br>atggagatatcacagcttttacagact<br>ctgtgaagggccgattcaccatctcca<br>gagacaacgtcaagagttccctgtatt<br>tgcaaatgaacagtctgagagccgac<br>gacacggccttctattactgtgcgaga |

-continued

| Name (SEQ ID NO:) | Sequence |
|---|---|
| | gtacggacatggggcgactatacaac<br>aggagaggagataatcaacagctggt<br>acttcgatctctggggccgtggcaccc<br>tggtcaccgtctcctcag |
| 1E01_L<br>H. sapiens [clone = 1E01L]<br>Human Light chain clone 1E01<br>immunoglobulin variable region,<br>mRNA, partial CDS<br>(SEQ ID NO: 50) | GACATCCAGTTGACCCAGTCTCCATCC<br>TTCCTGTCTGCATCTGTAGGAGACAGA<br>GTCACCATCACTTGCCGGGCCAGTCAG<br>GACATTAGCAGCTATTTAGCCTGGTAT<br>CAGCAAAAACCAGGGAATGCCCCTAA<br>GCTCCTGATCTATGCTGCATCCCTTTTG<br>CAAAGTGGGGTCCCATCAAGGTTCAGC<br>GCCTTTGGATCTGGGACAGAATTCACT<br>CTCACAATCAGCAGCCTGCAGCCTGAA<br>GATTTTGCAACTTATTACTGTCAACAC<br>CTTAAGAGTTACCCCCTGTTCACTTTC<br>GGCCCTGGGACCAAAGTGGATATCAA<br>AC |
| 1G01_L<br>H. sapiens [clone = 1G01L]<br>Human Light chain clone 1G01<br>immunoglobulin variable region,<br>mRNA, partial CDS<br>(SEQ ID NO: 51) | GACATCCAGTTGACCCAGTCTCCATCC<br>TTCCTGTCTGCATCTGTTGGAGACAGA<br>ATAACCATCACTTGCCGGGCCAGTCAG<br>GGCATTGATGGTTATTTAGCCTGGTAT<br>CAGCAAAGACCAGGGAAAGCCCCTAA<br>CCTCCTGATCTATGCTGCATCCCTTTTG<br>CAAAGTGGGGTCCCATCAAGGTTCAGC<br>GGCAGTGGATATGGGACAGAATTCAC<br>TCTCACAATCAGCAGCCTGCAGCCTGA<br>GGACTTTGCAACTTATTACTGTCAACA<br>TCTTGACAGTTACCCCCTGTTCACTTTC<br>GGCCCTGGGACCAAAGTGGATATCAA<br>AC |
| 1G04_L<br>H. sapiens [clone = 1G04L]<br>Human Light chain clone 1G04<br>immunoglobulin variable region,<br>mRNA, partial CDS<br>(SEQ ID NO: 52) | GACATCCAGTTGACCCAGTCTCCATCC<br>TTCCTGTCTGCATCTGTAGGAGACAGA<br>GTCACCATCACTTGCCGGGCCAGTCAG<br>GACATTAGCAGTTTTTAGCCTGGTAT<br>CAGCAAAAACCAGGGAATGCCCCTAA<br>GGTCCTGATCTATGCTGCGTCCCTTTTG<br>CAGAGTGGGGTCCCATCAAGGTTCAGC<br>GGCAGTGGATCTGGGACAGATTTCACT<br>CTCACAATCAGCAGCCTGCAACCTGAA<br>GATTTCGCAACTTATTACTGTCAACAG<br>CTTAATAGTTACCCCCTGTTCACTTTCG<br>GCCCTGGGACCAAAGTGGATATCAAA<br>C |

In various embodiments, the nucleic acid comprises a nucleotide sequence encoding an immunoglobulin heavy chain variable region of the antibody or antigen-binding fragment described herein. In various embodiments, the nucleic acid comprises a nucleotide sequence encoding an immunoglobulin light chain variable region of the antibody or antigen-binding fragment described herein. In some embodiments, the nucleic acids encode one or more complementary determining regions (CDR) having the amino acid sequences described herein. As described above, a single nucleic acid may be provided that encodes more than one protein product (e.g., the immunoglobulin light chain and the immunoglobulin heavy chain). Alternatively, two or more separate nucleic acids may be provided each encoding one component of the antibody and/or antigen binding fragment (e.g., the light chain or the heavy chain).

In various embodiments, an expression vector is provided comprising one or more of the nucleic acids described herein. Vectors can be derived from plasmids such as: F, F1, RP1, Col, pBR322, TOL, Ti, etc; cosmids; phages such as lambda, lambdoid, M13, Mu, P1, P22, Qβ, T-even, T-odd, T2, T4, T7 etc; or plant viruses. Vectors can be used for cloning and/or expression of the binding molecules of the invention and might even be used for gene therapy purposes.

Vectors comprising one or more nucleic acid molecules according to the invention operably linked to one or more expression-regulating nucleic acid molecules are also covered by the present invention. The choice of the vector is dependent on the recombinant procedures followed and the host used. Introduction of vectors in host cells can be effected by inter alia calcium phosphate transfection, virus infection, DEAE-dextran mediated transfection, lipofectamin transfection or electroporation. Vectors may be autonomously replicating or may replicate together with the chromosome into which they have been integrated. Preferably, the vectors contain one or more selection markers. The choice of the markers may depend on the host cells of choice. They include, but are not limited to, kanamycin, neomycin, puromycin, hygromycin, zeocin, thymidine kinase gene from Herpes simplex virus (HSV-TK), dihydrofolate reductase gene from mouse (dhfr). Vectors comprising one or more nucleic acid molecules encoding the human binding molecules as described above operably linked to one or more nucleic acid molecules encoding proteins or peptides that can be used to isolate the human binding molecules are also covered by the invention. These proteins or peptides include, but are not limited to, glutathione-S-transferase, maltose binding protein, metal-binding polyhistidine, green fluorescent protein, luciferase and beta-galactosidase.

The expression vector may be transfected into a host cell to induce the translation and expression of the nucleic acid into the heavy chain variable region and/or the light chain variable region. Therefore, a host cell is provided comprising any expression vector described herein. Host cells include, but are not limited to, cells of mammalian, plant, insect, fungal or bacterial origin. Bacterial cells include, but are not limited to, cells from Gram-positive bacteria or Gram-negative bacteria such as several species of the genera *Escherichia*, such as *E. coli*, and *Pseudomonas*. In the group of fungal cells preferably yeast cells are used. Expression in yeast can be achieved by using yeast strains such as inter alia *Pichia pastoris, Saccharomyces cerevisiae* and *Hansenula polymorpha*. Furthermore, insect cells such as cells from *Drosophila* and Sf9 can be used as host cells. Besides that, the host cells can be plant cells such as inter alia cells from crop plants such as forestry plants, or cells from plants providing food and raw materials such as cereal plants, or medicinal plants, or cells from ornamentals, or cells from flower bulb crops. Transformed (transgenic) plants or plant cells are produced by known methods, for example, *Agrobacterium*-mediated gene transfer, transformation of leaf discs, protoplast transformation by polyethylene glycol-induced DNA transfer, electroporation, sonication, microinjection or bolistic gene transfer. Additionally, a suitable expression system can be a baculovirus system. Expression systems using mammalian cells, such as Chinese Hamster Ovary (CHO) cells, COS cells, BHK cells, NSO cells or Bowes melanoma cells are preferred in the present invention. Mammalian cells provide expressed proteins with posttranslational modifications that are most similar to natural molecules of mammalian origin. Since the present invention deals with molecules that may have to be administered to humans, a completely human expression system would be particularly preferred. Therefore, even more preferably, the host cells are human cells. Examples of human cells are inter alia HeLa, 911, AT1080, A549, HEK293 and HEK293T cells.

Further a method is provided for producing an antibody or antigen-binding fragment that binds a neuraminidase of an influenza virus, the method comprising growing a host cell as described herein under conditions so that the host cell expresses a polypeptide or polypeptides comprising the immunoglobulin heavy chain variable region and the immunoglobulin light chain variable region, thereby producing the antibody or antigen-binding fragment and purifying the antibody or antigen-binding fragment.

Pharmaceutical Compositions

Also provided are pharmaceutical compositions comprising at least one antibody or antigen-binding fragment described herein and a pharmaceutically acceptable carrier.

Pharmaceutical compositions containing one or more of the antibodies or antigen-binding fragments described herein can be formulated in any conventional manner. Proper formulation is dependent in part upon the route of administration selected. Routes of administration include, but are not limited to parenteral (e.g., intravenous, intra-arterial, subcutaneous, rectal, subcutaneous, intramuscular, intraorbital, intracapsular, intraspinal, intraperitoneal, or intrasternal), topical (nasal, transdermal, intraocular), intravesical, intrathecal, enteral, pulmonary, intralymphatic, intracavital, vaginal, transurethral, intradermal, aural, intramammary, buccal, orthotopic, intratracheal, intralesional, percutaneous, endoscopical, transmucosal, sublingual and intestinal administration. Preferably, the composition is administered parenterally or is inhaled (e.g., intranasal).

Pharmaceutically acceptable excipients for use in the compositions of the present invention are selected based upon a number of factors including the particular compound used, and its concentration, stability and intended bioavailability; the subject, its age, size and general condition; and the route of administration.

The pharmaceutical compositions can also be formulated for parenteral administration, e.g., formulated for injection via intravenous, intra-arterial, subcutaneous, rectal, subcutaneous, intramuscular, intraorbital, intracapsular, intraspinal, intraperitoneal, or intrasternal routes. Dosage forms suitable for parenteral administration include solutions, suspensions, dispersions, emulsions or any other dosage form that can be administered parenterally.

Pharmaceutically acceptable excipients are identified, for example, in The Handbook of Pharmaceutical Excipients, (American Pharmaceutical Association, Washington, D.C., and The Pharmaceutical Society of Great Britain, London, England, 1968). Additional excipients can be included in the pharmaceutical compositions of the invention for a variety of purposes. These excipients can impart properties which enhance retention of the compound at the site of administration, protect the stability of the composition, control the pH, facilitate processing of the compound into pharmaceutical compositions, and so on. Other excipients include, for example, fillers or diluents, surface active, wetting or emulsifying agents, preservatives, agents for adjusting pH or buffering agents, thickeners, colorants, dyes, flow aids, non-volatile silicones, adhesives, bulking agents, flavorings, sweeteners, adsorbents, binders, disintegrating agents, lubricants, coating agents, and antioxidants.

In various embodiments, the pharmaceutical composition according to the invention can comprise at least one additional antibody or antigen binding fragment targeting the influenza virus. In these embodiments, the pharmaceutical composition comprises a cocktail or a mixture of antibodies. The additional antibodies may be selective for a hemagglutinin (HA) protein or different immunogenic structure present on the influenza virus (such as M2). The additional antibodies may selectively bind the head or the stalk of the hemagglutinin protein.

In some embodiments, the composition may further comprise at least one other therapeutic, prophylactic and/or diagnostic agent. Preferably, said therapeutic and/or prophylactic are agents capable of preventing and/or treating an influenza virus infection and/or a condition resulting from such an infection. Therapeutic and/or prophylactic agents include, but are not limited to, anti-viral agents. Such agents can be binding molecules, small molecules, organic or inorganic compounds, enzymes, polynucleotide sequences, anti-viral peptides, etc. The therapeutic and/or prophylactic agent can comprise an M2 inhibitor (e.g., amantadine, rimantadine) and/or a neuraminidase inhibitor (e.g., zanamivir, oseltamivir). In various embodiments, the anti-viral agent can comprise baloxavir, oseltamivir, zanamivir, peramivir or any combination thereof.

The additional antibodies or therapeutic/prophylactic and/or diagnostic agents may be used in combination with the antibodies and antigen-binding fragments of the present invention. "In combination" herein, means simultaneously, as separate formulations, or as one single combined formulation or according to a sequential administration regiment as separate formulations, in any order. Agents capable of preventing and/or treating an infection with influenza virus and/or a condition resulting from such an infection that are in the experimental phase might also be used as other therapeutic and/or prophylactic agents useful in the present invention.

The pharmaceutical composition can be formulated without blood, plasma or a major component of blood or plasma (e.g., blood cells, fibrin, hemoglobin, albumin, etc.).

Universal Influenza Vaccine

In various embodiments a vaccine is provided for preventing an influenza infection. Advantageously the vaccine can provide protection from Influenza A and Influenza B viruses. In various embodiments, the vaccine comprises any of the antibodies or antigen-binding fragments disclosed herein that are selective for a neuraminidase. In various embodiments, the vaccine may comprise a universal neuraminidase epitope, such as, for example a polypeptide comprising the residues targeted by the antibodies or antigen-binding fragments described herein. For example, the epitope can comprise an amino acid sequence comprising at least about 70% sequence identity to SEQ ID NO: 46 and containing at least one of the residues selected from the group consisting of: R118, E119, L134, D151, R152, R156, W178, I222, R224, E276, E277, R371, and Y406. In some cases, the epitope comprises at least about 70% identity to SEQ ID NO: 46 and comprises the following residues: R118, E119, D151, R152, I222, R224, E276, E277, R371, and Y406. In some cases, the epitope comprises at least about 70% identity to SEQ ID NO: 46 and comprises the following residues: R118, E119, D151, R152, I222, R224, E277, R371, and Y406. In some cases, the epitope comprises at least about 70% identity to SEQ ID NO: 46 and comprises the following residues: R118, E119, L134, D151, R152, R156, W178, I222, R224, E276, E277, R371, and Y406. In all of the epitopes described herein, residues are numbered according to the amino acid numbering of SEQ ID NO: 46. In some embodiments, the vaccine may comprise a nucleic acid (e.g., RNA or DNA) that encodes any of the epitopes (e.g., polypeptides) described above.

In various embodiments, the vaccine further comprises an adjuvant to stimulate an immune response. Suitable adjuvants are known in the art and can include, for example, alum, aluminum hydroxide, monophosphoryl lipid A (MPL) or combinations thereof. Further, the vaccine may be prepared using suitable carriers and excipients according to pharmaceutical compositions described herein above.

In various embodiments, the vaccine can elicit an immunological response to prevent an influenza infection. The influenza infection may be caused by an influenza A virus or an influenza B virus. In some embodiments, the influenza infection is caused by an influenza A virus selected from the group consisting of: HXN1, HXN2, H2N3, HXN4, HXN5, HXN6, HXN7, HXN8, HXN9 or any combination thereof, wherein X is any integer between 1 and 18.

Methods of Treating

In various embodiments, a method of preventing or treating influenza in a subject in need thereof is provided. The method can comprise administering any antibody or antigen binding fragment (including any nucleic acid or expression vector that encodes the antibody or antigen-binding fragment), any vaccine, or any composition as described herein to the subject.

In various embodiments, the composition is administered parentally (e.g., systemically). In other embodiments, the composition is inhaled orally (e.g., intranasally). In both cases the composition is formulated (e.g., with excipients) according to its mode of administration as described above.

In various embodiments the composition is administered via intranasal, intramuscular, intravenous, and/or intradermal routes. In some embodiments, the composition is provided as an aerosol (e.g., for nasal administration).

Dosing regiments can be adjusted to provide the optimum desired response (e.g., a prophylactic or therapeutic response). Therefore, the dose used in the methods herein can vary depended on the intended use (e.g., for prophylactic vs. therapeutic use). Nevertheless, the compositions described herein may be administered at a dose of about 1 to about 100 mg/kg body weight, or from about 1 to about 70 mg/kg body weight. Furthermore, a single bolus may be administered, several divided doses may be administered over time, or the dose may be proportionally reduced or increased as indicated by the exigencies of the therapeutic of the therapeutic situation.

In various embodiments, the antibody or antigen binding fragment is delivered using a gene therapy technique. Such techniques are well known in the art and generally comprise administering a viral vector comprising a nucleic acid that codes for a gene product of interest to a subject in need thereof. Therefore, in certain embodiments, the antibody or antigen-binding fragment described herein is delivered to a subject in need thereof by administering a viral vector or vectors (e.g., an adenovirus) containing one or more of the necessary nucleic acids (such as, for example, the nucleic acids provided herein) for expressing the antibody or antibody binding fragment in vivo. Similar delivery methods have successfully lead to the expression of protective antibodies in other disease contexts. For example, see Sofer-Podesta C. et al., "Adenovirus-mediated delivery of an Anti-V Antigen Monoclonal Antibody Protects Mice against a Lethal *Yersinia pestis* Challenge" Infection and Immunity March 2009, 77 (4) 1561-1568, the entire disclosure of which is incorporated herein by reference.

In various embodiments, the influenza to be treated is an influenza A virus or an influenza B virus. In some embodiments, the influenza to be treated is selected from the group consisting of: HXN1, HXN2, H2N3, HXN4, HXN5, HXN6, HXN7, HXN8, HXN9 or any combination thereof, wherein X is any integer between 1 and 18.

Having described the invention in detail, it will be apparent that modifications and variations are possible without departing from the scope of the invention defined in the appended claims.

EXAMPLES

The following non-limiting examples are provided to further illustrate the present invention.

Materials and Methods

The following materials and methods were used to perform the experiments described in Examples 1 to 4.

Patient

Human peripheral blood mononuclear cells (PBMC) were obtained from a single subject, 1718003, enrolled into the Barnes Jewish Hospital Emergency Department Influenza—EDFLU—prospective observational cohort study. The EDFLU study was reviewed and approved by the Washington University in Saint Louis Institutional Review Board (Approval #2017-10-220). 1718003 was recruited during the 2017-2018 H3N2-predominant influenza season and PBMCs were obtained on the 5th day of symptomatic illness following presentation for medical attention to the Barnes Jewish Hospital Emergency Department. The subject received the 2017-2018 seasonal influenza vaccine prior to the onset of illness and other seasonal influenza vaccines in previous influenza seasons. The subject was briefly admitted to the hospital and discharged 1%/2 days after admission without complication.

PBMC Isolation

Blood was collected in ethylenediaminetetraacetic acid (EDTA)-anticoagulated sample tubes using standard phlebotomy techniques. PBMCs were prepared within 8 hours of collection by layering over Ficoll and centrifuging at 400 g for 30 minutes. The PBMC layer at the Ficoll interface was collected, washed with 1× phosphate buffered saline (PBS) and resuspended in Roswell Park Memorial Institute (RPMI)-1640 media. Cell counts were obtained, and cells were cryogenically preserved in RPMI-1640 media supplemented with 10% dimethyl sulfoxide (DMSO) and 40% fetal bovine serum (FBS).

Cell Sorting

Staining for sorting was performed using cryo-preserved PBMCs resuspended in PBS supplemented with 2% FBS and 1 mM EDTA. Cells were stained for 30 min at 4° C. with CD71-FITC (Biolegend, clone CY1G4), CD19-PE (Biolegend, clone HIB19), IgD-PerCP-Cy5.5 (Biolegend, clone IA6-2), CD38-BV605 (Biolegend, clone HIT2), and Zombie Aqua (Biolegend). Cells were then washed twice and single ASCs (live singlet CD19+CD4− IgDlo CD38+CD71+) were sorted using a FACSAria II into 96-well plates containing 10 µL of 10 mM tris(hydroxymethyl)aminomethane (Tris) supplemented with 1 U/µL RNase inhibitor (Promega) and immediately frozen on dry ice.

Monoclonal Antibody Generation

Antibodies were cloned as previously described (1). Generally, three antibody secreting cells (ASCs) that express IgA antibodies were isolated from the subject as described above. The variable genes (VH and $V_\kappa$) were cloned from the cells cDNA into IgG1 expression vectors to express non-naturally occurring IgG antibodies having the specificity of the IgA antibodies in vivo. In brief, VH and $V_\kappa$ genes were amplified by reverse transcriptase-polymerase chain reaction (RT-PCR) and nested PCR reactions from singly-sorted antibody secreting cells (ASCs) using cocktails of primers specific for IgG and $Ig_\kappa$ using primer sets detailed in (2) and then sequenced. To generate recombinant antibodies, restriction sites were incorporated by PCR with primers to the VH3-20, JH2, VK1-9, and JK3 genes. The amplified VH and $V_\kappa$ genes were cloned into IgG1 and $Ig_\kappa$ expression vectors, respectively, as previously described (1-3). Nucleotide sequences used to express the antibodies, are shown in the following table. Heavy and light chain plasmids were co-transfected into Expi293F cells (Gibco) for expression and antibody was purified with protein A agarose (Invitrogen).

| Name (SEQ ID NO:) | Sequence |
| --- | --- |
| 1G01_H<br>Homo sapiens [clone = 1G01H]<br>Human heavy chain clone 1G01 immunoglobulin variable region, mRNA, partial CDS<br>(SEQ ID NO: 47) | gaggtgcagctggtggagtctggggg<br>acgtgcgctacggcctgggggtccct<br>gagactctcctgtgcagcctctggatt<br>caagtttgatgattatgccatgagctg<br>ggtccgccaggttccagggaagggac<br>tggagtttgtctctggtcttaattgga<br>atggtgacatcacagcttatacagact<br>ctgtgaagggccgattcactgtctcca<br>gagacaacgccaagaactccctgtatc<br>tgcacatcaacagtccgaagcccgag<br>gacacggccctctattattgtgcgaga<br>actagctcatggggcgattatacaaga<br>gggcctgagccaaagattacctggtac<br>ttcgatctctggggccggggcactctg<br>gtcaccgtctcctcag |
| 1G04_H<br>H. sapiens [clone = 1G04H1]<br>Human heavy chain clone 1G04 immunoglobulin variable region, mRNA, partial CDS<br>(SEQ ID NO: 48) | gaggtgcagctggtggagtctggggg<br>acgtgtggtacggccggggggatccct<br>gcgactctcctgtgcagcctctggatt<br>cacctttgatgactatggcatgagctg<br>ggtccgccaagctccagggaagggc<br>tggaatttgtctctggtcttaactgga<br>atggagatatcacagctttcacagact<br>ctgtgaagggccgattcaccatctcca<br>gagacaacgccaagagctccctgtatc<br>tgcaaatgaacagtctgagagccgac<br>gacacggccttctattactgtgcgaga<br>gtgcggacgtggggcgagtatacaac<br>aagagaggagccaattcacagctggt<br>acttcgatctctggggccgtggcaccc<br>tggtcaccgtctcctcag |
| 1E01_H<br>H. sapiens [clone = 1E01H]<br>Human heavy chain clone 1E01 immunoglobulin variable region, mRNA, partial CDS<br>(SEQ ID NO: 49) | gaggtgcagctggtggagtctggggg<br>acgtgtggtacggccgggggggtccct<br>gagactctcctgtgccgcctctggatt<br>cacgtttgatgattatggcatgagttg<br>ggtacgccaacctccagggaagggc<br>tggagtttgtctctggtcttaactgga<br>atggagatatcacagcttttacagact<br>ctgtgaagggccgattcaccatctcca<br>gagacaacgtcaagagttccctgtatt<br>tgcaaatgaacagtctgagagccgac<br>gacacggccttctattactgtgcgaga<br>gtacggacatggggcgactatacaac<br>aggagaggagataatcaacagctggt<br>acttcgatctctggggccgtggcaccc<br>tggtcaccgtctcctcag |

-continued

| Name (SEQ ID NO:) | Sequence |
|---|---|
| 1E01_L<br>H. sapiens [clone = 1E01L]<br>Human Light chain clone 1E01<br>immunoglobulin variable region,<br>mRNA, partial CDS<br>(SEQ ID NO: 50) | GACATCCAGTTGACCCAGTCTCCATCC<br>TTCCTGTCTGCATCTGTAGGAGACAGA<br>GTCACCATCACTTGCCGGGCCAGTCAG<br>GACATTAGCAGCTATTTAGCCTGGTAT<br>CAGCAAAAACCAGGGAATGCCCCTAA<br>GCTCCTGATCTATGCTGCATCCCTTTTG<br>CAAAGTGGGGTCCCATCAAGGTTCAGC<br>GCCTTTGGATCTGGGACAGAATTCACT<br>CTCACAATCAGCAGCCTGCAGCCTGAA<br>GATTTTGCAACTTATTACTGTCAACAC<br>CTTAAGAGTTACCCCCTGTTCACTTTC<br>GGCCCTGGGACCAAAGTGGATATCAA<br>AC |
| 1G01_L<br>H. sapiens [clone = 1G01L]<br>Human Light chain clone 1G01<br>immunoglobulin variable region,<br>mRNA, partial CDS<br>(SEQ ID NO: 51) | GACATCCAGTTGACCCAGTCTCCATCC<br>TTCCTGTCTGCATCTGTTGGAGACAGA<br>ATAACCATCACTTGCCGGGCCAGTCAG<br>GGCATTGATGGTTATTTAGCCTGGTAT<br>CAGCAAAGACCAGGGAAAGCCCCTAA<br>CCTCCTGATCTATGCTGCATCCCTTTTG<br>CAAAGTGGGGTCCCATCAAGGTTCAGC<br>GGCAGTGGATATGGGACAGAATTCAC<br>TCTCACAATCAGCAGCCTGCAGCCTGA<br>GGACTTTGCAACTTATTACTGTCAACA<br>TCTTGACAGTTACCCCCTGTTCACTTTC<br>GGCCCTGGGACCAAAGTGGATATCAA<br>AC |
| 1G04_L<br>H. sapiens [clone = 1G04L]<br>Human Light chain clone 1G04<br>immunoglobulin variable region,<br>mRNA, partial CDS<br>(SEQ ID NO: 52) | GACATCCAGTTGACCCAGTCTCCATCC<br>TTCCTGTCTGCATCTGTAGGAGACAGA<br>GTCACCATCACTTGCCGGGCCAGTCAG<br>GACATTAGCAGTTTTTAGCCTGGTAT<br>CAGCAAAAACCAGGGAATGCCCCTAA<br>GGTCCTGATCTATGCTGCGTCCCTTTTG<br>CAGAGTGGGGTCCCATCAAGGTTCAGC<br>GGCAGTGGATCTGGGACAGATTTCACT<br>CTCACAATCAGCAGCCTGCAACCTGAA<br>GATTTCGCAACTTATTACTGTCAACAG<br>CTTAATAGTTACCCCCTGTTCACTTTCG<br>GCCCTGGGACCAAAGTGGATATCAAA<br>C |

Cells, Viruses and Proteins

Human embryonic kidney cells (293T) were grown in Dulbecco's modified Eagle's medium (DMVEM; Gibco) containing penicillin-streptomycin antibiotics mix (100 U/mL of penicillin, 100 µg/mL streptomycin; Gibco) and FBS (10%; Corning) resulting in complete DMVEM (cDD-MEM). Madin Darby canine kidney (MIDCK) cells were grown and maintained in cDMEM. BTI-TN-5B 1-4 (*Trichoplusia ni*) cells were grown in serum-free SFX medium (HyClone) supplemented with antibiotics (100 U/mL of penicillin, 100 µg/mL streptomycin; Gibco). Sf9 (*Spodoptera frugiperda*) cells were maintained in TNM-FH medium (Gemini Bio-Products) in the presence of 10% FBS and pen-strep antibiotics mix. Single-use aliquots of ADCC bioeffector FcγRIIIa cells (Promega) were thawed before usage. Influenza viruses were grown in 8-10 day old embryonated chicken eggs (Charles River Laboratories) at 33° C. (influenza B viruses) for 3 days or at 37° C. (influenza A viruses) for 2 days, respectively. Virus reassortants were rescued by plasmid-based reverse genetic techniques as previously described (4). A full list of viruses used in this study can be found in Table 6. Recombinant proteins were expressed in the baculovirus expression system as previously described in detail (5). All NAs were expressed as ectodomains with an N-terminal vasodilator-stimulated phosphoprotein tetramerization domain and a hexahistinde tag for purification. A full list of recombinant neuraminidases can be found in Table 4, below.

TABLE 4

Recombinant NA proteins used in this study.

| Subtype | Strain name | From subtype |
|---|---|---|
| N2 | A/chicken/Hong Kong/G9/1997 | H9N2 |
| N2 | A/Hong Kong/4801/2014 | H3N2 |
| N2 | A/Texas/50/2012 | H3N2 |
| N3 | A/swine/Missouri/4296424/2006 | H6N3 |
| N7 | A/mallard/IA/10BM01929/2010 | H10N7 |
| N6 | A/caspian seal/Russia/T1/2012 | H4N6 |
| N9 | A/Anhui/1/2013 | H7N9 |
| N9 | A/Hong Kong/4801/2014 | H7N9 |
| N1 | A/Michigan/45/2015 | pH1N1 |
| N1 | A/Vietnam/1204/2004 (N1) | H5N1 |
| N4 | A/mallard/Sweden/24/2002 (N4) | H8N4 |
| N5 | A/mallard/Sweden/86/2003 (N5) | H12N5 |
| N8 | A/chicken/Netherlands/14015531/2014 | H5N8 |
| B NA | B/Malaysia/2506/2004 | B (V) |
| B NA | B/Florida/04/2006 | B (Y) |

Enzyme-Linked Immunosorbent Assay (ELISA).

Ninety six-well microtiter plates (Thermo Fisher) were coated with 50 µL recombinant NA at a concentration of 2 µg/mL in 1× coating buffer (KPL coating solution; SeraCare) at 4° C. overnight. Two hundred twenty µL blocking solution (PBS (Gibco) supplemented with 0.1% Tween-20 (T-PBS; Fisher Scientific), 3% goat serum (Life Technologies) and 0.5% milk powder (American-Bio)) were added to all wells and the plates incubated for 1 h at room temperature. The mAbs were diluted to a starting concentration of 30 g/mL, serially diluted 1:3, and incubated for 2 h at room temperature. The plates were washed three times with T-PBS and 50 µL anti-human IgG (Fab specific) horseradish peroxidase antibody (HRP, produced in goat; Sigma, #A0293) diluted 1:3000 in blocking solution was added to all wells and incubated for 1 h at room temperature. The microtiter plates were washed four times and 100 µL SigmaFast o-phenylenediamine dihydrochloride (OPD; Sigma) was added to all wells. The reaction was stopped after 10 min with 50 µL 3M hydrochloric acid (Thermo Fisher) and the plates were read at a wavelength of 490 nm with a microtiter plate reader (Bio-Tek). The data were analyzed in Microsoft Excel and GraphPad Prism 7. The cutoff value was defined as the average of all blank wells plus three times the standard deviation of the blank wells. The minimal binding concentration was defined as the last well that has a signal higher than the cutoff value.

Enzyme-Linked Lectin Assay (ELLA)

Ninety six-well microtiter plates (Thermo Fisher) were coated with 100 µL/well fetuin (Sigma) at a concentration of 25 µg/mL in 1× coating buffer (KPL coating solution; SeraCare) at 4° C. overnight. The next day, the plates were washed three times with T-PBS and blocked in 200 µL blocking buffer (5% bovine serum albumin (BSA, Biomedicals) in PBS) at room temperature. On a separate 96-well plate virus was serially diluted 1:2 in PBS. Seventy-five µL of PBS was added to all wells and the plates incubated for 1.5 h on a shaker at room temperature. After blocking, the plates were washed three times with T-PBS, 100 µL of serially diluted virus was transferred well by well to the fetuin coated plates and the plates were incubated for 2 hours at 33° C. or 37° C. depending on the virus type. The plates were washed four times and 100 µL peanut agglutinin (PNA) conjugated to HRP at a concentration of 5 µg/mL was added to all wells. The plates were incubated in the dark for two hours, the plates washed four times and developed with 100 µL SigmaFast OPD. The reaction was stopped after 5 min with 50 µL 3M hydrochloric acid (Thermo Fisher) and the plates were read at a wavelength of 490 nm with a microtiter plate reader (Bio-Tek). The data were analyzed in Microsoft Excel and GraphPad Prism 7, and the 50% effective concentration (EC50) was calculated for each virus.

To perform neuraminidase inhibition assays, the microtiter plates were coated and blocked as described above. During the blocking of the fetuin coated plates the mAbs were diluted to a starting concentration of 30 µg/mL and serially diluted 1:2 in PBS in a separate 96-well plate. Seventy-five µL of virus diluted to 2× effective concentration 50 (EC50) was added to wells of the serially diluted mAbs and incubated for 1.5 h on a shaker. The fetuin coated plates were washed three times with T-PBS and the virus/mAb mixture was added to the plates and incubated for 2 hours at 33° C. or 37° C. The remainder of the assay was performed as described above. The data were analyzed in Microsoft Excel and GraphPad Prism 7, and the inhibitory concentration 50 (IC50) was calculated.

NA-Star Assay

The NA-Star Influenza Neuraminidase Inhibitor Resistance Detection Kit (Applied Biosystems) was used to measure the inhibition of the viral NA to cleave a small, soluble, chemiluminescent substrate by the anti-NA mAbs. The assay was performed according to the manufacturer's protocol. In brief, the mAbs were diluted to a concentration of 30 µg/mL, serially diluted 1:2 and 25 µL transferred to a white, flat bottom 96-well cell culture plate. Twenty-five µL of virus at the determined 2×EC50 concentration was added to each well and plates were shaken and incubated for 20 min at 37° C. The NA-Star substrate was prepared shortly before use and 10 µL/well of substrate was added to all wells. The plates were incubated for 30 minutes at room temperature and 60 µL/well of NA-Star accelerator solution was added to all wells right before reading the plates using a microtiter plate reader (Bio-Tek). The data were analyzed using Microsoft Excel and GraphPad Prism 7, and inhibition curves visualized.

Microneutralization Assay

Hundred µL/well MDCK cells at a concentration of 1.5×105 cells/mL were seeded in 96-well cell culture plates (Sigma) and incubated at 37° C. overnight. Next day, in a separate 96-well cell culture plate the mAbs were diluted to a starting concentration of 30 µg/mL, serially diluted 1:2 in UltraMDCK media (Lonza) supplemented with tosyl phenylalanyl chloromethyl ketone (TPCK)-treated trypsin (infection media; Sigma) at a concentration of 1 µg/mL. The viruses were diluted to a concentration of 100×TCID50/50 µL in infection medium and 60 µL of virus dilution was incubated with 60 µL of serially diluted mAbs and incubated on a shaker at room temperature for 1 h. Next, the MDCK cell plates were washed with PBS (Gibco) and 100 µL of the virus/mAb mixture was added. The plates were incubated at 33° C. for one hour and after the incubation time the virus/mAb mixture was removed and replaced with diluted mAb at the previous concentration. The plates were incubated at 33° C. for 48 h and the readout was performed by the means of classical hemagglutination assay. In brief, chicken red blood cells (RBCs; Lampire Biological Laboratories) were diluted to a concentration of 0.5% in PBS and added to 50 µL of cell supernatant in v-bottom 96-well plates (Corning). The plates were incubated at 4° C. for 30-45 min, scanned and the results analyzed in Microsoft Excel and visualized in GraphPad Prism 7.

ADCC Reporter Bioassay

Hundred µL/well MDCK cells at a concentration of 1.5×105 cells/mL were seeded in white, flat bottom 96-well cell culture plates (Corning) and incubated at 37° C. overnight. The next day, the cells were washed with PBS, 100 µL of virus diluted to 1.5×106 plaque forming units (PFU)/mL (corresponding to a multiplicity of infection (MOI) of about 5) in serum-free UltraMDCK media was added to each well and the plates were incubated for 24 h at 37° C. In a separate 96-well cell culture plate the mAbs were diluted to a starting concentration of 60 µg/mL and serially diluted 1:2 in RPMI 1640 medium (Life Technologies). Human ADCC bioeffector FcγRIIIa cells (Promega) were thawed in a 37° C. water bath. The media was taken off the MDCK cell plates and 25 µL of RPMI 1640 media, 25 µL of serially diluted mAbs and 25 µL of bioeffector cells (6.25×104 cells/25 µL) were added. After incubation for 6 h at 37° C., 75 µL of Bio-Glo luciferase (Promega) was added to each well. The plates were incubated for 10 minutes in the dark and the luciferase-induced luminescence measured with a microplate reader (BioTek). The results were analyzed in Microsoft Excel and Graphpad Prism 7, and the area under the curve (AUC) values determined. The cutoff value was defined as the average of the values of the blank wells plus 3 times the standard deviation of the blank wells.

Cloning, Baculovirus Expression and Purification of Neuraminidases for Crystal Structure Determination.

The ectodomains of Hunan N9, Japan57 N2 and CA04 N1 NAs were expressed in a baculovirus system essentially as previously described (6). Briefly, the ectodomain (residues 83-470, 82-468 in N2 numbering) of N9 NA from A/Hunan/02650/2016 (H7N9) (Hunan N9, GISAID accession number EPI961189), the ectodomain (residues 82-469) of N2 NA from A/Japan/305/1957 (H2N2) (Japan N2, GenBank accession number CY045806) and the ectodomain (residues 82-469, 82-470 in N2 numbering) of N1 NA from A/California/04/2009 (H1N1) (CA04 N1, GenBank accession number FJ969517) were expressed in a baculovirus system for structural analyses. The cDNAs corresponding to the NA ectodomains were incorporated into a baculovirus transfer vector, pFastbacHT-A (Invitrogen) with an N-terminal gp67 signal peptide, thrombin cleavage site, and hexahistidine-tag (6). The constructed plasmids were used to transform DH10bac competent bacterial cells by site-specific transposition (Tn-7 mediated) to form a recombinant bacmid with beta-galactosidase blue-white receptor selection. The purified recombinant bacmids were used to transfect Sf9 insect cells (Thermo Fisher Scientific) for overexpression. NA proteins were produced in suspension cultures of Sf9 cells with recombinant baculovirus at an MOI of 5-10 and incubated at 28° C. shaking at 110 rounds per minute. After 72 hours, Sf9 cells were removed by centrifugation and supernatants containing secreted, soluble NA proteins were concentrated and buffer-exchanged into 20 mM Tris pH 8.0, 150 mM NaCl, and then further purified by metal affinity chromatography using Ni-nitrilotriacetic acid (NTA) resin (Qiagen). For crystallization, the NA ectodomains were digested with thrombin to remove the hexahistidine-tag and purified further by size exclusion chromatography on a Hiload 16/90 Superdex 200 column (GE healthcare) in 20 mM Tris pH 8.0, 150 mM NaCl and 0.02% NaN3. The purified NAs were measured by optical absorbance at 280 nm, and purity and integrity were analyzed by reducing and non-reducing sodium dodecyl sulfate polyacrylamide gel electrophoresis (SDS-PAGE).

Expression of Recombinant Antibody Fabs in Mammalian Cells for Crystal Structure Determination.

The light and heavy chain variable regions of human antibodies 1G04, 1E01 and 1G01 were cloned into the vector phCMV containing the corresponding lambda or kappa CL region, and the CHI region of human IgG1 appended to hexahistidine-tag, respectively. The Fab was expressed by transient co-transfection of the expression vectors containing heavy chain and light chain into ExpiCHO cells (Thermo Fisher Scientific). Recombinant Fab was purified from culture supernatant using metal affinity chromatography using NTA resin (Qiagen) followed by size exclusion chromatography using a Superdex 200 column (GE Healthcare). Purified Fabs in 20 mM Tris pH 8.0, 150 mM NaCl and 0.02% NaN3 were measured by optical absorbance at 280 nm, and purity and integrity were analyzed by reducing and non-reducing SDS-PAGE.

Crystal Structure Determination

Crystallization experiments were set up using the sitting drop vapor diffusion method. Diffraction quality crystals for the complex of 1G04 Fab with Hunan N9 NA at 6.0 mg/ml were grown in 0.1 M 4-(2-hydroxyethyl)-1-piperazineethanesulfonic acid (HEPES), pH 75n 50 (w/v) polyethylene glycol 3000, 30=(w/v) polyethylene glycol 400 and 1000 (v/v) glycerol at 20° C. The complex of 1E01 Fab with Japan57 N2 NA at 6.0 mg/ml was crystallized in 20% (v/v) glycerol, and 24% (w/v) polyethylene glycol 1500 at 20° C. Finally, the complex of 1G01 Fab with CA04 Ni NA at 3.0 mg/ml was crystallized in 0.1 M Tris, pH 8.5, 10% (v/v) glycerol, 20% (w/v) polyethylene glycol 300 and 5% (w/v) polyethylene glycol 8000 at 20° C. All crystals were flashed-cooled at 100 K without additional cryo-protectant.

Diffraction data were collected at synchrotron beamlines (Table 5). Data for all crystals were integrated and scaled with HKL2000 (7). Data collection statistics are outlined in Table 5.

TABLE 5

Data collection and refinement statistics of crystal structures.

| Data set | 1G04 Fab Hunan N9 | 1E01 Fab Japan57 N2 | 1G01 Fab CA04 N1 |
|---|---|---|---|
| Data Collection | | | |
| X-ray source | APS 23ID-B | SSRL 12-2 | APS 23ID-B |
| Space group | I4 | P42$_1$2 | P2$_1$ |
| Unit cell (Å) | a = b = 180.2, c = 148.1 | a = b = 160.5, c = 87.2 | a = 106.6, b = 235.0, c = 106.3 |
| β angle (deg.) | | | β = 106.4 |
| Resolution (Å)$^a$ | 47.4-3.45 (3.51-3.45) | 47.0-2.45 (2.49-2.45) | 43.3-3.27 (3.38-3.27) |
| Unique reflections | 30,994 | 40,758 | 70,214 |
| Redundancy$^a$ | 4.4 (4.1) | 13.8 (10.1) | 2.7 (2.2) |
| Average I/σ(I)$^a$ | 14.6 (1.0) | 22.5 (1.1) | 4.5 (1.1) |
| Completeness$^a$ | 99.1 (99.5) | 99.5 (98.2) | 91.9 (73.1) |
| R$_{sym}$$^{a,b}$ | 0.09 (0.87) | 0.12 (0.99) | 0.18 (0.57) |
| R$_{pim}$$^{a,b}$ | 0.05 (0.48) | 0.03 (0.30) | 0.12 (0.43) |
| CC$_{1/2}$$^a$ | 0.997 (0.844) | 0.998 (0.942) | 0.952 (0.876) |
| No. molecules per ASU$^c$ | 2 | 1 | 4 |
| Refinement | | | |
| Reflections in refinement | 30,967 | 40,669 | 66,845 |
| Refined residues | 1,664 | 830 | 3,314 |
| Refined waters | — | 63 | — |
| R$_{cryst}$$^d$ | 0.197 | 0.217 | 0.201 |
| R$_{free}$$^e$ | 0.247 | 0.272 | 0.244 |
| Twin operator/twin fraction | — | — | -l, -k, -h/0.335 |

TABLE 5-continued

Data collection and refinement statistics of crystal structures.

| Data set | 1G04 Fab Hunan N9 | 1E01 Fab Japan57 N2 | 1G01 Fab CA04 N1 |
|---|---|---|---|
| B-values (Å$^2$) | | | |
| Protein | 136 | 37 | 62 |
| Waters | — | 57 | — |
| Wilson B-values (Å$^2$) | 126 | 50 | 53 |
| Ramachandran values (%)$^f$ | 93.7, 0.5 | 93.6, 0.5 | 94.8, 0.5 |
| r.m.s.d. bond (Å) | 0.010 | 0.003 | 0.009 |
| r.m.s.d. angle (deg.) | 1.27 | 0.67 | 1.35 |
| PDB codes | AAAA | BBBB | CCCC |

$^a$Parentheses denote outer-shell statistics.
$^b$R$_{sym}$ = $\Sigma_{hkl}\Sigma_i$ |I$_{hkl,i}$ − <I$_{hkl}$>|/$\Sigma_{hkl}\Sigma_i$ I$_{hkl,i}$ and R$_{pim}$ = $\Sigma_{hkl}$[1/(N − 1)]$^{1/2}$ $\Sigma_i$ |I$_{hkl,i}$ − <I$_{hkl}$>|/$\Sigma_{hkl}\Sigma_i$ I$_{hkl,i}$, where I$_{hkl,i}$ is the scaled intensity of the i$^{th}$ measurement of reflection h, k, l, <I$_{hkl}$> is the average intensity for that reflection, and N is the redundancy. R$_{pim}$ = $\Sigma_{hkl}$ (1/(n − 1))$^{1/2}$ $\Sigma_i$ | I$_{hkl, i}$ − <I$_{hkl}$> |/$\Sigma_{hkl}$ $\Sigma_i$ I$_{hkl,i}$, where n is the redundancy
$^c$No. molecules for complexes refers to number of HA protomers plus antibody per asymmetric unit (ASU) or, for antibodies, single chain constructs per ASU.
$^d$R$_{cryst}$ = $\Sigma_{hkl}$ |F$_o$ − F$_c$| / $\Sigma_{hkl}$ |F$_o$|, where F$_o$ and F$_c$ are the observed and calculated structure factors.
$^e$R$_{free}$ was calculated as for R$_{cryst}$, but on 5% of data excluded before refinement.
$^f$The values are percentage of residues in the favored and outliers regions analyzed by MolProbity (14)

All of the crystal structures were determined by molecular replacement using the program Phaser (8). The complex structure of 1E01 Fab with Japan57 N2 NA was determined using N2 NA from A/RI/5+/1957 (H2N2) (PDB 3TIA) and Fab light and heavy chains (PDB codes 5ITB and 4FQL, respectively) as input MR models. The complex structure of 1G04 Fab with Hunan N9 NA was determined using N9 NA from A/Shanghai/2/2013 (H7N9) (PDB 5L14) and the refined 1E01 Fab structure as input MR models. Finally, the complex structure of 1G01 Fab with CA04 N1 NA was determined using the apo CA04 N1 NA structure (PDB code 3NSS) and the refined 1E01 Fab structure as input MR models. For structural refinement of 1E01 Fab with Japan57 N2 NA and 1G04 Fab with Hunan N9 NA, initial rigid body refinement was performed in REFMAC5 (9), and simulated annealing and restrained refinement (including TLS refinement) were carried out in PHENIX (10). For structural refinement of 1G01 Fab in complex with CA04 N1 NA, pseudomerohedral twinning was detected with a twinned P21 space group where a is nearly equal to c (Table 5) and higher apparent symmetry corresponding to a C-centered orthorhombic space group. Initial rigid body refinement and restrained twin refinement with twin operator -l, -k, -h and refined twin fraction 0.335 were all performed in REFMAC5 (9). Between rounds of refinements of these three structures, model building was carried out with the program Coot (11). Final statistics for these structures are summarized in Table 5. The quality of the structures was analyzed using the JCSG validation suite. All figures were generated with PyMol.

Passive Transfer Experiments in Mice

Passive transfer experiments to test prophylactic and therapeutic efficacy of the mAbs were performed as described previously (12). In short, for the prophylactic setting, 6-8-week-old female BALB/c mice (n=5 mice/group) or 6-8-week-old female DBA/2J mice (n=5 mice/group) were given 100 µL mAb 1G04, 1E01 or 1G01 at a concentration of 5 mg/kg intraperitoneally. The negative control mice received 100 µL of irrelevant human IgG control mAb at a concentration of 5 mg/kg. Two hours post transfer, the mice were anesthetized with a ketamine-xylazine-water mixture (0.15 mg ketamine/kg and 0.03 mg/kg xylazine of body weight; 100 µl intraperitoneally) and challenged intranasally with 5×LD50 of challenge virus, except for the H7N2 A/feline/New York/16-040082/2016 and B/Malaysia/2506/2004 challenge experiments where 2×LD50 or 7.5×LD$_{50}$ were given, respectively. BALB/c mice were used for all challenge experiments except for the H4N6 A/duck/Czechoslovakia/1956 virus challenge where DBA/2J mice were used because avian H4N6 virus does not induce weight loss in BALB/c mice. A full list of viruses used for challenge and the corresponding LD50 information can be found in Table 10 (Example 5). Weight loss was monitored daily for 14 days and the humane endpoint was defined as a loss of 25% of the initial day 0 weight.

For testing the therapeutic efficacy, mice were infected with 5×LD50 of H3N2 A/Philippines/2/1982 virus. The mAbs 1G04, 1E01, 1G01 and a human negative control mAb were administered 48 or 72 h post infection at a concentration of 5 mg/kg. Weight loss was measured daily for 14 days and mice that lost 25% or more of their day 0 weight were euthanized according to institutional guidelines.

To determine the reduction of lung viral titers, mice were given 5 mg/kg mAbs 1G04, 1E01, 1G01 and negative control human IgG via intraperitoneal injection, and after two hours were infected with 0.1×LD50 of H3N2 A/Philippines/2/1982 virus. At day 3 (n=3 mice/mAb) and day 6 (n=3 mice/mAb) post infection, lungs were harvested and homogenized using a BeadBlaster24 (Benchmark). Lung virus titers were assessed by standard plaque assay as described before (13). The results were analyzed in Microsoft Excel and GraphPad Prism 7.

NA Sequences

The sequences for generation of the phylogenetic tree were downloaded from the Influenza Resource Database and the Global Initiative on Sharing Avian Influenza Data).

Example 1: Isolation and Identification of Human Monoclonal Antibodies Following an Infection of Seasonal Influenza Plasmablasts were single cell sorted from peripheral blood mononuclear cells (PBMCs) on day 5 after onset of symptomatic illness and the corresponding immunoglobulin heavy and light variable (IGHV and IGLV) chain genes were cloned and expressed as previously described (23). The mAbs were then screened for binding to recombinant H3

HA, N2 NA, nucleoprotein and matrix protein 1. Three antibodies from this screening, mAbs 1G04, 1E01 and 1G01, bound to the N2 NA of the seasonal influenza virus strain A/Hong Kong/4801/2014 (H3N2), which is presumably closely related to the strain that caused the infection. 1G04, 1E01 and 1G01 form a three-member clonal family where IGHV3-20 and IGKV1-9 encode the IGHV and IGLV genes, respectively (FIG. 1A). The three mAbs most likely originate from memory B cells as evidenced by the accumulation of large number of somatic hypermutations, particularly in the IGHV genes. Alignment of the amino-acid sequences of each mAb to the inferred unmutated common ancestor (UCA) showed that the heavy chains of 1G04, 1E01 and 1G01 differ from the UCA at 12, 14 and 19 positions, respectively (FIG. 1B).

Figure 1C:
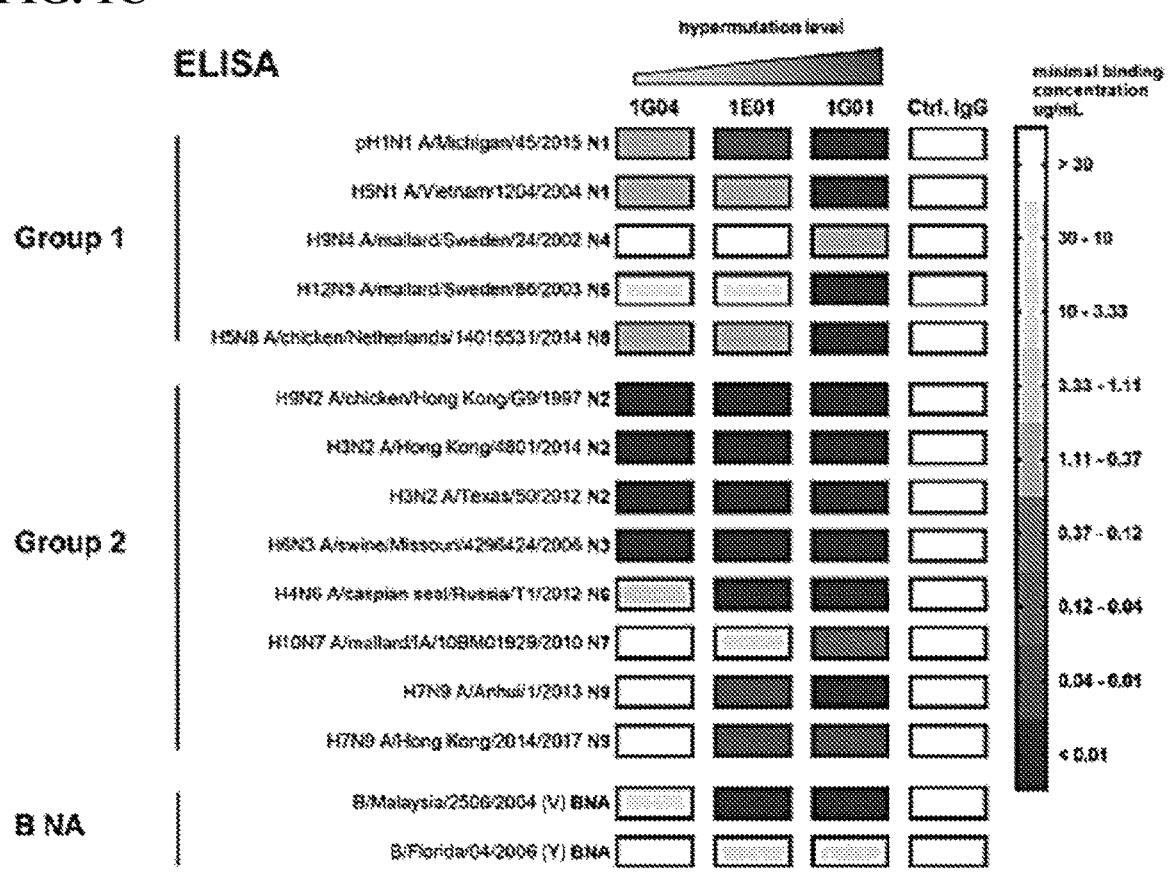
FIG. 1C shows a heat map of antibody binding to recombinant protein in ELISA. The minimal binding concentration is indicated.

Example 2: Characterization of Isolated mAb Binding to Recombinant N2 Proteins Using ELISA We first measured the binding affinity and cross-reactivity of the three mAbs to recombinant neuraminases (NA) from various seasonal and avian influenza viruses using an enzyme linked immunosorbent assay (ELISA). Upon further characterization, we found that the three antibodies displayed broad binding to recombinant N2 NA (group 2) from seasonal and avian influenza viruses (FIG. 1C, Table 4). Furthermore, 1G04 showed some cross-reactivity to N3 and N6 (group 2), and N1, N5 and N8 (group 1) as well as weak binding to influenza B NA (FIG. 1C). 1E01 showed an even broader binding pattern that included group 2 NAs N3, N6, N7 and N9, group 1 NAs N1, N5 and N8 as well as strong binding to influenza B NA from the B/Victoria/2/87 lineage and weak binding to the NA of the B/Yamagata/16/88 lineage. Finally, mAb 1G01 showed the broadest binding activity that covered all group 1 NAs (N1, N4, N5 and N8) and group 2 NAs (N2, N3, N6, N7 and N9), as well as NAs from both influenza B virus lineages (FIG. 1C).

Example 3: Functional Capacity of mAbs to Inhibit Neuraminidase

Figure 1D:
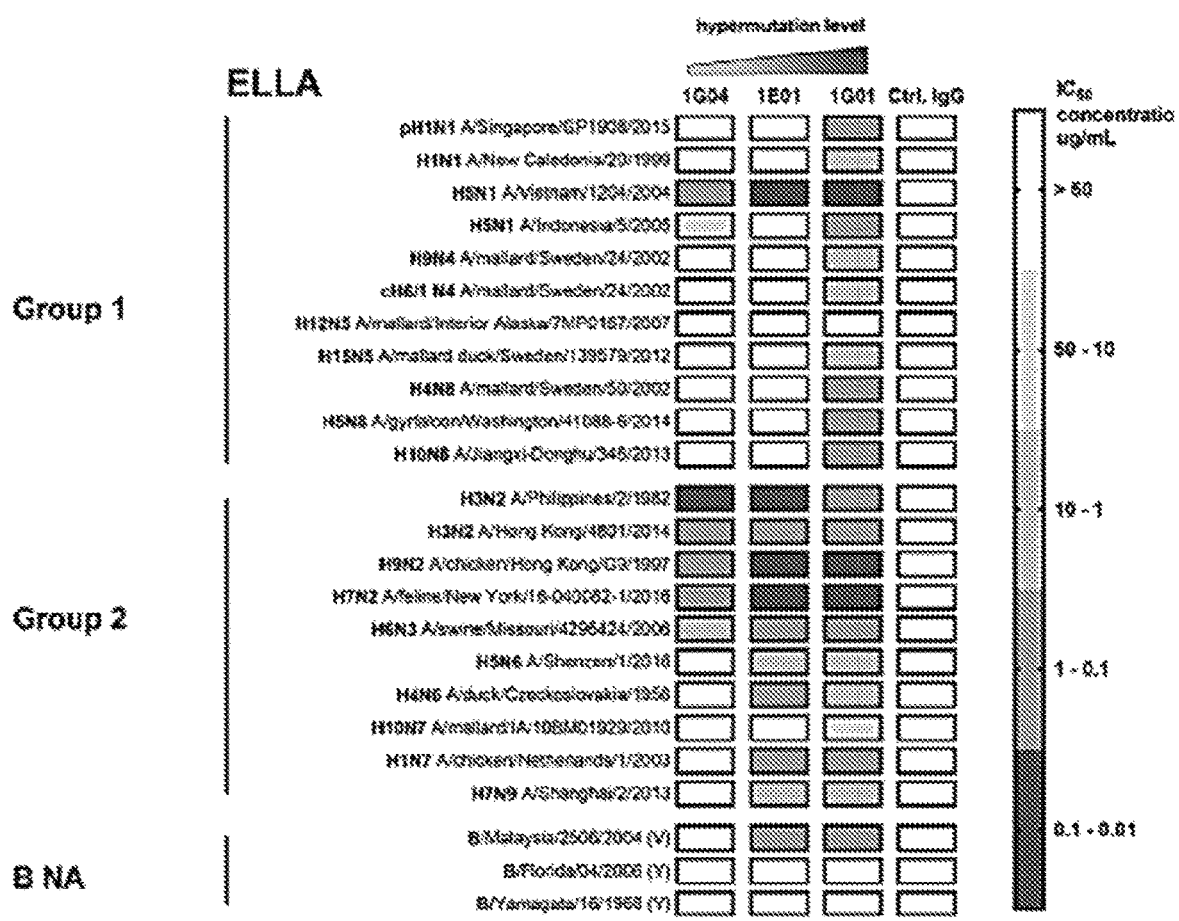
FIG. 1D shows a heat map of antibody activity in ELLA NI assays. The $IC_{50}$ is indicated.
Figure 2A:
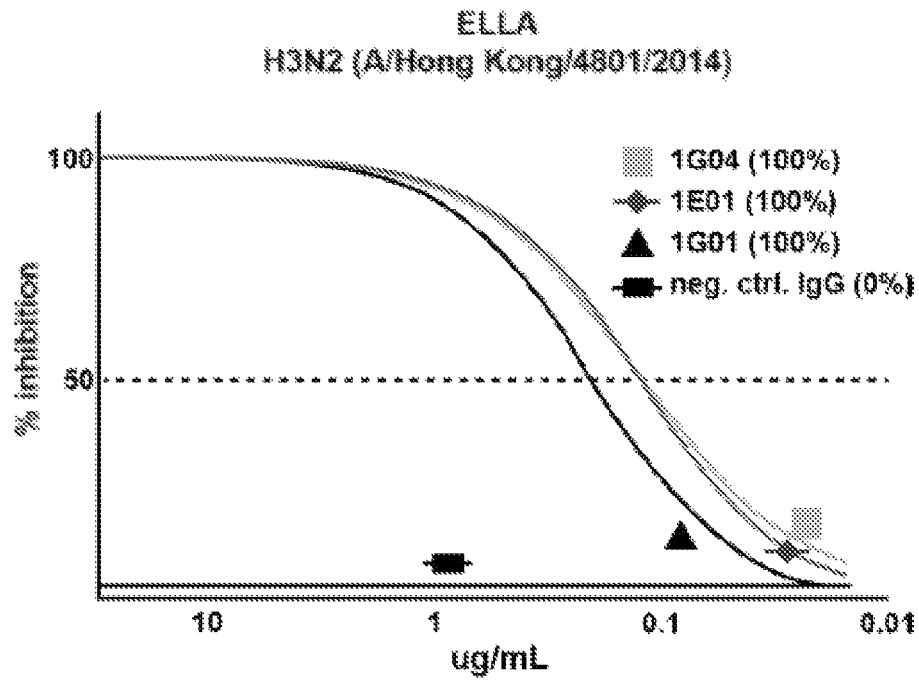
FIG. 2A shows NA representative inhibition curves in an ELLA assay (large substrate, steric hindrance sensitive) against H3N2 strain A/Hong Kong/4801/2014.
Figure 2B:
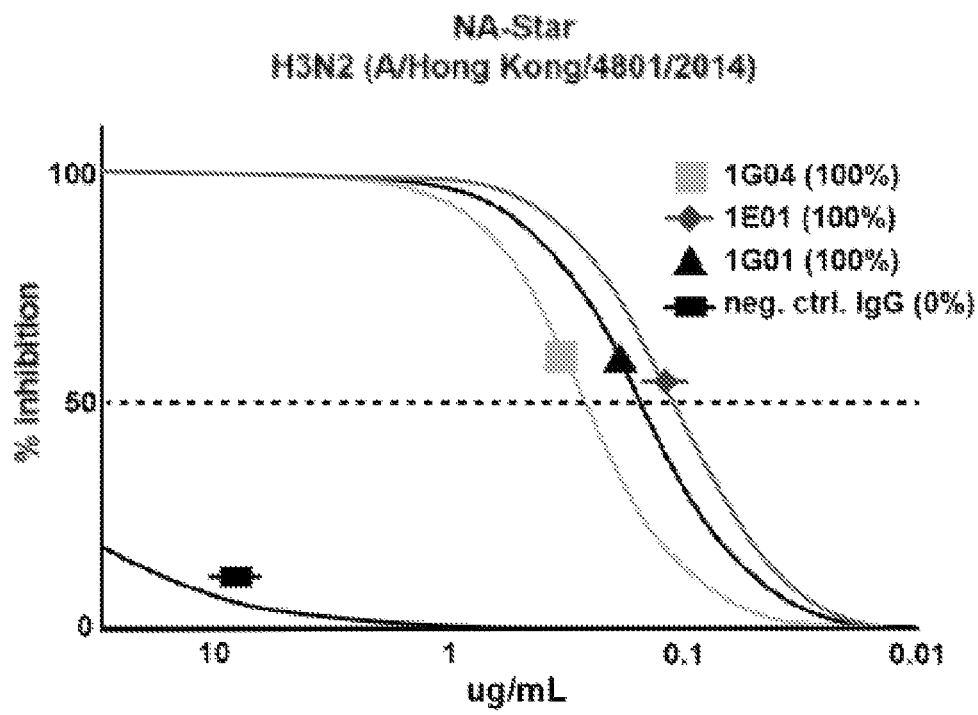
FIG. 2B shows the activity of the same mAbs against A/Hong Kong/4801/2014 in an NA star assay (small substrate, steric hindrance insensitive).
Figure 2C:
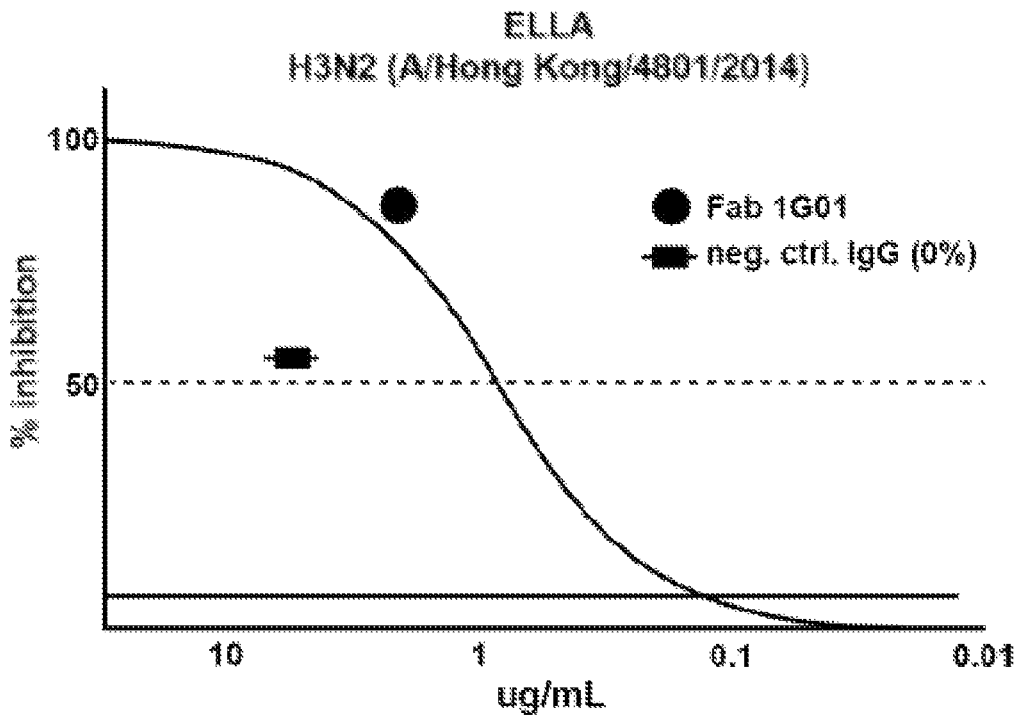
FIG. 2C shows activity of the Fab of mAb 1G01 in an ELLA assay against A/Hong Kong/4801/2014.
Figure 2D:
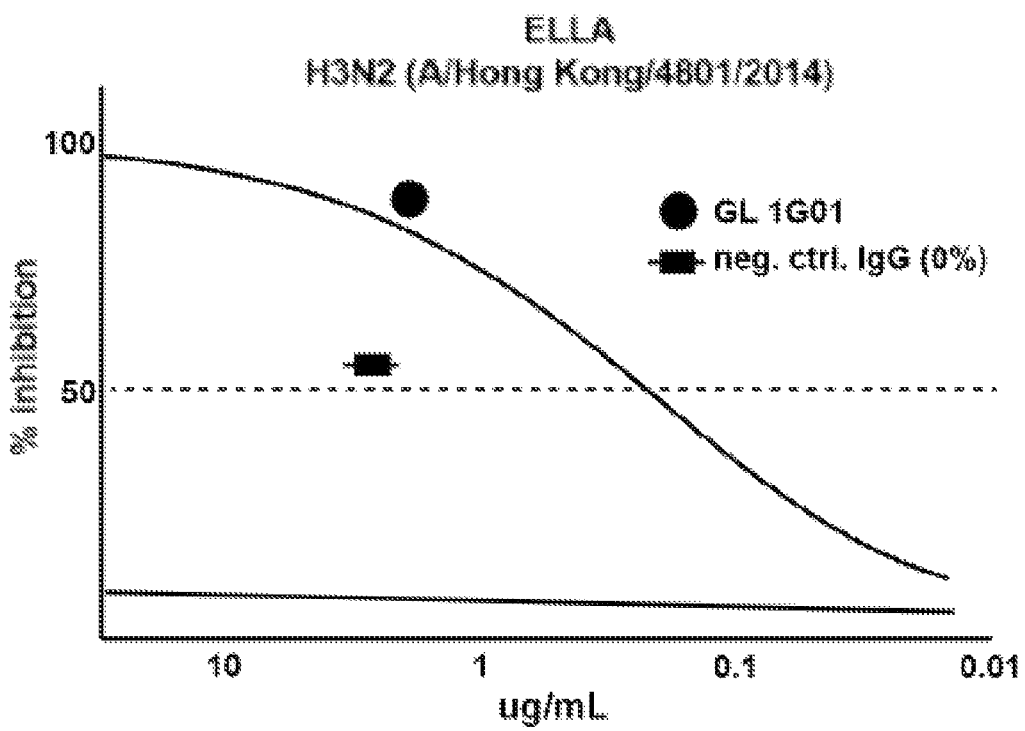
FIG. 2D shows a germline (GL) version of the three mAbs is also active against H3N2 strain A/Hong Kong/4801/2014.
Figure 2E:
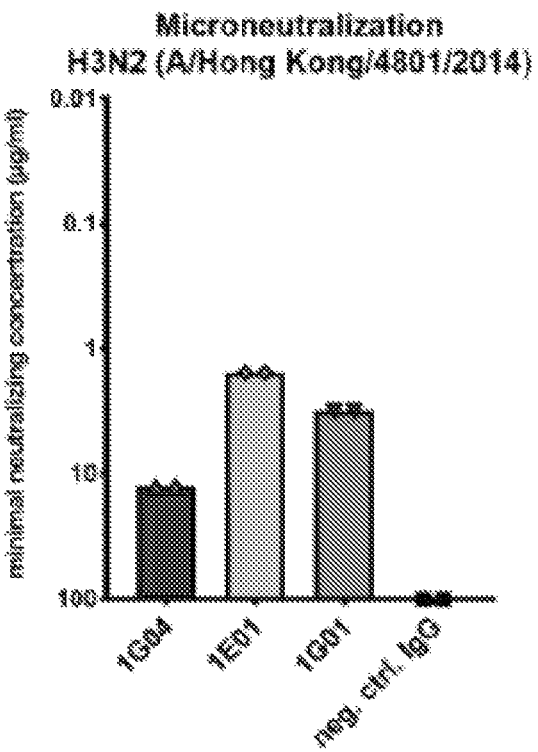
FIG. 2E shows three mAbs are active in a microneutralization assay against H3N2 strain A/Hong Kong/4801/2014.
Figure 2F:
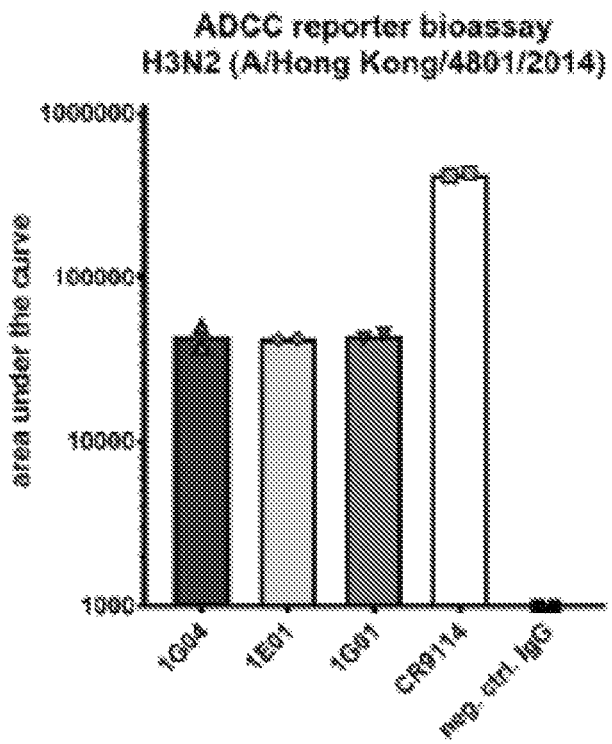
FIG. 2F shows ADCC reporter bioassay activity of the three mAbs. MAb CR9114 which has known ADCC reporter activity against H3N2 was used as positive control.
Figure 3A:
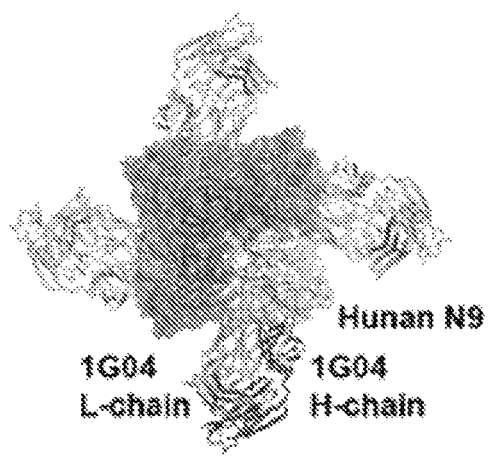
FIG. 3A shows the crystal structure of 1G04 with Hunan N9 NA at 3.45 Å resolution. Top left: the NA tetramer with one Fab bound to each protomer of the NA tetramer. Bottom left: the NA protomer with one Fab. Top right: the epitope on the NA. Bottom right: the Fab paratope on the NA. For left panels, one NA-Fab protomer is colored with NA in light grey and Fab light chain (L-chain) in light grey and Fab heavy chain (H-chain) in dark grey. The NA and Fab in the right panels are in dark grey and light grey, respectively. N-linked glycans are shown in stick representation with grey carbon atoms. Calcium ions are shown as black spheres. The molecular surface depicting the epitope is colored in black/dark grey.
Figure 3A:
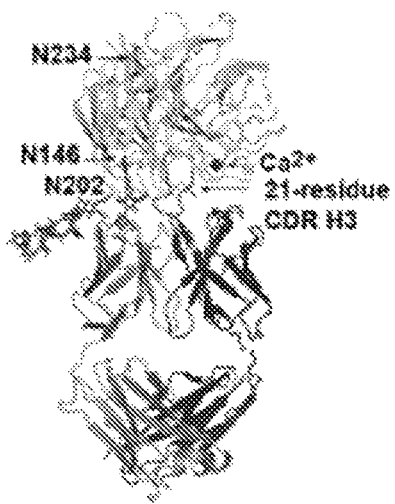
Figure 3A:
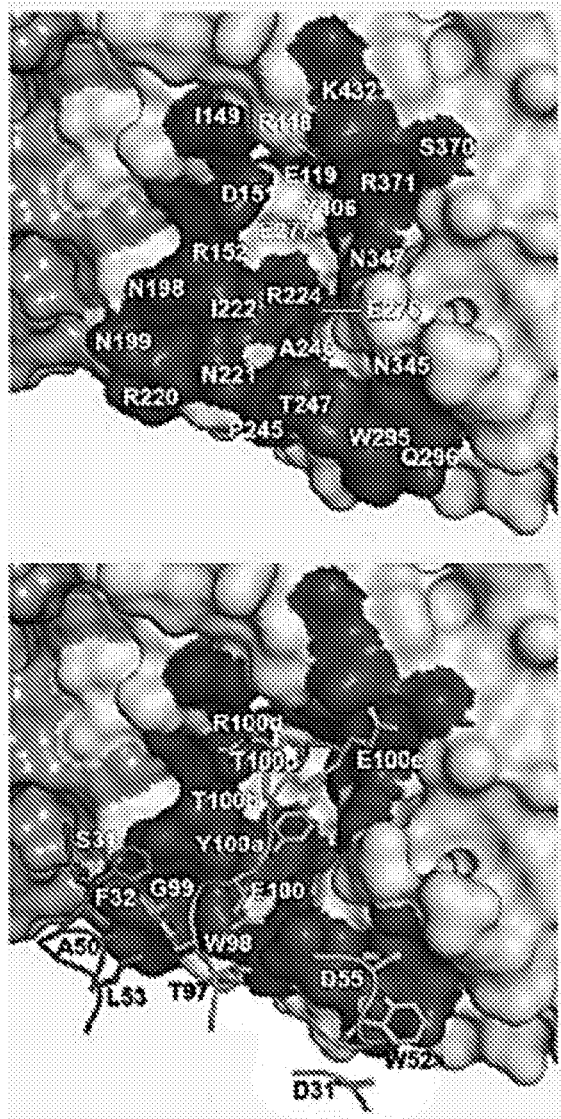
Figure 3B:
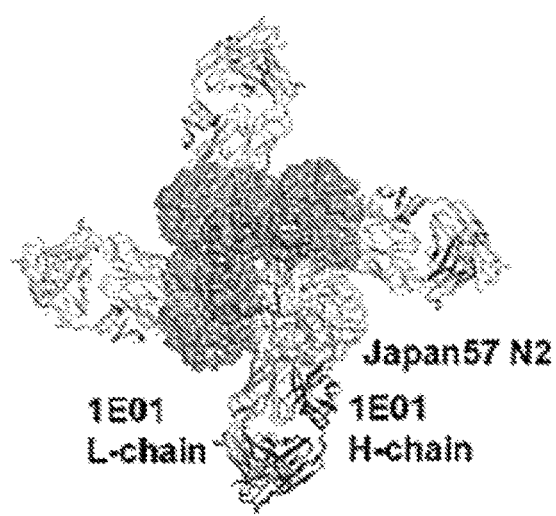
FIG. 3B shows the crystal structure of 1E01 with Japan57 N2 NA at 2.45 Å resolution. Top left: the NA tetramer with one Fab bound to each protomer of the NA tetramer. Bottom left: the NA protomer with one Fab. Top right: the epitope on the NA. Bottom right: the Fab paratope on the NA. For left panels, one NA-Fab protomer is colored with NA in light grey and Fab light chain (L-chain) in light grey and Fab heavy chain (H-chain) in dark grey. The NA and Fab in the right panels are in dark grey and light grey, respectively. N-linked glycans are shown in stick representation with grey carbon atoms. Calcium ions are shown as black spheres. The molecular surface depicting the epitope is colored in black/dark grey.
Figure 3B:
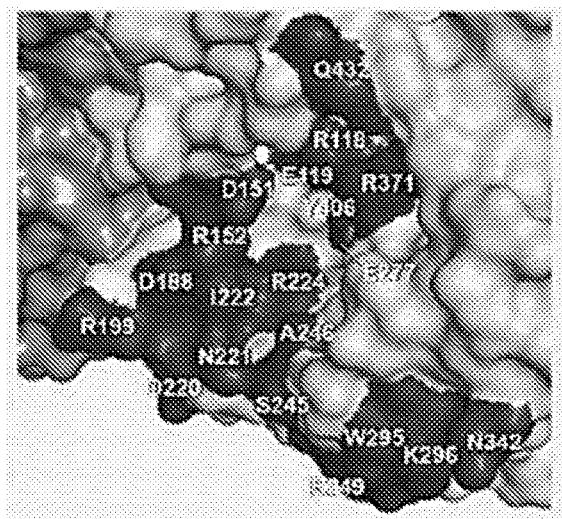
Figure 3B:
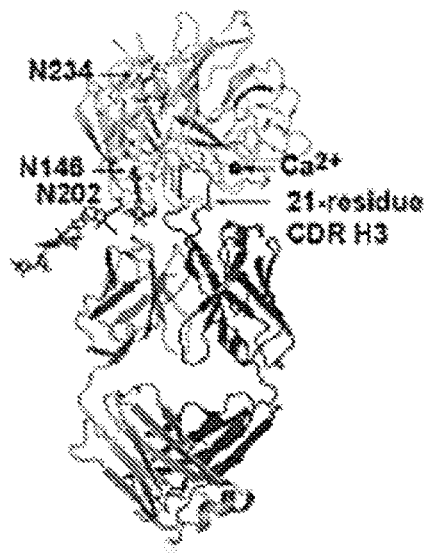
Figure 3B:
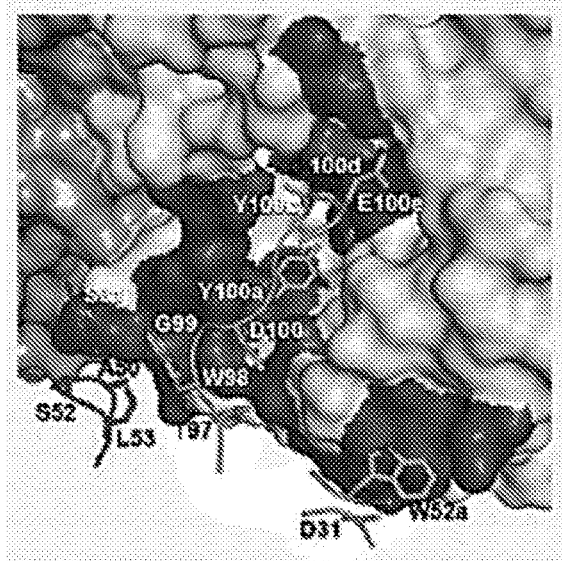
Figure 3C:
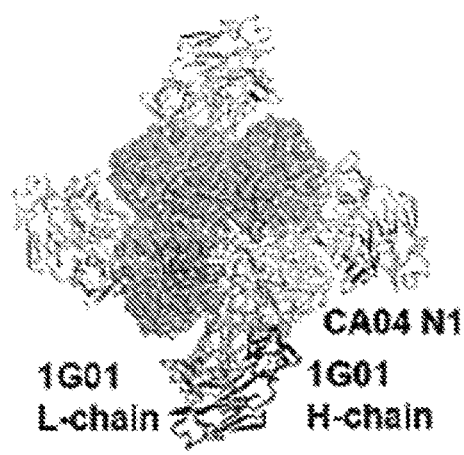
FIG. 3C shows the crystal structure of 1G01 with CA04 N1 NA at 3.27 Å resolution. Top left: the NA tetramer with one Fab bound to each protomer of the NA tetramer. Bottom left: the NA protomer with one Fab. Top right: the epitope on the NA. Bottom right: the Fab paratope on the NA. For left panels, one NA-Fab protomer is colored with NA in light grey and Fab light chain (L-chain) in light grey and Fab heavy chain (H-chain) in dark grey. The NA and Fab in the right panels are in dark grey and light grey, respectively. N-linked glycans are shown in stick representation with grey carbon atoms. Calcium ions are shown as black spheres. The molecular surface depicting the epitope is colored in black/dark grey.
Figure 3C:
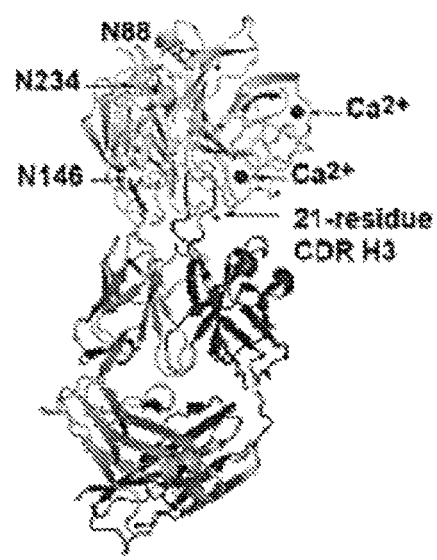
Figure 3C:
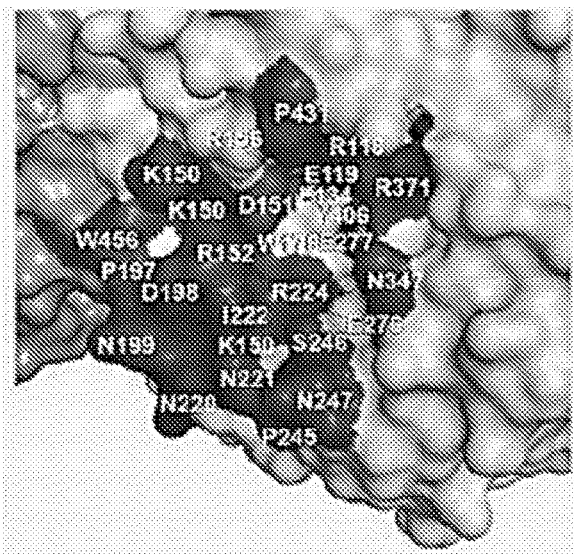
Figure 3C:
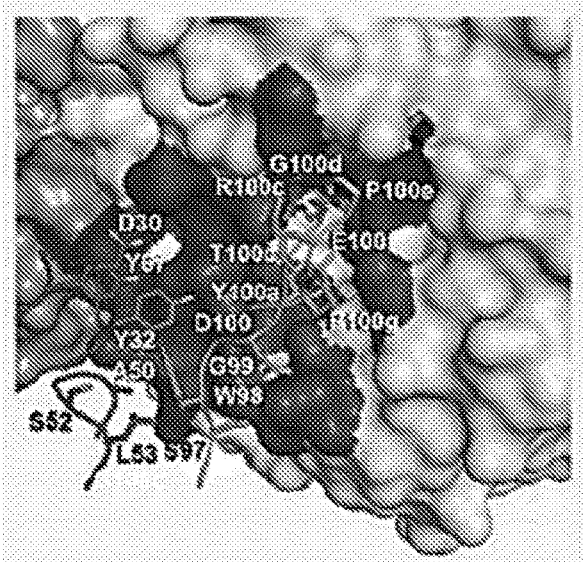
Figure 4A:
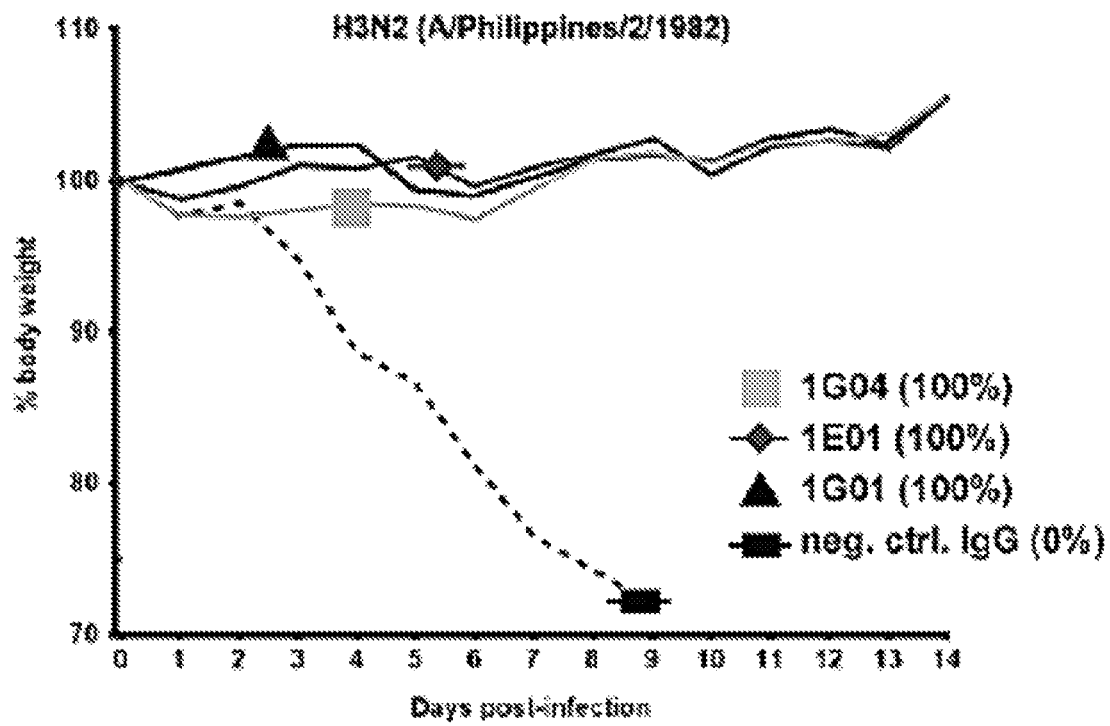
FIG. 4A shows the efficacy of the three mAbs in a mouse model against challenge with a virus expressing a group 2 neuraminidase (N2). Animals were treated with 5 mg/kg of mAbs intraperitoneally 2 hours before intranasal virus challenge. Five animals per group were used. Percent weight loss is shown and percent survival is indicated in the figure legend.
Figure 4B:
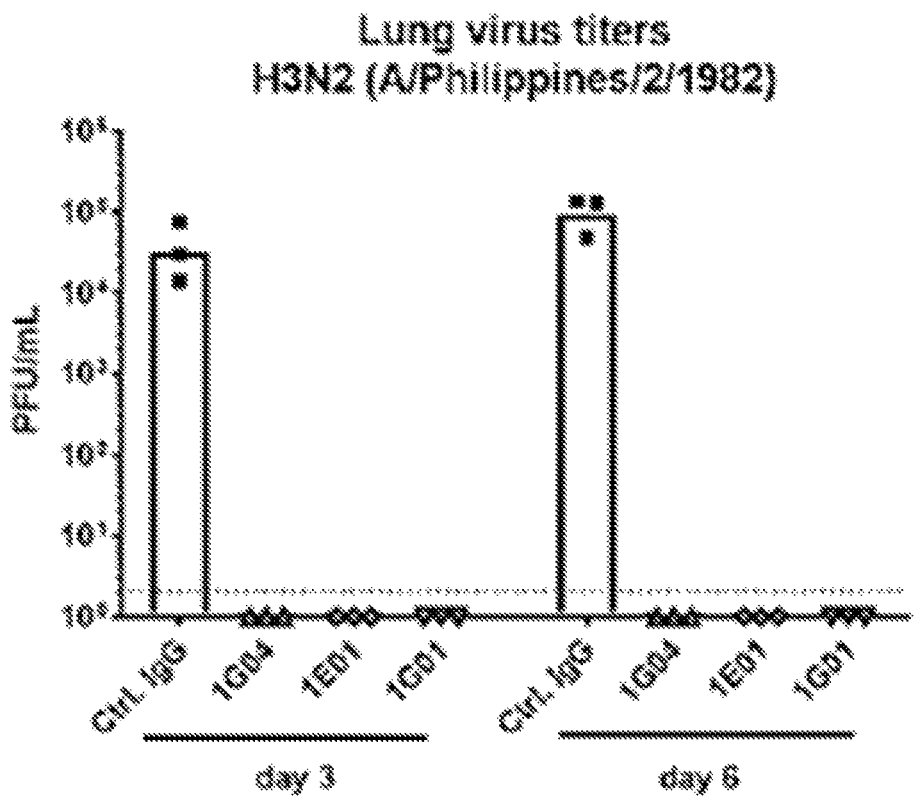
FIG. 4B shows lung titers of animals treated prophylactically with mAbs (as described for FIG. 4A) on day 3 and day 6 post infection. Three mice per group were used.
Figure 4C:
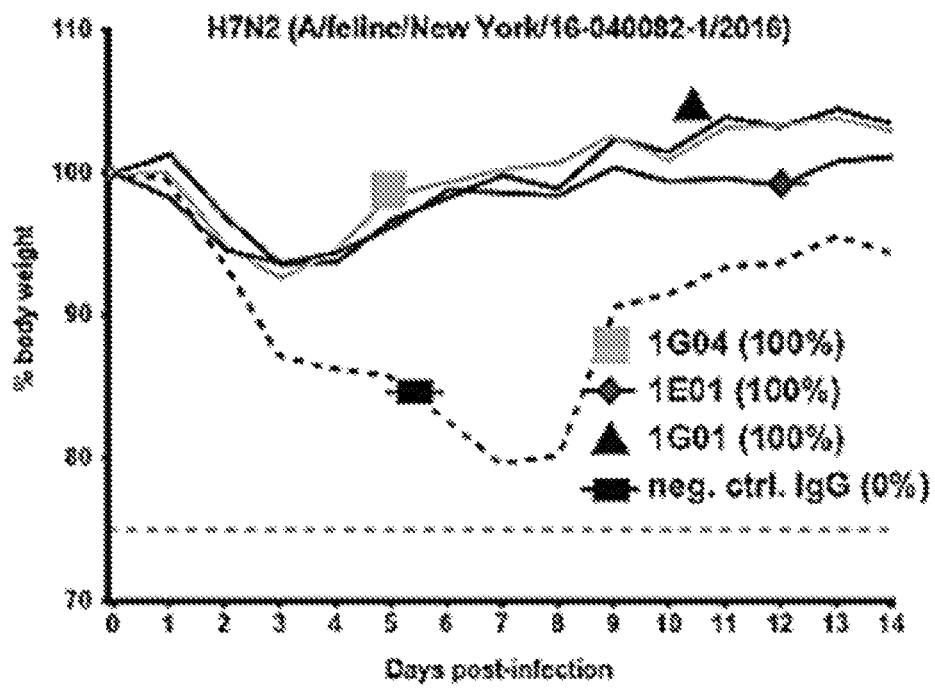
FIG. 4C shows the efficacy of the three mAbs in a mouse model against challenge with a virus expressing a group 2 neuraminidase (N2). Animals were treated with 5 mg/kg of mAbs intraperitoneally 2 hours before intranasal virus challenge. Five animals per group were used. Percent weight loss is shown and percent survival is indicated in the figure legend.
Figure 4D:
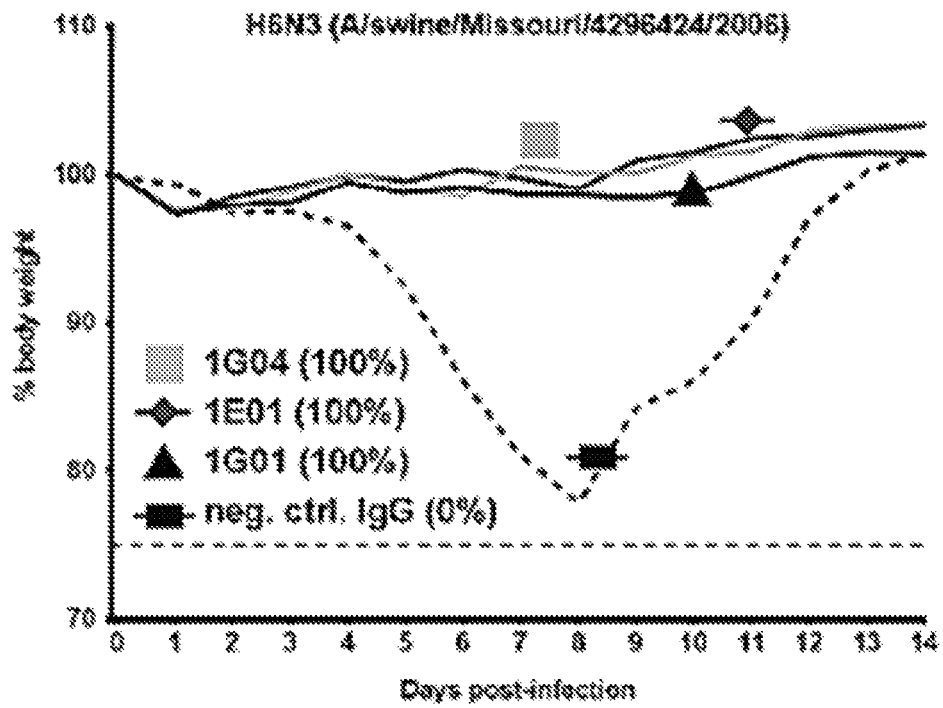
FIG. 4D shows the efficacy of the three mAbs in a mouse model against challenge with a virus expressing a group 2 neuraminidase (N3). Animals were treated with 5 mg/kg of mAbs intraperitoneally 2 hours before intranasal virus challenge. Five animals per group were used. Percent weight loss is shown and percent survival is indicated in the figure legend.
Figure 4E:
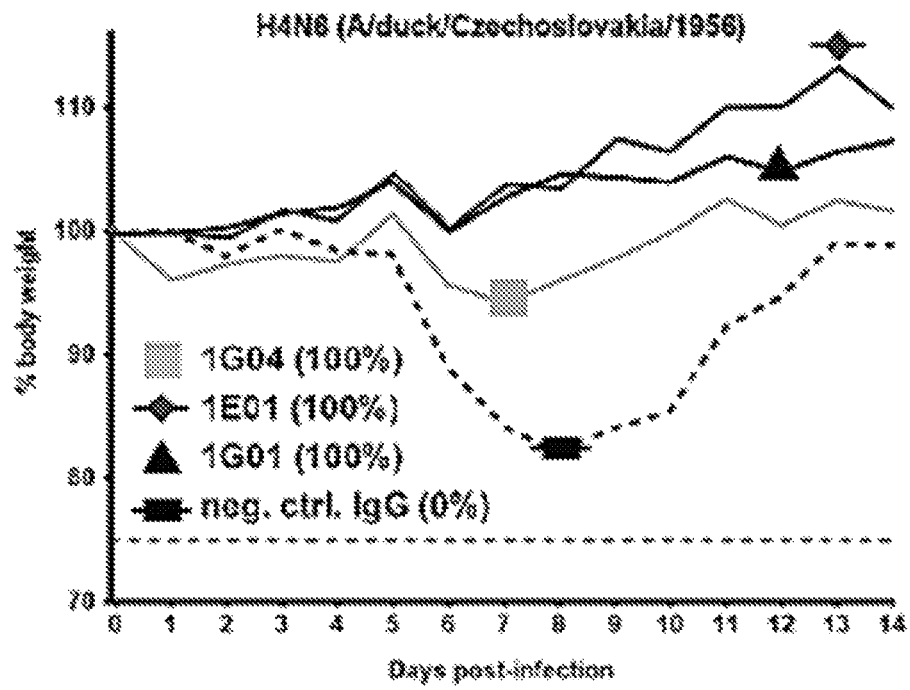
FIG. 4E shows the efficacy of the three mAbs in a mouse model against challenge with a virus expressing a group 2 neuraminidase (N6). Animals were treated with 5 mg/kg of mAbs intraperitoneally 2 hours before intranasal virus challenge. Five animals per group were used. Percent weight loss is shown and percent survival is indicated in the figure legend.
Figure 4F:
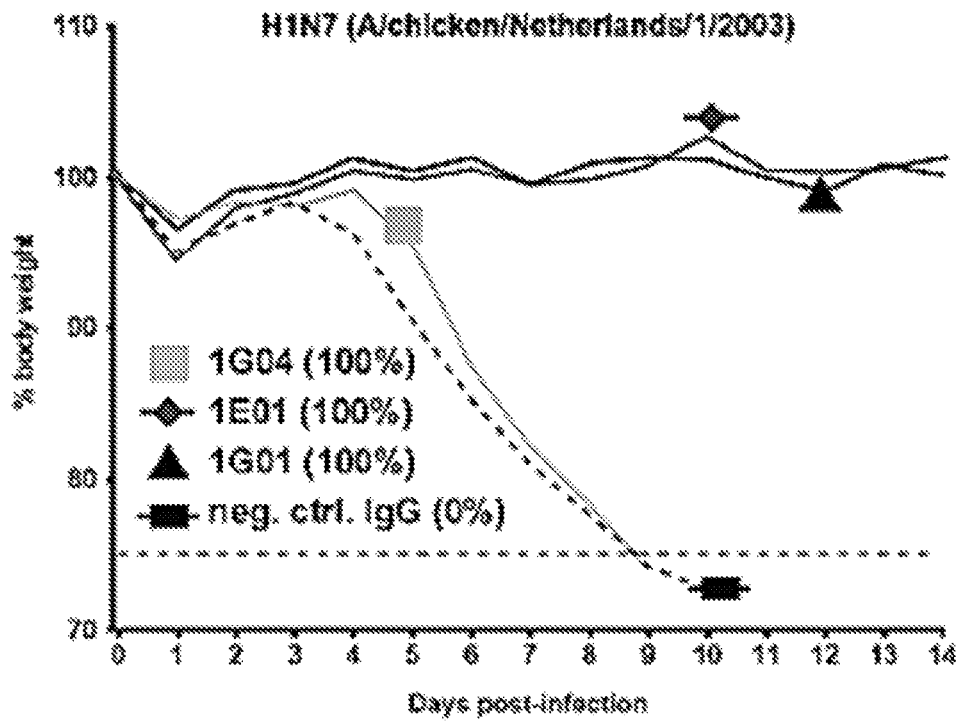
FIG. 4F shows the efficacy of the three mAbs in a mouse model against challenge with a virus expressing a group 2 neuraminidase (N7). Animals were treated with 5 mg/kg of mAbs intraperitoneally 2 hours before intranasal virus challenge. Five animals per group were used. Percent weight loss is shown and percent survival is indicated in the figure legend.
Figure 4G:
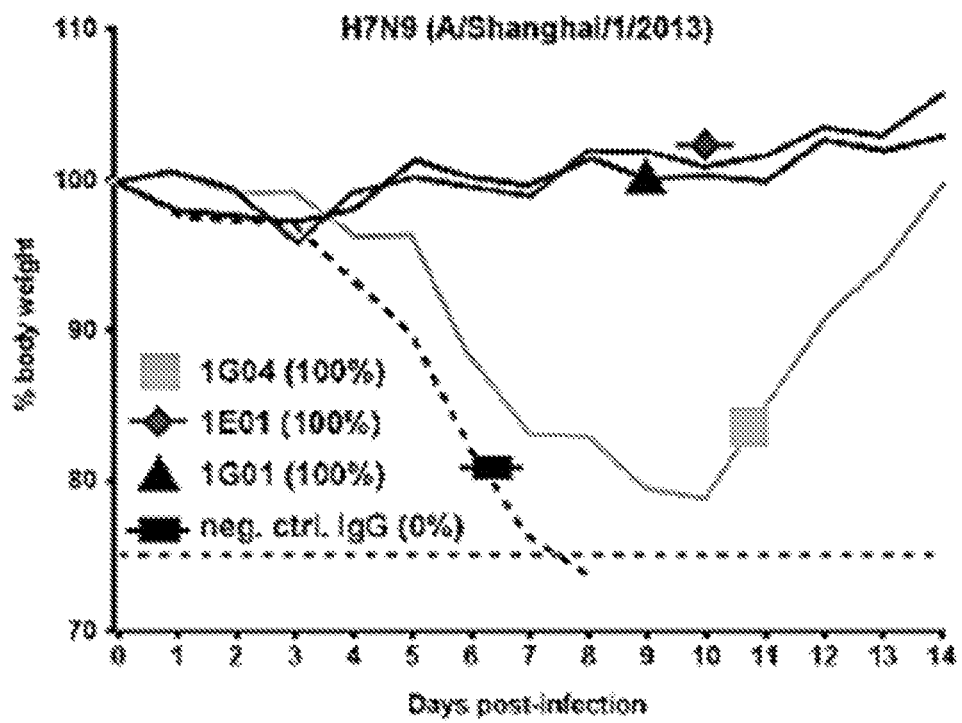
FIG. 4G shows the efficacy of the three mAbs in a mouse model against challenge with a virus expressing a group 2 neuraminidase (N9). Animals were treated with 5 mg/kg of mAbs intraperitoneally 2 hours before intranasal virus challenge. Five animals per group were used. Percent weight loss is shown and percent survival is indicated in the figure legend.
Figure 4H:
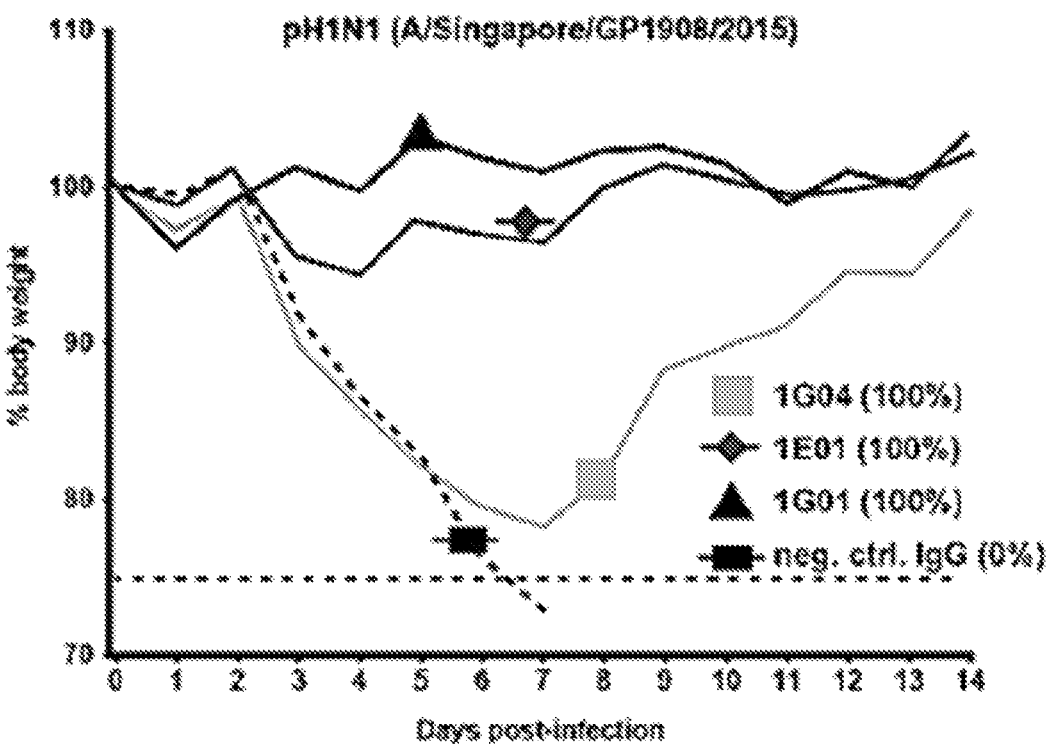
FIG. 4H shows the efficacy of the three mAbs in a mouse model against challenge with a virus expressing a group 1 neuraminidase (N1). Animals were treated with 5 mg/kg of mAbs intraperitoneally 2 hours before intranasal virus challenge. Five animals per group were used. Percent weight loss is shown and percent survival is indicated in the figure legend.
Figure 4I:
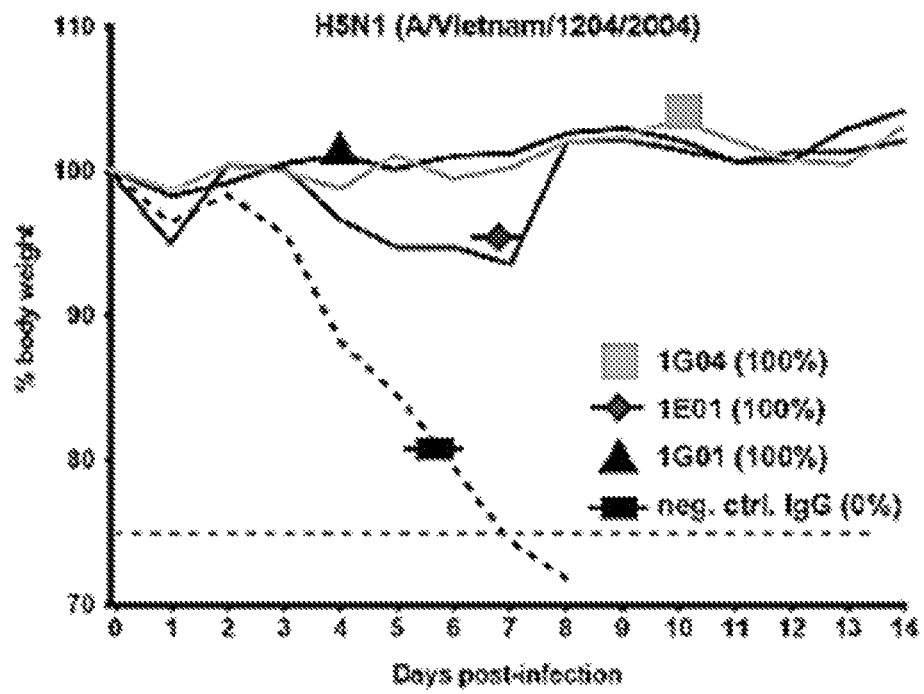
FIG. 4I shows the efficacy of the three mAbs in a mouse model against challenge with a virus expressing a group 1 neuraminidase (N1). Animals were treated with 5 mg/kg of mAbs intraperitoneally 2 hours before intranasal virus challenge. Five animals per group were used. Percent weight loss is shown and percent survival is indicated in the figure legend.
Figure 4J:
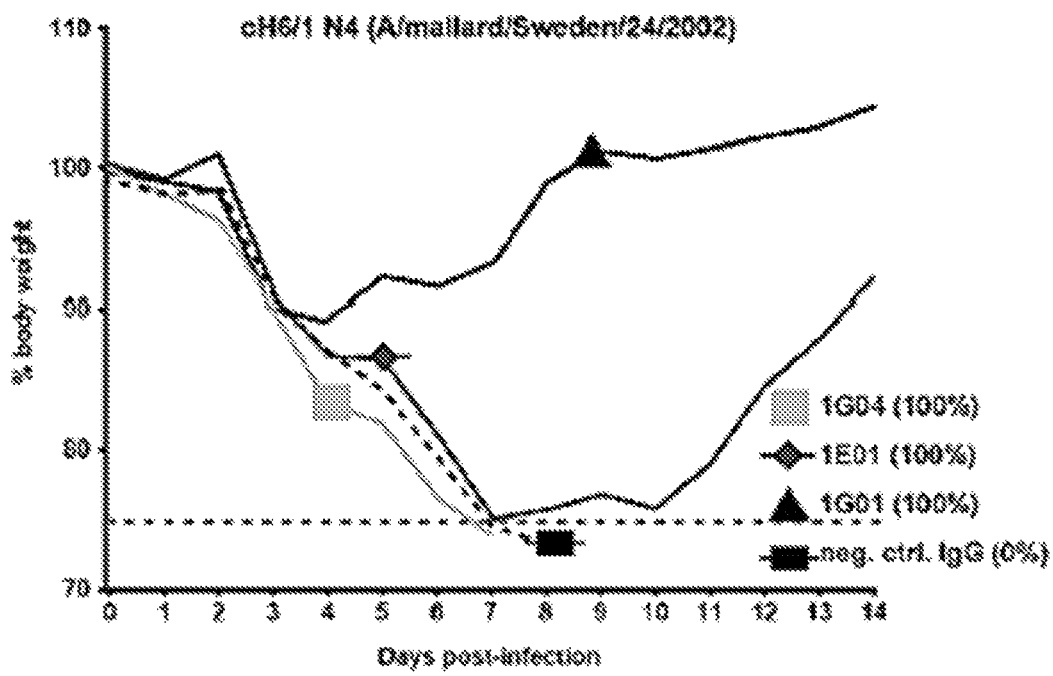
FIG. 4J shows the efficacy of the three mAbs in a mouse model against challenge with a virus expressing a group 1 neuraminidase (N4). Animals were treated with 5 mg/kg of mAbs intraperitoneally 2 hours before intranasal virus challenge. Five animals per group were used. Percent weight loss is shown and percent survival is indicated in the figure legend.
Figure 4K:
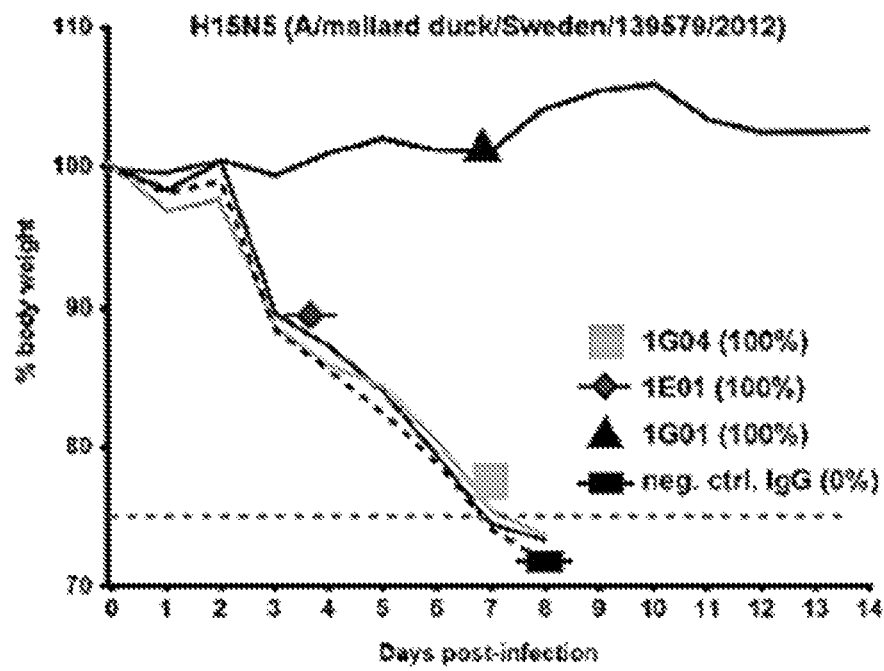
FIG. 4K shows the efficacy of the three mAbs in a mouse model against challenge with a virus expressing a group 1 neuraminidase (N5). Animals were treated with 5 mg/kg of mAbs intraperitoneally 2 hours before intranasal virus challenge. Five animals per group were used. Percent weight loss is shown and percent survival is indicated in the figure legend.
Figure 4L:
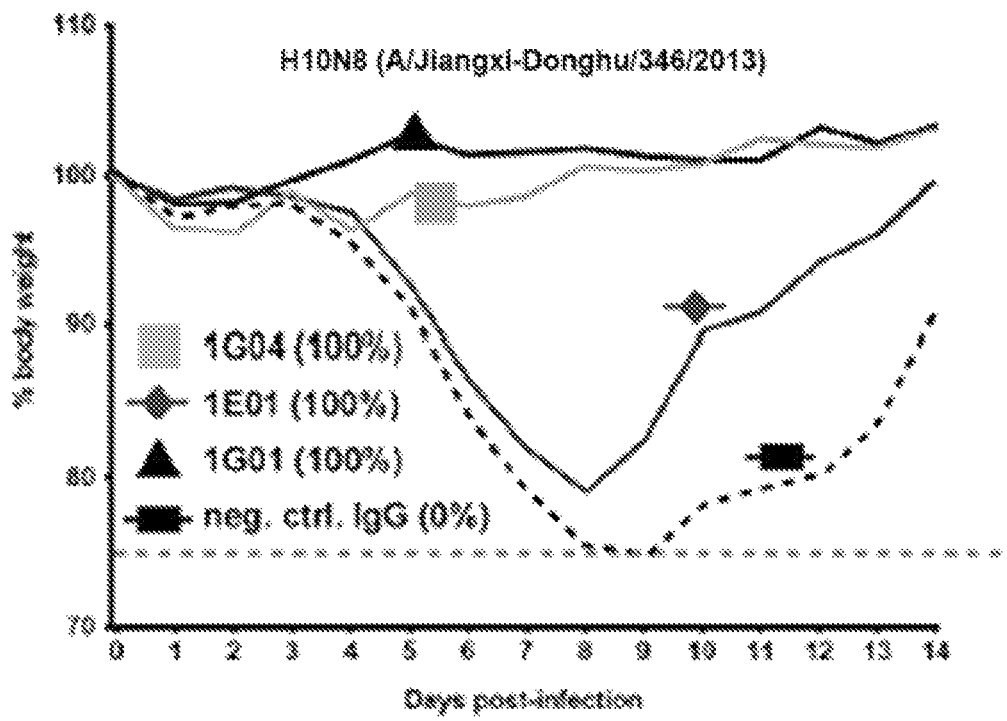
FIG. 4L shows the efficacy of the three mAbs in a mouse model against challenge with a virus expressing a group 1 neuraminidase (N8). Animals were treated with 5 mg/kg of mAbs intraperitoneally 2 hours before intranasal virus challenge. Five animals per group were used. Percent weight loss is shown and percent survival is indicated in the figure legend.
Figure 4M:
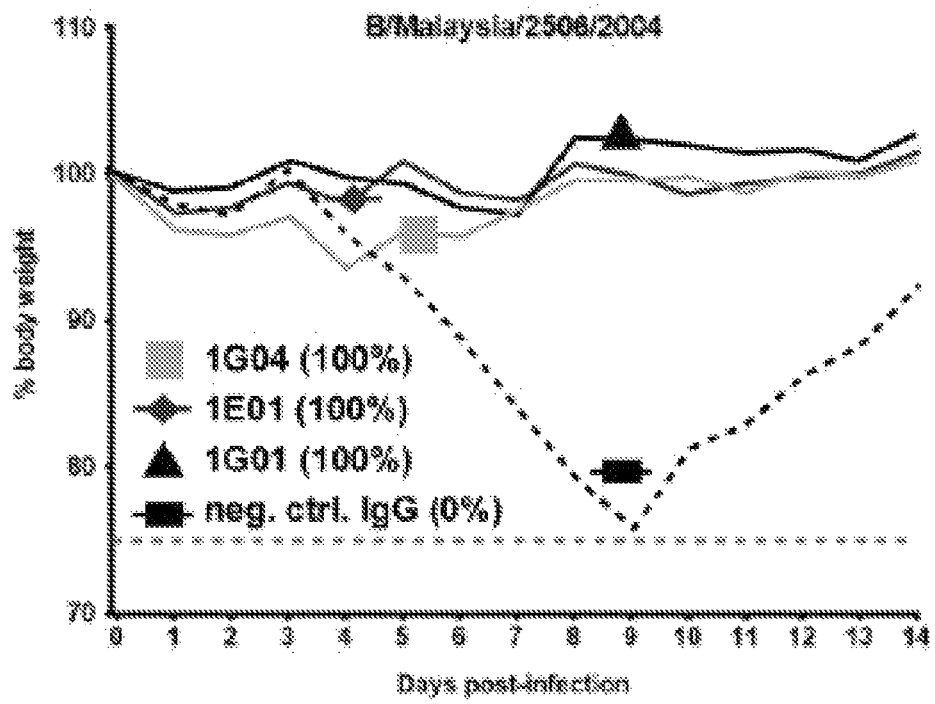
FIG. 4M shows the efficacy of the three mAbs in a mouse model against challenge with a virus expressing an influenza B virus neuraminidase. Animals were treated with 5 mg/kg of mAbs. Percent weight loss is shown and percent survival is indicated in the respective figure legends intraperitoneally 2 hours before intranasal virus challenge. Five animals per group were used. Percent weight loss is shown and percent survival is indicated in the figure legend.
Figure 4N:
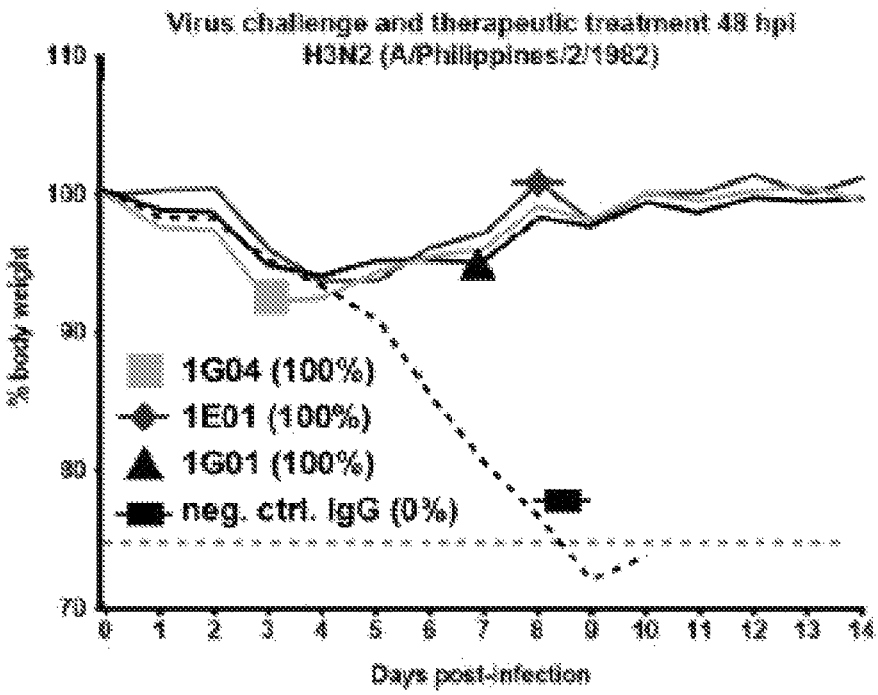
FIG. 4N shows the efficacy of the three mAbs in a mouse model against challenge with a virus expressing a group 2 neuraminidase (N2). Animals were treated with 5 mg/kg of mAb 48 hours post infection. Five animals per group were used. Percent weight loss is shown and percent survival is indicated in the figure legend.
Figure 4O:
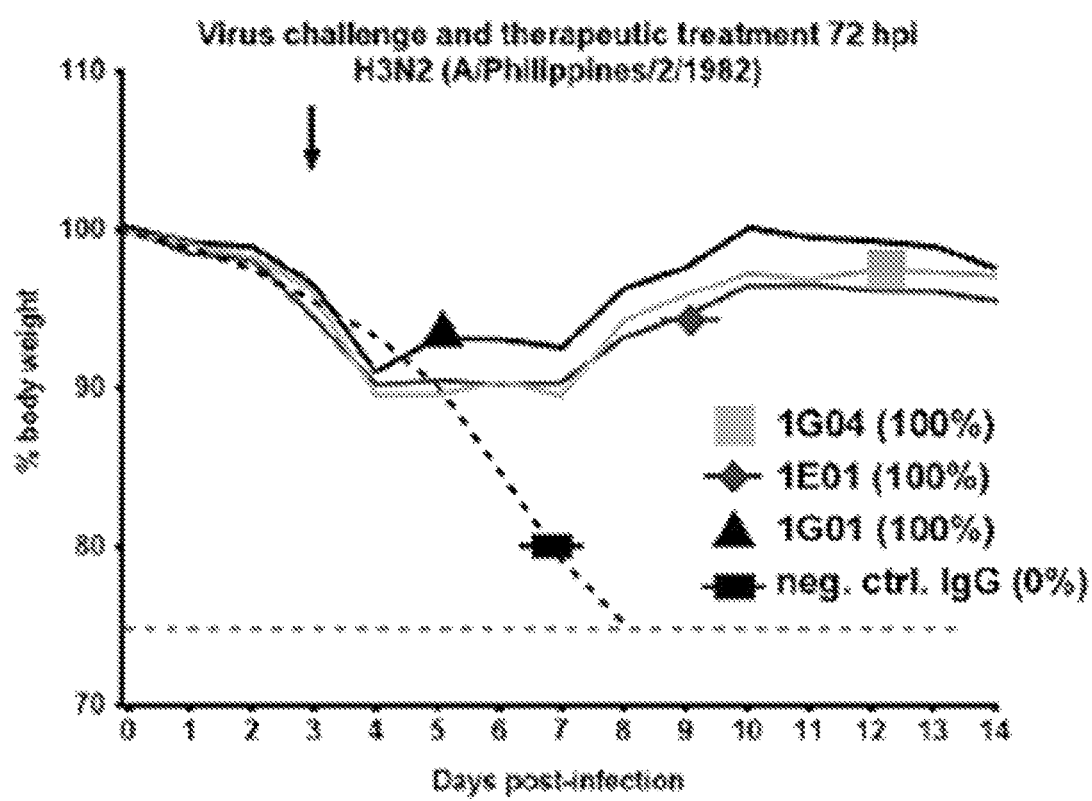
FIG. 4O shows the efficacy of the three mAbs in a mouse model against challenge with a virus expressing a group 2 neuraminidase (N2). Animals were treated with 5 mg/kg of mAbs 72 hours post infection. Five animals per group were used. Percent weight loss is shown and percent survival is indicated in the figure legend.
Figure 5:
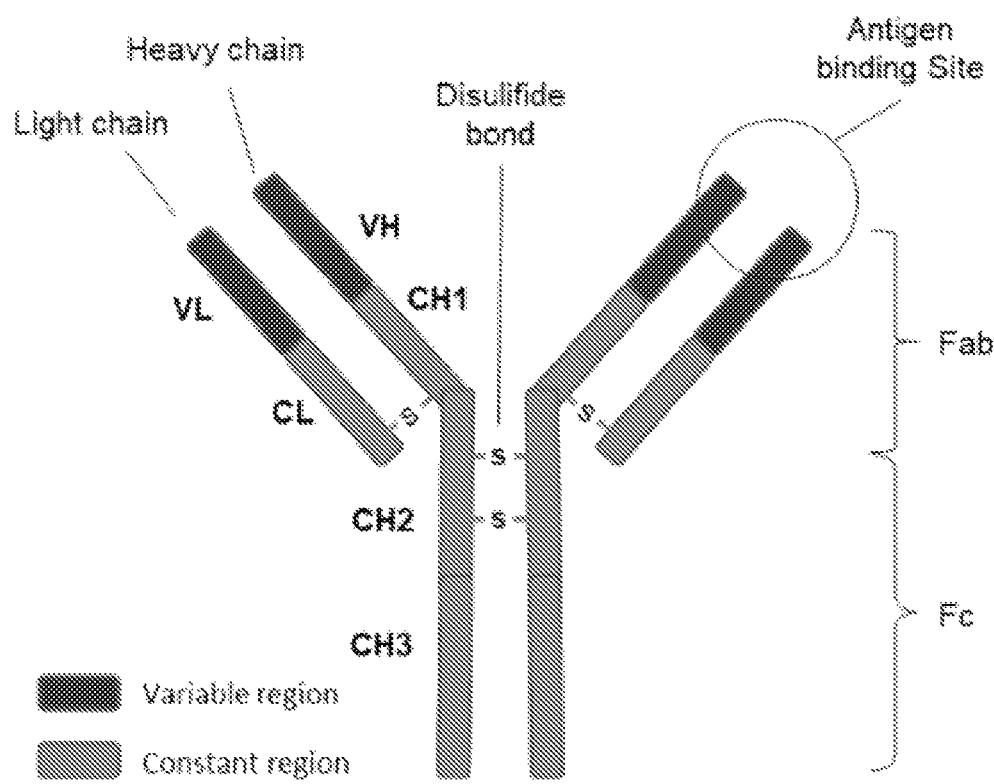
FIG. 5 shows the general structure of an IgG antibody.
Figure 6A:
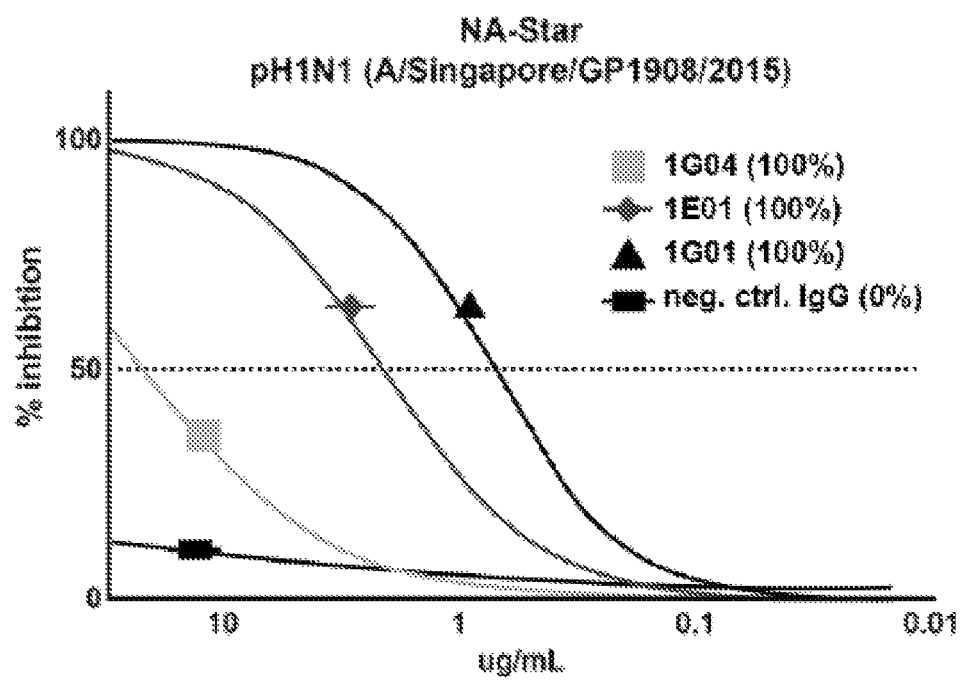
FIG. 6A shows the inhibitory effect of mAbs 1G04, 1E01 and 1G01 against (A) pH1N1 A/Singapore/GP1908/2015 in a small substrate NA CDRH1, and CDRH2 or towards the perimeter in the panel labeled CDRH3). Hydrogen bonds or salt bridges are in black dotted lines.
Figure 6B:
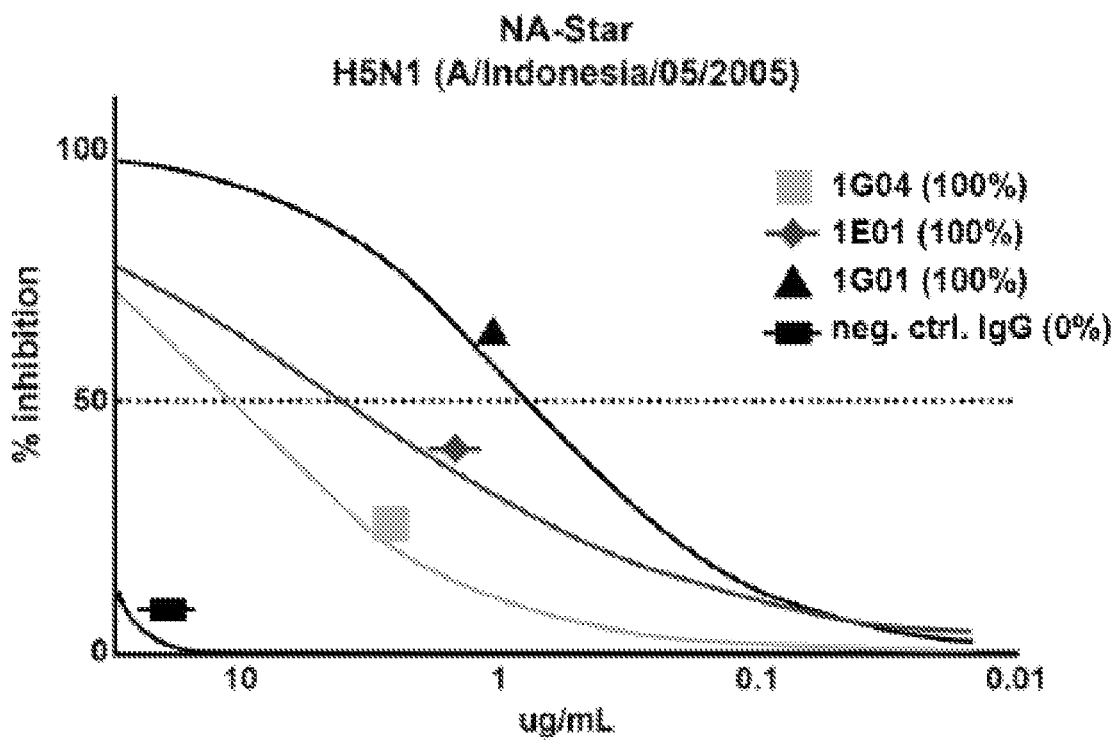
Figure 6C:
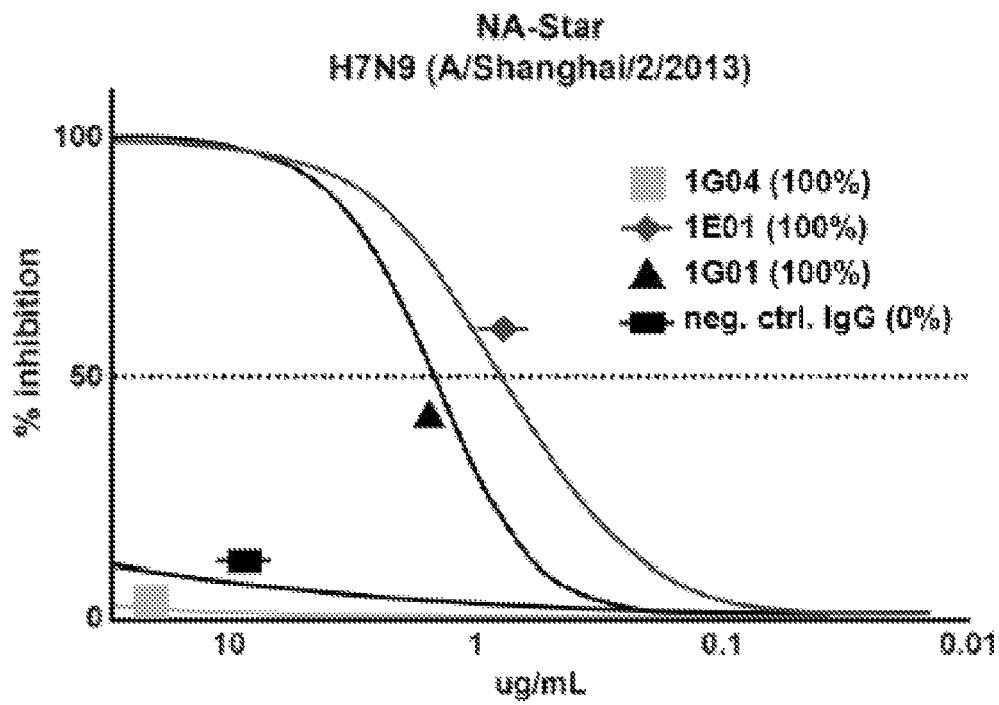
Figure 6D:
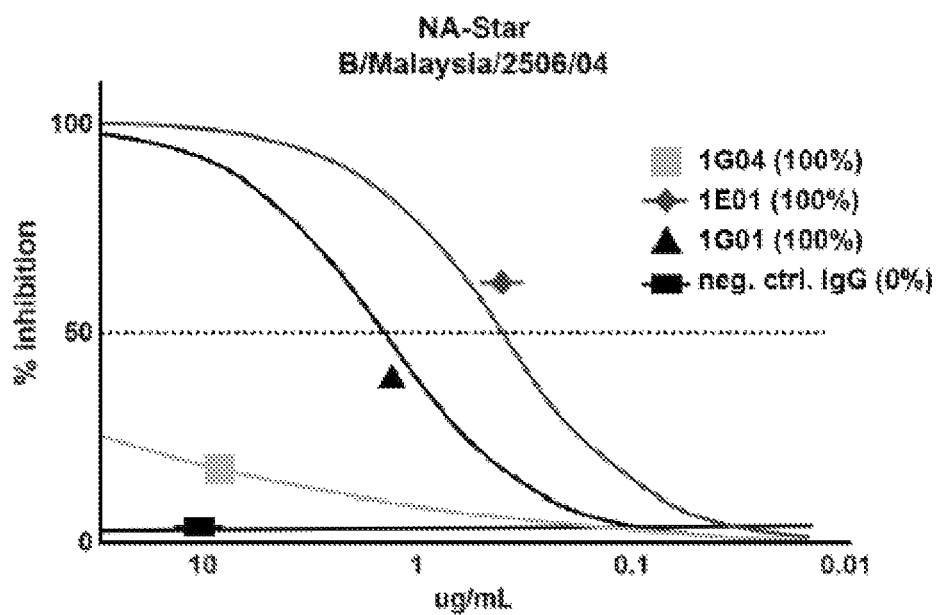

We next examined the functional capacity of the three mAbs in an enzyme linked lectin assay (ELLA) that measures neuraminidase inhibition (NI) (FIGS. 1D and 2A). The virus strains assessed are listed in Table 6, below. 1G04 inhibited N2, N3 and certain N1 NAs, while 1E01 inhibited group 2 NAs, N1 and B/Victoria/2/87 lineage NAs. 1G01 remarkably inhibited the activity of all A/group 2 and group 1 NAs and B/Victoria/2/87 lineage NA (FIGS. 1D and 2A). NA activity can be inhibited by antibodies binding directly to epitopes within the enzyme active site or through steric hindrance when antibodies bind proximal to the active site. However, NI through steric hindrance is only observed in the ELLA when large natural substrates like fetuin are used. When small molecules are used as substrate, like in an NA-Star assay, antibodies that do not bind directly to the active site do not inhibit (9, 10). When tested in the NA-Star assay, all three mAbs potently inhibited NA activity, hinting at a binding footprint within the NA active site (FIG. 2B and FIGS. 6A-6D). For 1G01, this was further confirmed using the antigen-binding fragment (Fab) instead of the full antibody in ELLA that also removes a possible contribution of steric hindrance to inhibition. The 1G01 Fab still showed potent inhibition further suggesting that the antibody may be directly targeting the active site (FIG. 2C). Interestingly, a germline version of these three mAbs also potently inhibited NA activity in the ELLA assays (FIG. 2D).

Figure 7A:
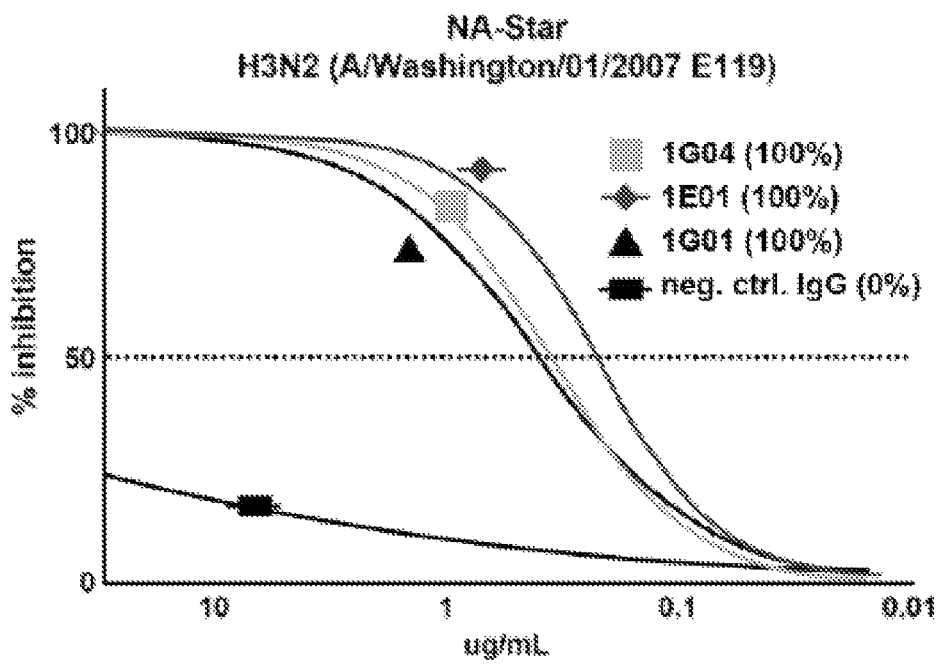
Figure 7B:
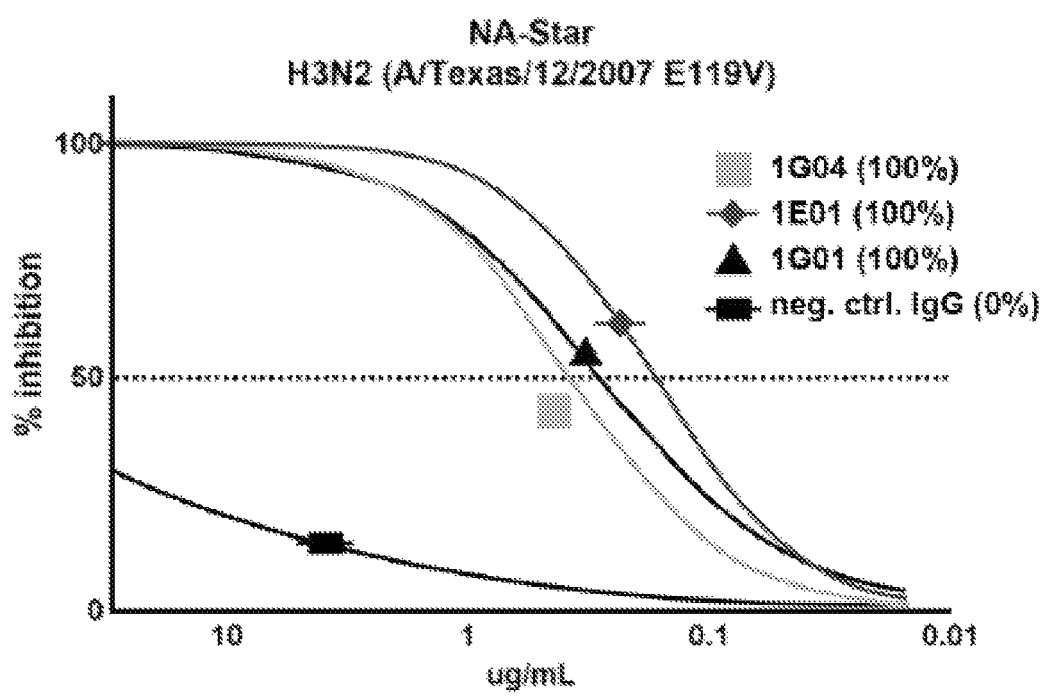
Figure 8A:
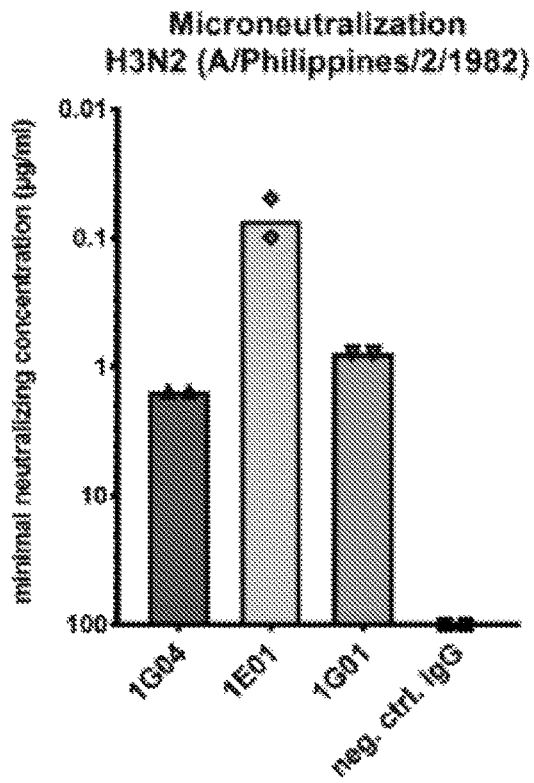
Figure 8B:
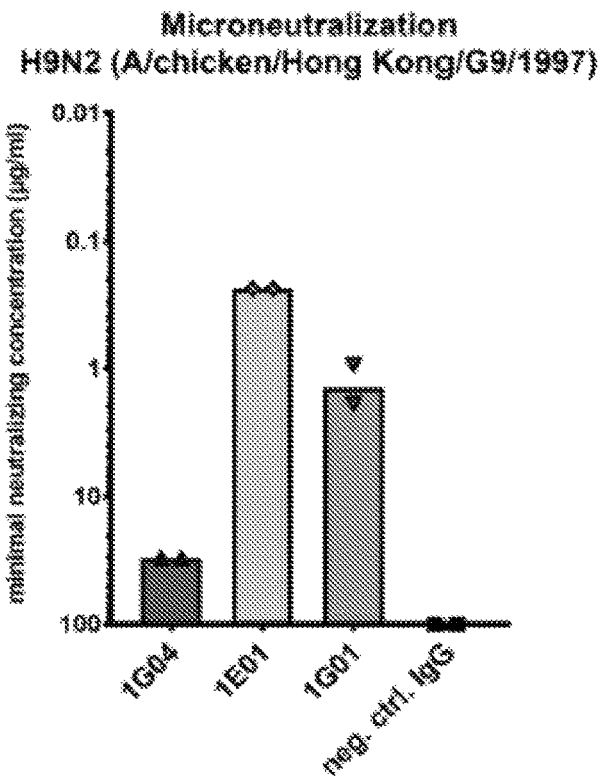
Figure 8C:
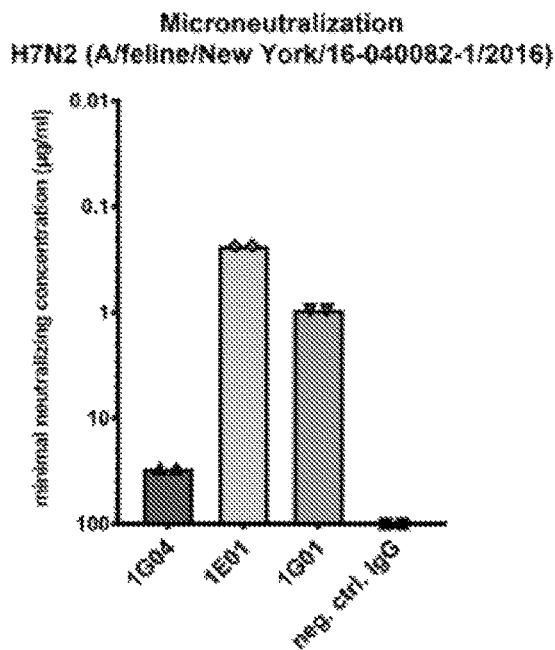
Figure 9A:
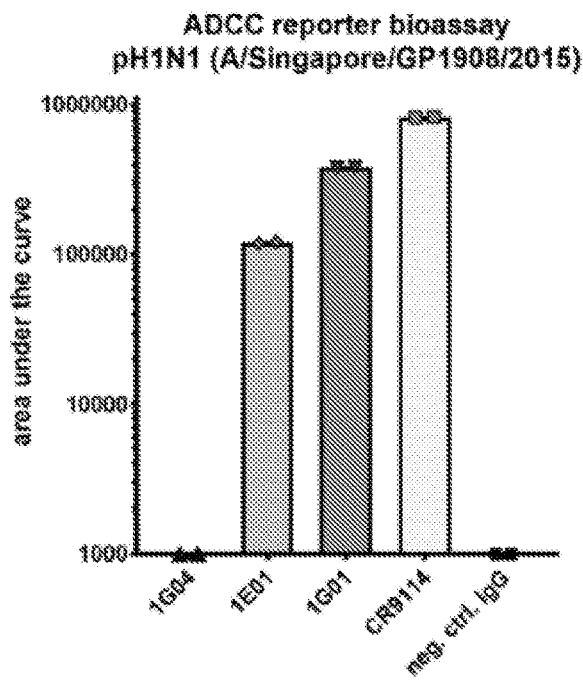
Figure 9B:
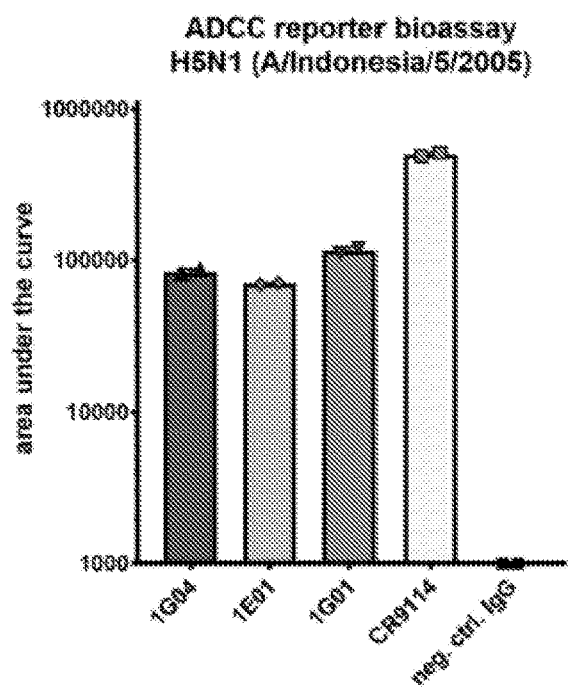
Figure 9C:
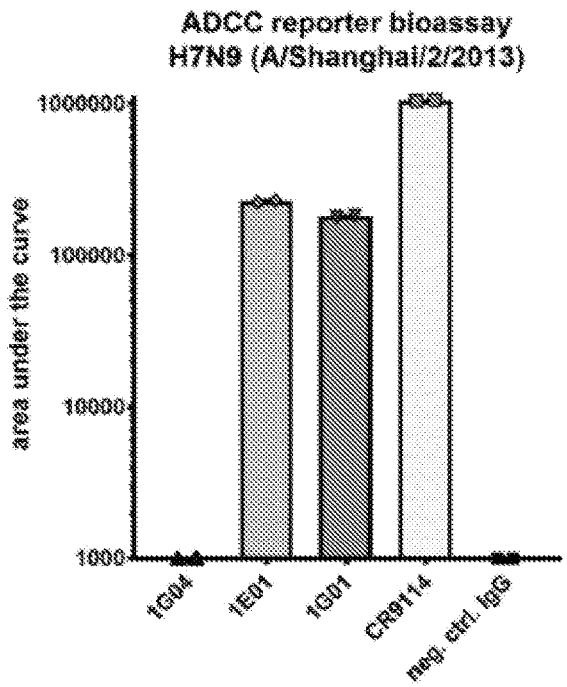
Figure 9D:
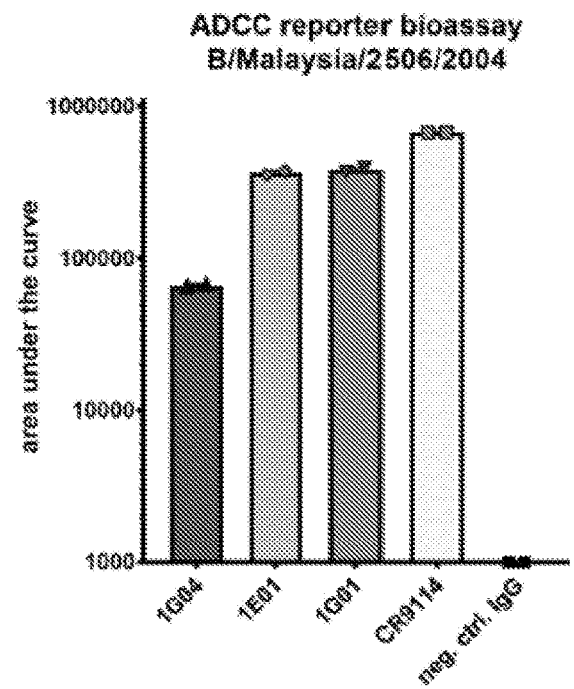
Figure 10:
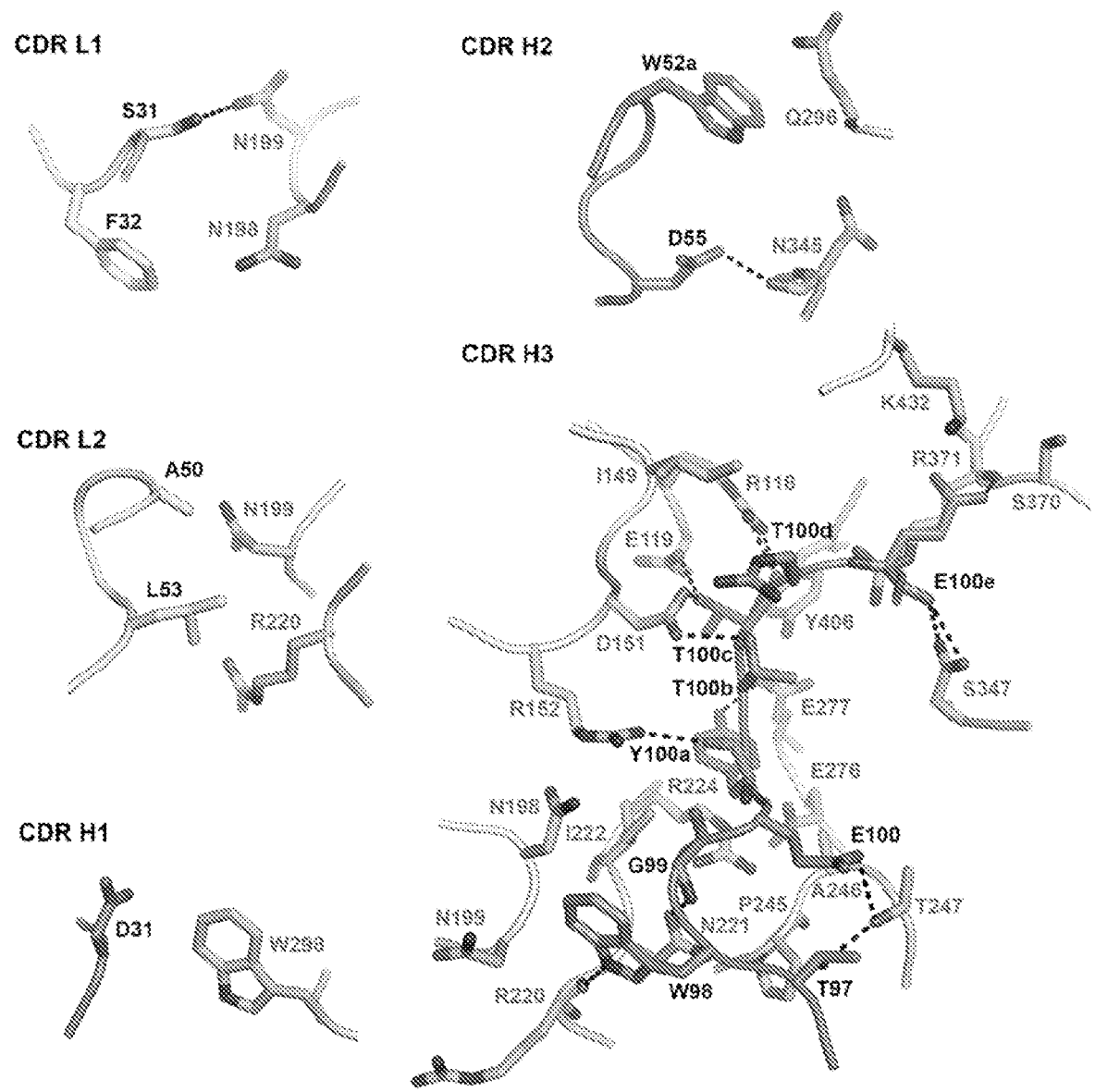
Figure 11:
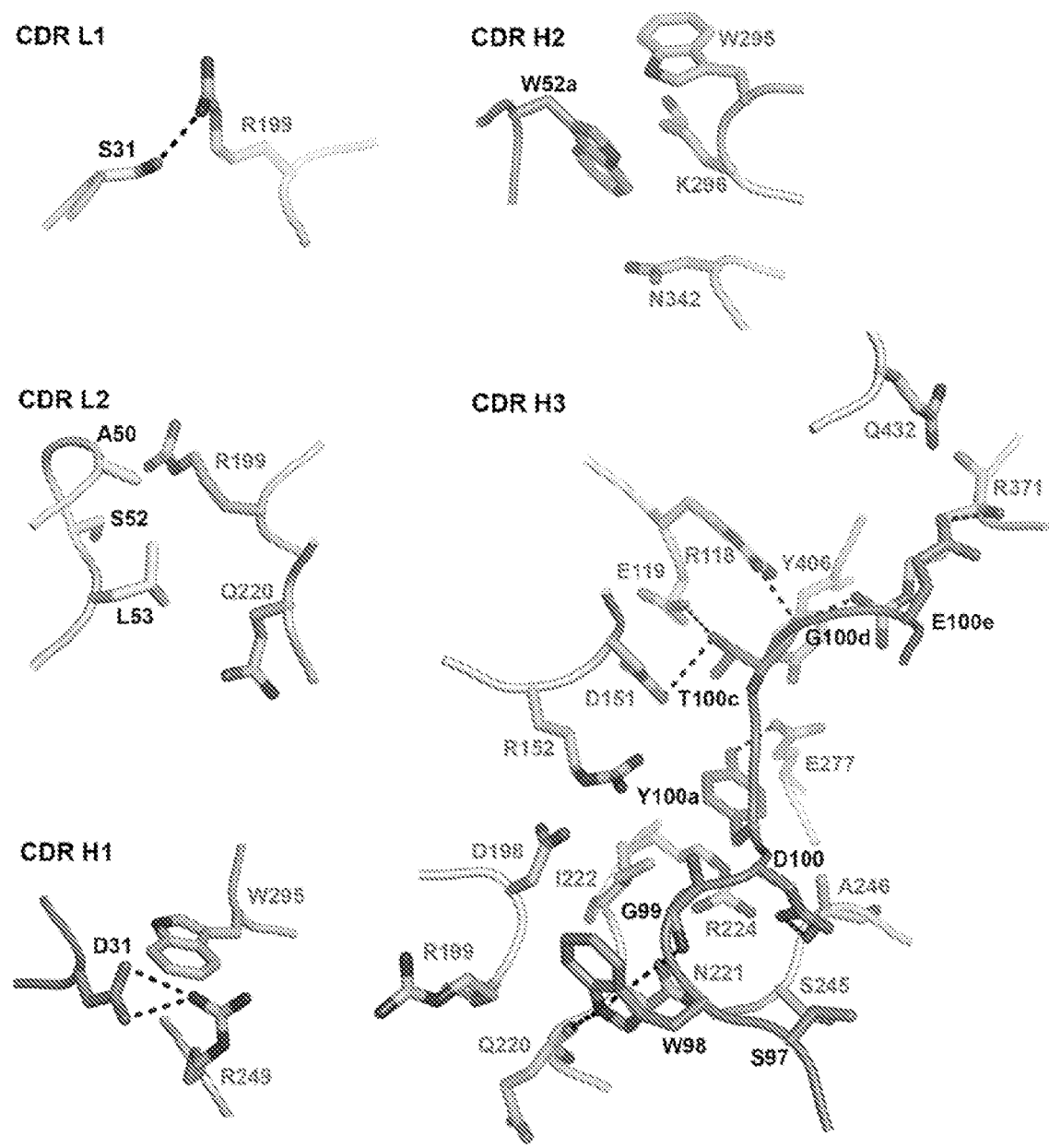
FIG. 11. Interaction of 1E01 Fab CDRs with Japan57 N2 NA from the crystal structure at 2.45 A resolution. 1E01 light chain is shown in light grey carbon atoms (to the left in each panel labeled CDRL1 or CDRL2), and heavy chain in grey carbon atoms (to the left in each panel labeled CDRH1 and CDRH2, or in the center of panel labeled CDR H3). The NA side-chains are shown in dark grey carbon atoms (to the right in panels labeled CDRL1, CDRL2, CDRH1, and CDRH2 or towards the perimeter in the panel labeled CDRH3). Hydrogen bonds or salt bridges are in black dotted lines.
Figure 12:
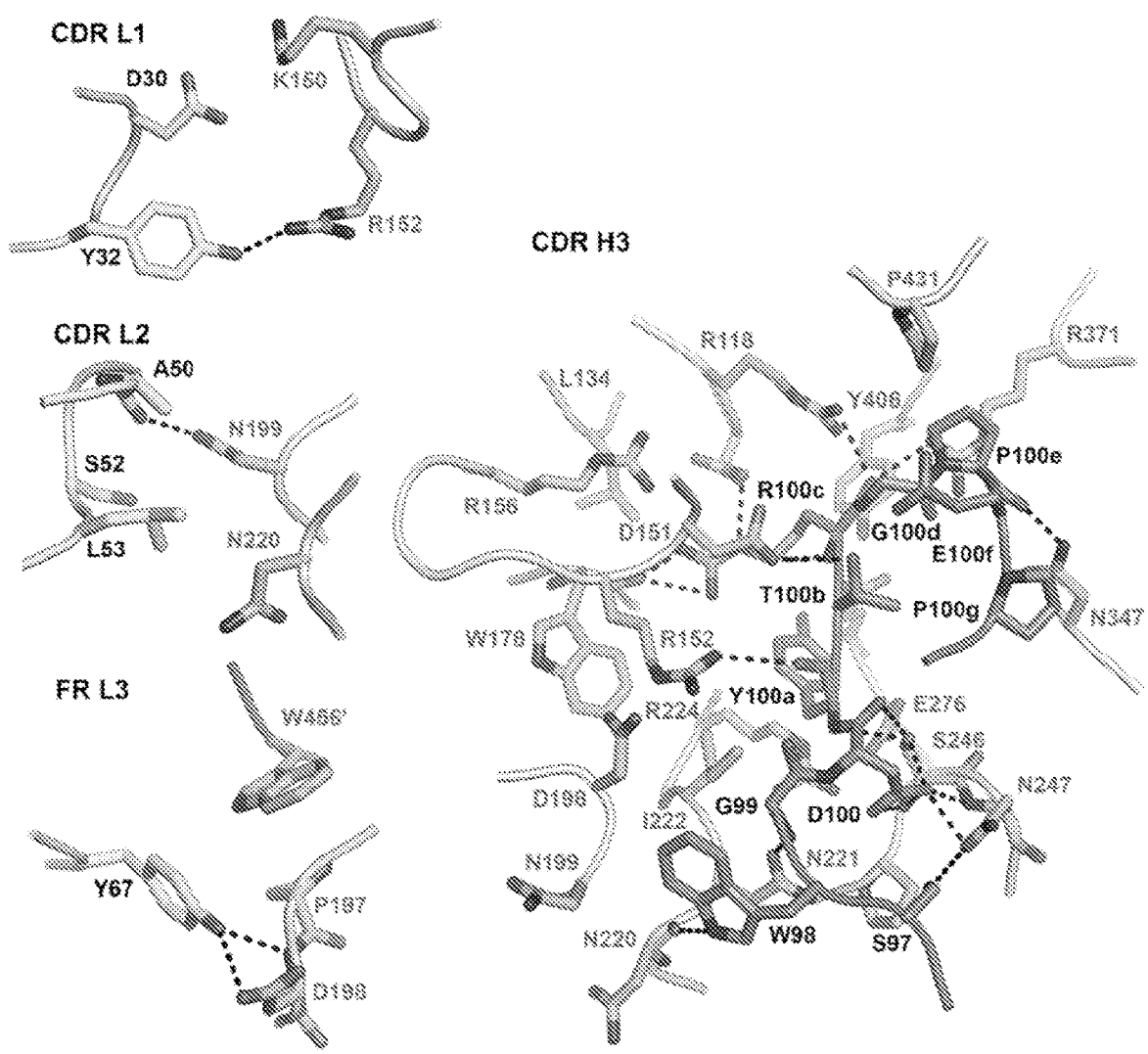
FIG. 12. Interaction of 1G01 Fab CDRs with CA04 N1 NA from the crystal structure at 3.27 Å resolution. 1G01 light chain is shown in light grey carbon atoms (to the left in each panel labeled CDRL1 or CDRL2), and heavy chain in grey carbon atoms (to the left in each panel labeled CDRH1 and CDRH2, or in the center of panel labeled CDR H3). The NA side-chains are shown in dark grey carbon atoms (to the right in panels labeled CDRL1, CDRL2, CDRH1, and CDRH2 or towards the perimeter in the panel labeled CDRH3). Hydrogen bonds or salt bridges are in black dotted lines. 1G01 Fab recognizes one NA protomer except for Y67 from FR L3 that interacts with residue W456 from a neighboring NA protomer.

Importantly, all three antibodies inhibited an oseltamivir resistant H3N2 virus at similar potency as a susceptible control virus (FIGS. 7A-7B). Typically, anti-NA antibodies do not show activity in in vitro neutralization assays (9), but all three mAbs here showed strong inhibitory activity in assays against various N2 viruses (FIG. 2E and FIGS. 8A-8C). While this effect might not be entirely due to inhibition of viral entry into cells, it might reflect the strong NI activity of the mAbs that efficiently blocks virus egress and subsequent virus replication necessary for a positive readout in that assay. In addition to Fab-based antiviral activity, Fc-FcR mediated effector functions like antibody dependent cellular cytotoxicity (ADCC) have been shown to be important for broadly protective anti-HA antibodies and have also been detected for anti-NA antibodies (9, 24). All three mAbs showed activity against a panel of different NAs in an ADCC bioreporter assay, even when they bound only at higher concentrations (e.g., 1G04 binding to influenza B NA) (FIG. 2F and FIGS. 9A-9D).

TABLE 6

Virus strains used in this study.

| Subtype | HA | NA | Backbone |
|---|---|---|---|
| H1N1 | A/Singapore/GP1908/2015 | A/Singapore/GP1908/2015 | A/Texas/1/1977 |
| H1N1 | A/New Caledonia/20/1999 | A/New Caledonia/20/1999 | A/New Caledonia/20/1999 |
| H5N1 | A/Indonesia/5/2005$ | A/Indonesia/5/2005 | A/PR/8/1934 |
| H5N1 | A/Vietnam/1204/2004$ | A/Vietnam/1204/2004 | A/PR/8/1934 |
| CH6/1 N4* | head: A/mallard/Sweden/81/2002 stalk: A/PR/8/1934 | A/mallard/Sweden/24/2002 | A/PR/8/1934 |
| H9N4 | A/guinea fowl/HK/WF 10/99 | A/mallard/Sweden/24/2002 | A/PR/8/1934 |
| H10N8 | A/Jiangxi-Donghu/346/2013 | A/Jiangxi-Donghu/346/2013 | A/PR/8/1934 |
| H5N8 | A/gyrfalcon/Washington/41088-6/2014 | A/gyrfalcon/Washington/41088-6/2014 | A/PR/8/1934 |
| H4N8 | A/duck/Czech/1956 | A/mallard/Sweden/50/2002 | A/PR/8/1934 |
| H12N5 | A/mallard/Interior Alaska/7MP0167/2007 | A/mallard/Interior Alaska/7MP0167/2007 | A/mallard/Interior Alaska/7MP0167/2007 |
| H15N5 | A/mallard duck/Sweden/139579/2012 | A/PR/8/1934 | A/PR/8/1934 |
| H7N9 | A/Shanghai/1/2013 | A/Shanghai/1/2013 | A/PR/8/1934 |
| H5N6 | A/Shenzhen/1/2016# | A/Shenzen/1/2016 | A/PR/8/1934 |
| H4N6 | A/duck/Czechoslovakia/1956 | A/duck/Czechoslovakia/1956 | A/PR/8/1934 |
| H10N7 | A/mallard/IA/10BM01929/2010 | A/mallard/IA/10BM01929/2010 | A/mallard/IA/10BM01929/2010 |

TABLE 6-continued

Virus strains used in this study.

| Subtype | HA | NA | Backbone |
|---|---|---|---|
| H1N7 | A/PR/8/1934 | A/chicken/Netherlands/1/2003 | A/PR/8/1934 |
| H3N2 | A/Philippines/2/1982 | A/Philippines/2/1982 | A/PR/8/1934 |
| H3N2 | A/Hong Kong/4801/2014 | A/Hong Kong/4801/2014 | A/PR/8/1934 |
| H3N2[#] | A/Washington/01/2007 | A/Washington/01/2007 | A/Washington/01/2007 |
| H3N2[&] | A/Texas/2/2007 | A/Texas/2/2007 | A/Texas/2/2007 |
| H9N2 | A/chicken/HongKong/G9/1997 | A/chicken/Hong Kong/G9/1997 | A/PR/8/1934 |
| H7N2 | A/feline/New York/16-040082-1/2016 | A/feline/New York/16-040082-1/2016 | A/PR/8/1934 |
| H6N3 | A/swine/Missouri/4296424/2006 | A/swine/Missouri/4296424/2006 | A/PR/8/1934 |
| B | B/Malaysia/2506/2004 | B/Malaysia/2506/2004 | B/Malaysia/2506/2004 |
| B | B/Florida/04/2006 | B/Florida/04/2006 | B/Florida/04/2006 |
| B | B/Yamagata/16/1988 | B/Yamagata/16/1988 | B/Yamagata/16/1988 |

*This virus has a chimeric HA consisting of the head domain of the A/mallard/Sweden/81/2002 virus and the stalk domain of A/PR/8/1934.
[#]Oseltamivir susceptible E119 variant
[&]Oseltamivir resistant E119V variant
[$]Polybasic cleavage site removed.

Example 4: Structural Determination of Binding Epitope for the Monoclonal Antibodies To elucidate the epitopes of the three mAbs and the structural basis of their broad protection, we determined crystal structures of 1G04 with the N9 NA from the recent H7N9 epidemic isolate A/Hunan/02650/2016 (Hunan N9) at 3.45 A, 1E01 in complex with the N2 NA of the 1957 H2N2 pandemic isolate A/Japan/305/1957 (Japan57 N2) at 2.45 Å and 1G01 in complex with the N1 NA of the 2009 pandemic H1N1 isolate A/California/04/2009 (CA04 N1) at 3.27 Å resolution (FIG. 3, NA strains are listed in Table 4). In all three Fab-NA complex structures, one Fab bound to one NA protomer of the NA tetramer. Significantly, all three Fabs bound to the NAs such that they fully blocked the NA active site (FIG. 3). 1G04, 1E01 and 1G01 recognized their epitopes using both heavy and light chains; the heavy chains especially complementarity determining regions (CDR) H3 in three antibodies played the dominant role in their NA interactions. The total buried surface areas on the NA by 1G04, 1E01 and 1G01 was 1030 Å2, 900 Å2 and 800 Å2, respectively, of which 87%, 84% and 77% arose from the heavy chain, and 67%, 66% and 77% from the extended CDR H3 loop.

Antibody 1G04 interacted with Hunan N9 NA using CDRs L1, L2, H1, H2 and H3 (FIG. 3A, FIG. 10, Table 7). The long 21-residue CDR H3 of 1G04 contributed most of the Fab- interactions to 20 N9 NA residues including 10 active site residues, which are conserved in group 1, group 2 and influenza B NAs: R118, E119, D151, R152, I222, R224, E276, E277, R371 and Y406. CDRs L1, L2, H1 and H2 contacted some non-conserved N9 NA residues. Similarly, 1E01 interacted with Japan57 N2 using the same five CDR loops as 1G04. The 21-residue CDR H3 of 1E01 dominated with interaction to 16 N2 NA residues including all of the conserved active site epitope residues recognized by 1G04 except E276 (FIG. 3B, FIG. 11, Table 8). Interestingly, 1G01 bound CA04 N1 NA using only CDRs L1, L2 and H3 as well as one residue, Y67, from the framework region (FR) L3. The 21-residue CDR H3 of 1G01 interacted with 19 CA04 N1 NA residues, which include 13 NA-conserved active site (10 of which are conserved with 1G04) or second-shell residues including L134, R156, W178 (FIG. 3C, FIG. 12, Table 9). The epitopes of these three antibodies are unique compared to the structurally characterized mouse NA antibodies, which bind to epitopes distant from the active site or on the rim of the active site (12, 25-27).

These reactivity profiles suggest that these antibodies were initially induced by an H3N2 infection and have acquired affinity to N1 and influenza B virus NA antigens through subsequent exposures of this individual to H1N1 and influenza B viruses. The recent H3N2 infection of this individual then recalled these clones. It is likely, that the actual serum antibody titer in the individual was not high enough to mediate protection, which would explain why the person got infected. It is therefore possible that the antibody clones are present in the memory B compartment of the individual but not in the long-lived plasma cell compartment in the bone marrow.

TABLE 7

| Sequence conservation of 1G04 epitope by NA subtype. | | | | | | | | | | | |
|---|---|---|---|---|---|---|---|---|---|---|---|
| NA | | Flu A Group 1 | | | | Flu A Group 2 | | | | | Flu B |
| residue number | Hunan N9 | N1 (9,744)[a] | N4 (149) | N5 (237) | N8 (1,290) | N2 (12,826) | N3 (772) | N6 (1,218) | N7 (473) | N9 (587) | B NA (3,469) |
| 118 | R | R[b] (99.9)[c] | R (99.3) | R (99.6) | R (99.8) | R (100) | R (100) | R (100) | R (100) | R (99.8) | R (100) |
| 119 | E | E (99.5) | E (99.3) | E (100) | E (99.9) | E (99.7) | E (100) | E (100) | E (100) | E (99.7) | E (99.9) |
| 149 | I | V (54.4) | V (98.7) | V (99.6) | V (99.5) | V (65.2) | I (90.3) | I (99.2) | I (97.3) | I (99.5) | R (99.9) |

TABLE 7-continued

Sequence conservation of 1G04 epitope by NA subtype.

| NA residue number | Hunan N9 | Flu A Group 1 | | | | Flu A Group 2 | | | | | Flu B |
| --- | --- | --- | --- | --- | --- | --- | --- | --- | --- | --- | --- |
| | | N1 (9,744)[a] | N4 (149) | N5 (237) | N8 (1,290) | N2 (12,826) | N3 (772) | N6 (1,218) | N7 (473) | N9 (587) | B NA (3,469) |
| 151 | <u>D</u> | D (99.2) | D (100) | D (99.6) | D (99.9) | D (93.5) | D (99.1) | D (99.9) | D (100) | D (99.7) | D (99.4) |
| <u>152</u> | <u>R</u> | R (100) | R (100) | R (99.6) | R (99.8) | R (99.9) | R (99.7) | R (99.8) | R (99.8) | R (99.3) | R (99.9) |
| 198 | N | D (99.5) | D (100) | D (99.6) | D (99.9) | D (99.6) | D (99.4) | N (97.8) | N (100) | N (99.5) | D (99.4) |
| 199 | N | N (81.7) | A (56.4) | D (98.7) | A (66.0) | K (59.3) | N (97.8) | N (98.1) | D (88.4) | N (99.8) | S (52.7) |
| 220 | R | N (85.0) | G (100) | K (98.7) | G (99.7) | K (80.5) | K (74.9) | G (99.1) | G (56.4) | R (98.1) | N (51.9) |
| 221 | N | N (72.0) | N (100) | Q (98.7) | D (97.8) | N (50.6) | D (90.2) | N (99.6) | N (98.9) | N (99.8) | N (81.4) |
| <u>222</u> | <u>I</u> | I (99.2) | I (99.3) | I (99.6) | I (99.7) | I (99.3) | I (99.4) | I (99.3) | I (99.8) | I (100) | I (99.5) |
| <u>224</u> | <u>R</u> | R (99.9) | R (100) | R (99.2) | R (99.9) | R (99.9) | R (99.2) | R (99.5) | R (100) | R (100) | R (99.8) |
| 245 | P | P (99.5) | P (100) | P (99.6) | P (100) | S (89.0) | P (99.4) | P (99.4) | S (96.8) | S (92.7) | S (52.7) |
| 246 | A | S (99.2) | S (99.3) | A (99.6) | A (99.5) | A (99.8) | A (99.5) | A (99.5) | A (100) | A (99.5) | A (99.9) |
| 247 | T | N (59.7) | D (98.7) | N (92.4) | N (99.0) | S (89.7) | A (89.8) | N (99.0) | S (96.0) | T (99.7) | D (77.5) |
| <u>276</u> | <u>E</u> | E (99.9) | E (100) | E (99.6) | E (99.9) | E (99.9) | E (99.6) | E (99.6) | E (100) | E (100) | E (100) |
| <u>277</u> | <u>E</u> | E (100) | E (100) | E (99.6) | E (100) | E (100) | E (99.6) | E (99.6) | E (100) | E (100) | E (100) |
| 295 | W | W (99.9) | W (100) | W (99.6) | W (100) | W (99.9) | W (99.6) | W (99.8) | W (100) | W (100) | S (66.3) |
| 296 | Q | H (99.9) | R (98.7) | N (99.6) | T (99.7) | K (97.6) | K (99.0) | K (97.9) | Q (99.8) | Q (99.3) | Y (99.9) |
| 345 | N | G (100) | G (100) | N (95.8) | G (98.9) | G (99.9) | G (99.6) | P (99.7) | G (98.7) | N (98.1) | S (95.8) |
| 347 | N | N (66.2) | Y (100) | Y (100) | Y (100) | H (73.1) | P (89.5) | P (99.8) | P (99.6) | N (99.3) | G (99.7) |
| 370 | S | S (89.7) | S (99.3) | S (99.6) | S (99.9) | S (70.9) | G (89.8) | S (99.6) | S (98.1) | S (100) | K (45.5) |
| <u>371</u> | <u>R</u> | R (99.9) | R (100) | R (100) | R (100) | R (99.9) | R (100) | R (100) | R (100) | R (100) | R (99.9) |
| <u>406</u> | <u>Y</u> | Y (99.9) | Y (100) | Y (99.6) | Y (99.9) | Y (99.9) | Y (100) | Y (100) | Y (100) | Y (100) | Y (99.9) |
| 432 | K | K (76.1) | K (99.3) | E (97.0) | E (99.8) | E (58.1) | N (99.6) | K (98.9) | E (100) | K (99.3) | —[d] |

NA residues conserved in influenza A N1 to N9 and Influenza B NA are underlined.
[a] Number of non-redundant influenza NA sequences for subtype from the Influenza Virus Resource at the National Center for Biotechnology Information (NCBI) database (https://www.ncbi.nlm.nih.gov/genomes/FLU/) in Nov. 28, 2018.
[b] Most common residue at position for subtype.
[c] Percent identity for most common residue.
[d] Sequence deletion as aligned to N2 NA.

TABLE 8

Sequence conservation of 1E01 epitope by NA subtype.

| NA residue number | Japan57 N2 | Flu A Group 1 | | | | Flu A Group 2 | | | | | Flu B |
| --- | --- | --- | --- | --- | --- | --- | --- | --- | --- | --- | --- |
| | | N1 (9,744)[a] | N4 (149) | N5 (237) | N8 (1,290) | N2 (12,826) | N3 (772) | N6 (1,218) | N7 (473) | N9 (587) | B NA (3,469) |
| <u>118</u> | <u>R</u> | R[b] (99.9)[c] | R (99.3) | R (99.6) | R (99.8) | R (100) | R (100) | R (100) | R (100) | R (99.8) | R (100) |
| 119 | E | E (99.5) | E (99.3) | E (100) | E (99.9) | E (99.7) | E (100) | E (100) | E (100) | E (99.7) | E (99.9) |
| <u>151</u> | <u>D</u> | D (99.2) | D (100) | D (99.6) | D (99.9) | D (93.5) | D (99.1) | D (99.9) | D (100) | D (99.7) | D (99.4) |
| <u>152</u> | <u>R</u> | R (100) | R (100) | R (99.6) | R (99.8) | R (99.9) | R (99.7) | R (99.8) | R (99.8) | R (99.3) | R (99.9) |
| 198 | D | D (99.5) | D (100) | D (99.6) | D (99.9) | D (99.6) | D (99.4) | N (97.8) | N (100) | N (99.5) | D (99.4) |

TABLE 8-continued

Sequence conservation of 1E01 epitope by NA subtype.

| NA residue number | Japan57 N2 | Flu A Group 1 | | | | Flu A Group 2 | | | | | Flu B |
|---|---|---|---|---|---|---|---|---|---|---|---|
| | | N1 (9,744)[a] | N4 (149) | N5 (237) | N8 (1,290) | N2 (12,826) | N3 (772) | N6 (1,218) | N7 (473) | N9 (587) | B NA (3,469) |
| 199 | R | N (81.7) | A (56.4) | D (98.7) | A (66.0) | K (59.3) | N (97.8) | N (98.1) | D (88.4) | N (99.8) | S (52.7) |
| 220 | Q | N (85.0) | G (100) | K (98.7) | G (99.7) | K (80.5) | K (74.9) | G (99.1) | G (56.4) | R (98.1) | N (51.9) |
| 221 | N | N (72.0) | N (100) | Q (99.6) | D (97.8) | N (50.6) | D (90.2) | N (99.6) | N (98.9) | N (99.8) | N (81.4) |
| 222 | I | I (99.2) | I (99.3) | I (99.6) | I (99.7) | I (99.3) | I (99.4) | I (99.3) | I (99.8) | I (100) | I (99.5) |
| 224 | R | R (99.9) | R (100) | R (99.2) | R (99.9) | R (99.9) | R (99.2) | R (99.5) | R (100) | R (100) | R (99.8) |
| 245 | S | P (99.5) | P (100) | P (99.6) | P (100) | S (89.0) | P (99.4) | P (99.4) | S (96.8) | S (92.7) | S (52.7) |
| 246 | A | S (99.2) | S (99.3) | A (99.6) | A (99.5) | A (99.8) | A (99.5) | A (99.5) | A (100) | A (99.5) | A (99.9) |
| 249 | R | Q (89.5) | Q (100) | Q (99.6) | Q (99.9) | K (73.1) | S (88.2) | R (84.5) | Q (99.6) | P (100) | V (53.8) |
| 277 | E | E (100) | E (100) | E (99.6) | E (100) | E (100) | E (99.6) | E (99.6) | E (100) | E (100) | E (100) |
| 295 | W | W (99.9) | W (100) | W (99.6) | W (100) | W (99.9) | W (99.6) | W (99.8) | W (100) | W (100) | S (66.3) |
| 296 | K | H (99.9) | R (98.7) | N (99.6) | T (99.7) | K (97.6) | K (99.0) | K (97.9) | Q (99.8) | Q (99.3) | Y (99.9) |
| 342 | N | S (68.8) | N (100) | G (100) | G (99.9) | N (97.9) | N (89.9) | T (97.5) | T (99.6) | P (99.8) | D (77.5) |
| 371 | R | R (99.9) | R (100) | R (100) | R (100) | R (99.9) | R (100) | R (100) | R (100) | R (100) | R (99.9) |
| 406 | Y | Y (99.9) | Y (100) | Y (99.6) | Y (99.9) | Y (99.9) | Y (100) | Y (100) | Y (100) | Y (100) | Y (99.9) |
| 432 | Q | K (76.1) | K (99.3) | E (97.0) | E (99.8) | E (58.1) | N (99.6) | K (98.9) | E (100) | K (99.3) | —[d] |

NA residues conserved in influenza A N1 to N9 and Influenza B NA are underlined
[a]Number of non-redundant influenza NA sequences for subtype from the Influenza Virus Resource at the National Center for Biotechnology Information (NCBI) database (https://www.nobi.nim.nih.gov/genomes/ELU/ in Nov. 28, 2018.
[b]Most common residue at position for subtype.
[c]Percent identity for most common residue.
[d]Sequence deletion as aligned to N2 NA.

TABLE 9

Sequence conservation of 1G01 epitope by NA subtype.

| NA residue number | CA04 N1 | Flu A Group 1 | | | | Flu A Group 2 | | | | | Flu B |
|---|---|---|---|---|---|---|---|---|---|---|---|
| | | N1 (9,744)[a] | N4 (149) | N5 (237) | N8 (1,290) | N2 (12,826) | N3 (772) | N6 (1,218) | N7 (473) | N9 (587) | B NA (3,469) |
| 118 | R | R[b] (99.9)[c] | R (99.3) | R (99.6) | R (99.8) | R (100) | R (100) | R (100) | R (100) | R (99.8) | R (100) |
| 119 | E | E (99.5) | E (99.3) | E (100) | E (99.9) | E (99.7) | E (100) | E (100) | E (100) | E (99.7) | E (99.9) |
| 134 | L | L (99.9) | L (100) | L (99.6) | L (99.8) | L (99.9) | L (99.9) | L (99.7) | L (100) | L (99.8) | L (99.8) |
| 150 | K | K (99.5) | K (100) | K (99.2) | K (99.5) | H (65.9) | K (98.4) | H (99.3) | H (98.7) | H (100) | E (53.3) |
| 151 | D | D (99.2) | D (100) | D (99.6) | D (99.9) | D (93.5) | D (99.1) | D (99.9) | D (100) | D (99.7) | D (99.4) |
| 152 | R | R (100) | R (100) | R (99.6) | R (99.8) | R (99.9) | R (99.7) | R (99.8) | R (99.8) | R (99.3) | R (99.9) |
| 156 | R | R (99.8) | R (100) | R (99.6) | R (99.8) | R (99.9) | R (99.9) | R (99.9) | R (100) | R (99.1) | R (99.9) |
| 178 | W | W (99.9) | W (100) | W (99.6) | W (99.8) | W (99.0) | W (99.9) | W (100) | W (100) | W (100) | W (100) |
| 197 | P | P (99.8) | P (100) | A (99.2) | P (98.6) | D (80.9) | N (97.0) | P (99.5) | N (97.5) | P (100) | P (99.5) |
| 198 | D | D (99.5) | D (100) | D (99.6) | D (99.9) | D (99.6) | D (99.4) | N (97.8) | N (100) | N (99.5) | D (99.4) |
| 199 | N | N (81.7) | A (56.4) | D (98.7) | A (66.0) | K (59.3) | N (97.8) | N (98.1) | D (88.4) | N (99.8) | S (52.7) |
| 220 | N | N (85.0) | G (100) | K (98.7) | G (99.7) | K (80.5) | K (74.9) | G (99.1) | G (56.4) | R (98.1) | N (51.9) |

TABLE 9-continued

Sequence conservation of 1G01 epitope by NA subtype.

| NA residue number | CA04 N1 | Flu A Group 1 | | | | Flu A Group 2 | | | | | Flu B |
|---|---|---|---|---|---|---|---|---|---|---|---|
| | | N1 (9,744)[a] | N4 (149) | N5 (237) | N8 (1,290) | N2 (12,826) | N3 (772) | N6 (1,218) | N7 (473) | N9 (587) | B NA (3,469) |
| 221 | N | N (72.0) | N (100) | Q (98.7) | D (97.8) | N (50.6) | D (90.2) | N (99.6) | N (98.9) | N (99.8) | N (81.4) |
| 222 | I | I (99.2) | I (99.3) | I (99.6) | I (99.7) | I (99.3) | I (99.4) | I (99.3) | I (99.8) | I (100) | I (99.5) |
| 224 | R | R (99.9) | R (100) | R (99.2) | R (99.9) | R (99.9) | R (99.2) | R (99.5) | R (100) | R (100) | R (99.8) |
| 245 | P | P (99.5) | P (100) | P (99.6) | P (100) | S (89.0) | P (99.4) | P (99.4) | S (96.8) | S (92.7) | S (52.7) |
| 246 | S | S (99.2) | S (99.3) | A (99.6) | A (99.5) | A (99.8) | A (99.5) | A (99.5) | A (100) | A (99.5) | A (99.9) |
| 247 | N | N (59.7) | D (98.7) | N (92.4) | N (99.0) | S (89.7) | A (89.8) | N (99.0) | S (96.0) | T (99.7) | D (77.5) |
| 276 | E | E (99.9) | E (100) | E (99.6) | E (99.9) | E (99.9) | E (99.6) | E (99.6) | E (100) | E (100) | E (100) |
| 277 | E | E (100) | E (100) | E (99.6) | E (100) | E (100) | E (99.6) | E (99.6) | E (100) | E (100) | E (100) |
| 347 | N | N (66.2) | Y (100) | Y (100) | Y (100) | H (73.1) | P (89.5) | P (99.8) | P (99.6) | N (99.3) | G (99.7) |
| 371 | R | R (99.9) | R (100) | R (100) | R (100) | R (99.9) | R (100) | R (100) | R (100) | R (100) | R (99.9) |
| 406 | Y | Y (99.9) | Y (100) | Y (99.6) | Y (99.9) | Y (99.9) | Y (100) | Y (100) | Y (100) | Y (100) | Y (99.9) |
| 431 | P | P (99.3) | T (99.3) | P (99.6) | P (100) | K (69.3) | P (99.7) | P (100) | P (100) | P (100) | G (99.8) |
| 456 | W | W (100) | W (100) | W (100) | W (99.9) | G (99.9) | G (100) | W (99.9) | G (100) | W (99.8) | W (99.9) |

NA residues conserved in influenza A N1 to N9 and Influenza B NA are underlined.
[a]Number of non-redundant influenza NA sequences for subtype from the Influenza Virus Resource at the National Center for Biotechnology Information (NCBI) database (https://www.ncbialmnibgov/genomes/ELU/ in Nov. 28, 2018.
[b]Most common residue at position for subtype.
[c]Percent identity for most common residue.

Example 5: Protective Capacity of Monoclonal Antibodies in Mouse Models of Influenza Next, we assessed the protective capacity of the three mAbs in vivo in the mouse model. We tested the protective effect against viruses expressing a human N2, an avian N2, a swine N3, and avian N6, N7 and N9 NAs (all group 2), a human N1, an avian N1, as well as avian N4, N5 and N8 NAs (all group 1) and an influenza B virus from the B/Victoria/2/88 lineage (FIGS. 4A, 4C-4M, Table 10). All were lethal challenge models except for avian N2 and N6 where only severe weight loss was observed in the animals that received the control antibody, but no mortality. Animals received mAbs at 5 mg/kg 2 hours prior to infection, morbidity (weight loss) and mortality were then monitored for 14 days. The mAbs protected from both weight loss and mortality in a manner that was consistent with their reactivity pattern, meaning if binding was observed they were also protective. Notably, 1G01 provided full protection from lethality against every single challenge virus. With the exception of the N4 challenge (FIG. 4J), where some transient weight loss was observed, 1G01 provided solid protection against weight loss. For the H3N2 challenge, we also monitored virus replication in the lungs of challenged animals on day 3 and day 6 post infection and could not detect any replicating virus suggesting that the strong in vitro inhibiting and neutralizing activity of the three mAbs translates to sterilizing immunity in vivo, at least on the sampled days (FIG. 4B). To determine if the mAbs could be useful if given as a therapeutic, we infected mice with a lethal dose of H3N2 virus and treated them with respective antibody 48- or 72-hours post-infection (FIG. 4N and FIG. 4O). While transient weight loss was observed, all animals recovered when treated with a low dose of 5 mg/kg mAb suggesting that these anti-NA mAbs have therapeutic potential.

TABLE 10

LD$_{50}$s of challenge viruses used in this study.

| Subtype | NA | LD$_{50}$ |
|---|---|---|
| pH1N1 | A/Singapore/GP1908/2015 | 320 PFU |
| H5N1 | A/Vietnam/1204/2004 | 32 PFU |
| cH6/1 N4 | A/mallard/Sweden/24/2002 | $5.6 \times 10^4$ PFU |
| H10N8 | A/Jiangxi-Donghu/346/2013 | 56 PFU |
| H15N5 | A/mallard duck/Sweden/139579/2012 | 3200 PFU |
| H7N9 | A/Shanghai/1/2013 | 4000 PFU |
| H4N6 | A/duck/Czechoslovakia/1956 | $1.4 \times 10^4$ PFU |
| H1N7 | A/chicken/Netherlands/1/2003 | 5.6 PFU |
| H3N2 | A/Philippines/2/1982 | 6 PFU |
| H7N2 | A/feline/New York/16-040082-1/2016 | $3.16 \times 10^4$ TCID$_{50}$ |
| H6N3 | A/swine/Missouri/4296424/2006 | 182 PFU |
| B | B/Malaysia/2506/2004 | 316 PFU |

REFERENCES

1. F. Krammer, P. Palese, Advances in the development of influenza virus vaccines. Nat Rev Drug Discov 14, 167-182 (2015).
2. E. J. Erbelding et al., A Universal Influenza Vaccine: The Strategic Plan for the National Institute of Allergy and Infectious Diseases. J Infect Dis 218, 347-354 (2018).
3. F. Krammer, The human antibody response to influenza A virus infection and vaccination. Nat Rev Immunol, (2019).

4. D. C. Ekiert et al., A highly conserved neutralizing epitope on group 2 influenza A viruses. Science 333, 843-850 (2011).
5. D. C. Ekiert et al., Antibody recognition of a highly conserved influenza virus epitope. Science 324, 246-251 (2009).
6. C. Dreyfus et al., Highly conserved protective epitopes on influenza B viruses. Science 337, 1343-1348 (2012).
7. D. Corti et al., A neutralizing antibody selected from plasma cells that binds to group 1 and group 2 influenza A hemagglutinins. Science 333, 850-856 (2011).
8. F. Krammer et al., NAction! How Can Neuraminidase-Based Immunity Contribute to Better Influenza Virus Vaccines?MBio 9, (2018).
9. T. J. Wohlbold et al., Broadly protective murine monoclonal antibodies against influenza B virus target highly conserved neuraminidase epitopes. Nat Microbiol 2, 1415-1424 (2017).
10. Y. Q. Chen et al., Influenza Infection in Humans Induces Broadly Cross-Reactive and Protective Neuraminidase-Reactive Antibodies. Cell 173, 417-429.e410 (2018).
11. L. Jiang et al., Comparative Efficacy of Monoclonal Antibodies That Bind to Different Epitopes of the 2009 Pandemic H1N1 Influenza Virus Neuraminidase. J Virol 90, 117-128 (2016).
12. H. Wan et al., Structural characterization of a protective epitope spanning A(H1N1)pdm09 influenza virus neuraminidase monomers. Nat Commun 6, 6114 (2015).
13. T. J. Wohlbold et al., Vaccination with Adjuvanted Recombinant Neuraminidase Induces Broad Heterologous, but Not Heterosubtypic, Cross-Protection against Influenza Virus Infection in Mice. MBio 6, (2015).
14. G. E. Smith et al., Neuraminidase-based recombinant virus-like particles protect against lethal avian influenza A(H5N1) virus infection in ferrets. Virology 509, 90-97 (2017).
15. W. C. Liu, C. Y. Lin, Y. T. Tsou, J. T. Jan, S. C. Wu, Cross-Reactive Neuraminidase-Inhibiting Antibodies Elicited by Immunization with Recombinant Neuraminidase Proteins of H5N1 and Pandemic H1N1 Influenza A Viruses. J Virol 89, 7224-7234 (2015).
16. M. McMahon et al. (mBio, 2019, in press).
17. A. S. Monto et al., Antibody to Influenza Virus Neuraminidase: An Independent Correlate of Protection. J Infect Dis 212, 1191-1199 (2015).
18. R. B. Couch et al., Antibody correlates and predictors of immunity to naturally occurring influenza in humans and the importance of antibody to the neuraminidase. J Infect Dis 207, 974-981 (2013).
19. M. J. Memoli et al., Evaluation of Antihemagglutinin and Antineuraminidase Antibodies as Correlates of Protection in an Influenza A/H1N1 Virus Healthy Human Challenge Model. MBio 7, e00417-00416 (2016).
20. N. S. Heaton, D. Sachs, C. J. Chen, R. Hai, P. Palese, Genome-wide mutagenesis of influenza virus reveals unique plasticity of the hemagglutinin and NS1 proteins. Proc Natl Acad Sci USA 110, 20248-20253 (2013).
21. M. R. Sandbulte et al., Discordant antigenic drift of neuraminidase and hemagglutinin in H1N1 and H3N2 influenza viruses. Proc Natl Acad Sci USA 108, 20748-20753 (2011).
22. Y. Abed, I. Hardy, Y. Li, G. Boivin, Divergent evolution of hemagglutinin and neuraminidase genes in recent influenza A:H3N2 viruses isolated in Canada. J Med Virol 67, 589-595 (2002).
23. J. Wrammert et al., Rapid cloning of high-affinity human monoclonal antibodies against influenza virus. Nature 453, 667-671 (2008).
24. D. J. Dilillo, G. S. Tan, P. Palese, J. V. Ravetch, Broadly neutralizing hemagglutinin stalk-specific antibodies require FcγR interactions for protection against influenza virus in vivo. Nat Med 20, 143-151 (2014).
25. W. R. Tulip, J. N. Varghese, W. G. Laver, R. G. Webster, P. M. Colman, Refined crystal structure of the influenza virus N9 neuraminidase-NC41 Fab complex. J Mol Biol 227, 122-148 (1992).
26. R. L. Malby et al., The structure of a complex between the NC10 antibody and influenza virus neuraminidase and comparison with the overlapping binding site of the NC41 antibody. Structure 2, 733-746 (1994).
27. L. Venkatramani et al., An epidemiologically significant epitope of a 1998 human influenza virus neuraminidase forms a highly hydrated interface in the NA-antibody complex. J Mol Biol 356, 651-663 (2006).
28. T. M. Doyle et al., A monoclonal antibody targeting a highly conserved epitope in influenza B neuraminidase provides protection against drug resistant strains. Biochem Biophys Res Commun 441, 226-229 (2013).
29. T. M. Doyle et al., Universal anti-neuraminidase antibody inhibiting all influenza A subtypes. Antiviral Res 100, 567-574 (2013).
30. W. He et al., Alveolar macrophages are critical for broadly-reactive antibody-mediated protection against influenza A virus in mice. Nat Commun 8, 846 (2017).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods, processes, and compositions without departing from the scope of the invention, it is intended that all matter contained in the above description and shown in the accompanying drawings shall be interpreted as illustrative and not in a limiting sense.

The invention claimed is:

1. An antibody or antigen-binding fragment, wherein the antibody or antigen-binding fragment comprises:
   (a) a heavy chain variable region comprising a CDR-H1 comprising the amino acid sequence of GFKFDDYAM (SEQ ID NO:13); a CDR-H2 comprising the amino acid sequence of LNWNGDITA (SEQ ID NO:7); and a CDR-H3 comprising the amino acid sequence of SWGDYTRGPEPKITWY (SEQ ID NO:14), and
   a light chain variable region comprising a CDR-L1 comprising the amino acid sequence of GIDGYL (SEQ ID NO:15); a CDR-L2 comprising the amino acid sequence of SLL; and a CDR-L3 comprising the amino acid sequence of LDSYPLFTF (SEQ ID NO:16);
   (b) a heavy chain variable region comprising a CDR-H1 comprising the amino acid sequence of GFTFDDYGM (SEQ ID NO: 1); a CDR-H2 comprising the amino acid sequence of LNWNGDITA (SEQ ID NO:7); and a CDR-H3 comprising the amino acid sequence of TWGEYTTREEPIHSWY (SEQ ID NO:3), and
   a light chain variable region comprising a CDR-L1 comprising the amino acid sequence of DISSFL (SEQ ID NO:8); a CDR-L2 comprising the amino acid sequence of SLL; and
   a CDR-L3 comprising the amino acid sequence of LNSYPLFTF (SEQ ID NO:6); or
   (c) a heavy chain variable region comprising a CDR-H1 comprising the amino acid sequence of GFTFDDYGM (SEQ ID NO: 1); a CDR-H2 comprising the amino acid sequence of LNWNGDITA (SEQ ID NO:7); and a CDR-H3 comprising the amino acid sequence of TWGDYTTGEEIINSWY (SEQ ID NO:10), and
   a light chain variable region comprising a CDR-L1 comprising the amino acid sequence of DISSYL (SEQ ID NO:11); a CDR-L2 comprising the amino acid sequence of SLL; and a CDR-L3 comprising the amino acid sequence of LKSYPLFTF (SEQ ID NO:12).

2. The antibody or antigen-binding fragment of claim 1, wherein
the heavy chain variable region comprises a CDR-H1 comprising the amino acid sequence of GFKFDDYAM (SEQ ID NO:13) a CDR-H2 comprising the amino acid sequence of LNWNGDITA (SEQ ID NO:7); and a CDR-H3 comprising the amino acid sequence of SWGDYTRGPEPKITWY (SEQ ID NO:14), and
the light chain variable region comprises a CDR-L1 comprising the amino acid sequence of GIDGYL (SEQ ID NO:15): a CDR-L2 comprising the amino acid sequence of SLL; and a CDR-L3 comprising the amino acid sequence of LDSYPLFTF (SEQ ID NO:16).

3. The antibody or antigen-binding fragment of claim 2, wherein the heavy chain variable region comprises the amino acid sequence of EVQLVESGGRALRPGGSLRLS-CAASGFKFDDYAMSWVRQVPGK-GLEFVSGLNWNGDIT AYTDSVKGRFTVSRDNAKNS-LYLHINSPKPEDTALYYCARTSSWGDYTRGP EPKITWYF DLWGRGTLVTVSS (SEQ ID NO:44), and the light chain variable region comprises the amino acid sequence of DIQLTQSPSFLSASVGDRITIT-CRASQGIDGYLAWYQQRPGKAPNLLI-YAASLLQSGVPSR FSGSGYGTEFTLTISSLQPEDFA-TYYCQHLDSYPLFTFGPGTKVDIK (SEQ ID NO:45).

4. The antibody or antigen-binding fragment of claim 1, wherein
the heavy chain variable region comprises a CDR-H1 comprising the amino acid sequence of GFTFDDYGM (SEQ ID NO:1): a CDR-H2 comprising the amino acid sequence of LNWNGDITA (SEQ ID NO:7); and a CDR-H3 comprising the amino acid sequence of TWGEYTTREEPIHSWY (SEQ ID NO:3), and
the light chain variable region comprises a CDR-L1 comprising the amino acid sequence of DISSFL (SEQ ID NO:8): a CDR-L2 comprising the amino acid sequence of SLL; and a CDR-L3 comprising the amino acid sequence of LNSYPLFTF (SEQ ID NO:6).

5. The antibody or antigen-binding fragment of claim 4, wherein the heavy chain variable region comprises the amino acid sequence of EVQLVESGGRVVRPGGSLRLS-CAASGFTFDDYGMSWVRQAPGK-GLEFVSGLNWNGDIT AFTDSVKGRFTISRDNAKSS-LYLQMNSLRADDTAFYYCARVRTWGEYT TREEPIHSWYF DLWGRGTLVTVSS (SEQ ID NO:40), and the light chain variable region comprises the amino acid sequence of DIQLTQSPSFLSASVGDRVTITCRASQ-DISSFLAWYQQKPGNAPKVLIYAASLLQSGVPSR FSGSGSGTDFTLTISSLQPEDFATYYCQQLNSY-PLFTFGPGTKVDIK (SEQ ID NO:41).

6. The antibody or antigen binding fragment of claim 1, wherein
heavy chain variable region comprises a CDR-H1 comprising the amino acid sequence of GFTFDDYGM (SEQ ID NO:1): a CDR-H2 comprising the amino acid sequence of LNWNGDITA (SEQ ID NO:7); and a CDR-H3 comprising the amino acid sequence of TWGDYTTGEEIINSWY (SEQ ID NO:110), and
the light chain variable region comprises a CDR-L1 comprising the amino acid sequence of DISSYL (SEQ ID NO:11): a CDR-L2 comprising the amino acid sequence of SLL; and a CDR-L3 comprising the amino acid sequence of LKSYPLFTF (SEQ ID NO:12).

7. The antibody or antigen binding fragment of claim 6, wherein the heavy chain variable region comprises the amino acid sequence of EVQLVESGGRVVRPGGSLRLS-CAASGFTFDDYGMSWVRQPPGK-GLEFVSGLNWNGDIT AFTDSVKGRFTISRDNVKSS-LYLQMNSLRADDTAFYYCARVRTWGDYTTG EEIINSWYF DLWGRGTLVTVSS (SEQ ID NO:42), and the light chain variable region comprises the amino acid sequence of DIQLTQSPSFLSASVGDRVTITCRASQDIS-SYLAWYQQKPGNAPKLLIYAASLLQSGVPSR FSAFGSGTEFTLTISSLQPEDFATYYCQHLKSY-PLFTFGPGTKVDIK (SEQ ID NO:43).

8. The antibody or antigen-binding fragment of claim 2, comprising a heavy chain variable region comprising an amino acid sequence having at least 90% identity to SEQ ID NO:44, and a light chain variable region comprising an amino acid sequence having at least 90% identity to SEQ ID NO:45.

9. The antibody or antigen-binding fragment of claim 1, wherein the antibody or antigen-binding fragment binds an influenza virus.

10. The antibody or antigen-binding fragment of claim 9, wherein the antibody or antigen-binding fragment specifically binds to a neuraminidase.

11. The antibody or antigen-binding fragment of claim 10, wherein the antibody or antigen-binding fragment inhibits the neuraminidase with an IC50 of about 0.0001 μg/ml to about 30 μg/ml.

12. The antibody or antigen-binding fragment of claim 1, wherein the antibody or antigen-binding fragment is humanized.

13. The antibody or antigen binding fragment of claim 1, wherein the antibody or antigen binding fragment is a monoclonal antibody and/or is an IgG antibody.

14. The antibody or antigen bind fragment of claim 1, wherein the antibody or antigen bind fragment comprises a hinge region or Fc region that contains at least one amino acid substitution, deletion, or insertion relative to the sequence of a wild-type hinge region or a wild-type Fc region, and wherein the substitution, deletion, or insertion prevents or reduces recycling of the antibody or antigen-binding fragment.

15. A nucleic acid comprising a nucleotide sequence encoding the heavy chain variable region and/or the light chain variable region of the antibody or antigen-binding fragment of claim 1.

16. An expression vector comprising the nucleic acid of claim 15.

17. A host cell comprising the expression vector of claim 16.

18. A vaccine comprising an antibody or antigen-binding fragment of claim 1.

19. A pharmaceutical composition, comprising the antibody or antigen-binding fragment of claim 1 and a pharmaceutically acceptable carrier or excipient.

20. The nucleic acid of claim 15, comprising the nucleotide sequence of SEQ ID NO:47 and/or the nucleotide sequence of SEQ ID NO:51.

* * * * *

SEQUENCE LISTING

<160> NUMBER OF SEQ ID NOS: 52

<210> SEQ ID NO 1
<211> LENGTH: 9
<212> TYPE: PRT
<213> ORGANISM: Homo sapiens

<400> SEQUENCE: 1

```
Gly Phe Thr Phe Asp Asp Tyr Gly Met
1               5

<210> SEQ ID NO 2
<211> LENGTH: 9
<212> TYPE: PRT
<213> ORGANISM: Homo sapiens

<400> SEQUENCE: 2

Ile Asn Trp Asn Gly Gly Ser Thr Gly
1               5

<210> SEQ ID NO 3
<211> LENGTH: 16
<212> TYPE: PRT
<213> ORGANISM: Homo sapiens

<400> SEQUENCE: 3

Thr Trp Gly Glu Tyr Thr Thr Arg Glu Glu Pro Ile His Ser Trp Tyr
1               5                   10                  15

<210> SEQ ID NO 4
<211> LENGTH: 6
<212> TYPE: PRT
<213> ORGANISM: Homo sapiens

<400> SEQUENCE: 4

Gly Ile Ser Ser Tyr Leu
1               5

<210> SEQ ID NO 5
<211> LENGTH: 5
<212> TYPE: PRT
<213> ORGANISM: Homo sapiens
<220> FEATURE:
<221> NAME/KEY: misc_feature
<222> LOCATION: (4)..(5)
<223> OTHER INFORMATION: Xaa can be any naturally occurring amino acid

<400> SEQUENCE: 5

Ser Thr Leu Xaa Xaa
1               5

<210> SEQ ID NO 6
<211> LENGTH: 9
<212> TYPE: PRT
<213> ORGANISM: Homo sapiens

<400> SEQUENCE: 6

Leu Asn Ser Tyr Pro Leu Phe Thr Phe
1               5

<210> SEQ ID NO 7
<211> LENGTH: 9
<212> TYPE: PRT
<213> ORGANISM: Homo sapiens

<400> SEQUENCE: 7

Leu Asn Trp Asn Gly Asp Ile Thr Ala
1               5

<210> SEQ ID NO 8
<211> LENGTH: 6
<212> TYPE: PRT
<213> ORGANISM: Homo sapiens
```

<400> SEQUENCE: 8

Asp Ile Ser Ser Phe Leu
1               5

<210> SEQ ID NO 9
<211> LENGTH: 5
<212> TYPE: PRT
<213> ORGANISM: Homo sapiens
<220> FEATURE:
<221> NAME/KEY: misc_feature
<222> LOCATION: (4)..(5)
<223> OTHER INFORMATION: Xaa can be any naturally occurring amino acid

<400> SEQUENCE: 9

Ser Leu Leu Xaa Xaa
1               5

<210> SEQ ID NO 10
<211> LENGTH: 16
<212> TYPE: PRT
<213> ORGANISM: Homo sapiens

<400> SEQUENCE: 10

Thr Trp Gly Asp Tyr Thr Thr Gly Glu Glu Ile Ile Asn Ser Trp Tyr
1               5                   10                  15

<210> SEQ ID NO 11
<211> LENGTH: 6
<212> TYPE: PRT
<213> ORGANISM: Homo sapiens

<400> SEQUENCE: 11

Asp Ile Ser Ser Tyr Leu
1               5

<210> SEQ ID NO 12
<211> LENGTH: 9
<212> TYPE: PRT
<213> ORGANISM: Homo sapiens

<400> SEQUENCE: 12

Leu Lys Ser Tyr Pro Leu Phe Thr Phe
1               5

<210> SEQ ID NO 13
<211> LENGTH: 9
<212> TYPE: PRT
<213> ORGANISM: Homo sapiens

<400> SEQUENCE: 13

Gly Phe Lys Phe Asp Asp Tyr Ala Met
1               5

<210> SEQ ID NO 14
<211> LENGTH: 16
<212> TYPE: PRT
<213> ORGANISM: Homo sapiens

<400> SEQUENCE: 14

Ser Trp Gly Asp Tyr Thr Arg Gly Pro Glu Pro Lys Ile Thr Trp Tyr
1               5                   10                  15

<210> SEQ ID NO 15
<211> LENGTH: 6

```
<212> TYPE: PRT
<213> ORGANISM: Homo sapiens

<400> SEQUENCE: 15

Gly Ile Asp Gly Tyr Leu
1               5

<210> SEQ ID NO 16
<211> LENGTH: 9
<212> TYPE: PRT
<213> ORGANISM: Homo sapiens

<400> SEQUENCE: 16

Leu Asp Ser Tyr Pro Leu Phe Thr Phe
1               5

<210> SEQ ID NO 17
<211> LENGTH: 25
<212> TYPE: PRT
<213> ORGANISM: Homo sapiens

<400> SEQUENCE: 17

Glu Val Gln Leu Val Glu Ser Gly Gly Val Val Arg Pro Gly Gly
1               5                   10                  15

Ser Leu Arg Leu Ser Cys Ala Ala Ser
            20                  25

<210> SEQ ID NO 18
<211> LENGTH: 16
<212> TYPE: PRT
<213> ORGANISM: Homo sapiens

<400> SEQUENCE: 18

Ser Trp Val Arg Gln Ala Pro Gly Lys Gly Leu Glu Trp Val Ser Gly
1               5                   10                  15

<210> SEQ ID NO 19
<211> LENGTH: 41
<212> TYPE: PRT
<213> ORGANISM: Homo sapiens

<400> SEQUENCE: 19

Tyr Ala Asp Ser Val Lys Gly Arg Phe Thr Ile Ser Arg Asp Asn Ala
1               5                   10                  15

Lys Asn Ser Leu Tyr Leu Gln Met Asn Ser Leu Arg Ala Glu Asp Thr
            20                  25                  30

Ala Leu Tyr His Cys Ala Arg Val Arg
            35                  40

<210> SEQ ID NO 20
<211> LENGTH: 41
<212> TYPE: PRT
<213> ORGANISM: Homo sapiens

<400> SEQUENCE: 20

Tyr Ala Asp Ser Val Lys Gly Arg Glu Thr Ile Ser Arg Asp Asn Ala
1               5                   10                  15

Lys Asn Ser Leu Tyr Leu Gln Met Asn Ser Leu Arg Ala Glu Asp Thr
            20                  25                  30

Ala Leu Tyr His Cys Ala Arg Val Arg
            35                  40
```

```
<210> SEQ ID NO 21
<211> LENGTH: 27
<212> TYPE: PRT
<213> ORGANISM: Homo sapiens

<400> SEQUENCE: 21

Asp Ile Gln Leu Thr Gln Ser Pro Ser Phe Leu Ser Ala Ser Val Gly
1               5                   10                  15

Asp Arg Val Thr Ile Thr Cys Arg Ala Ser Gln
            20                  25

<210> SEQ ID NO 22
<211> LENGTH: 18
<212> TYPE: PRT
<213> ORGANISM: Homo sapiens

<400> SEQUENCE: 22

Ala Trp Tyr Gln Gln Lys Pro Gly Lys Ala Pro Lys Leu Leu Ile Tyr
1               5                   10                  15

Ala Ala

<210> SEQ ID NO 23
<211> LENGTH: 36
<212> TYPE: PRT
<213> ORGANISM: Homo sapiens

<400> SEQUENCE: 23

Gln Ser Gly Val Pro Ser Arg Phe Ser Gly Ser Gly Ser Gly Thr Glu
1               5                   10                  15

Phe Thr Leu Thr Ile Ser Ser Leu Gln Pro Glu Asp Phe Ala Thr Tyr
            20                  25                  30

Tyr Cys Gln Gln
        35

<210> SEQ ID NO 24
<211> LENGTH: 9
<212> TYPE: PRT
<213> ORGANISM: Homo sapiens

<400> SEQUENCE: 24

Gly Pro Gly Thr Lys Val Asp Ile Lys
1               5

<210> SEQ ID NO 25
<211> LENGTH: 25
<212> TYPE: PRT
<213> ORGANISM: Homo sapiens

<400> SEQUENCE: 25

Glu Val Gln Leu Val Glu Ser Gly Gly Arg Val Val Arg Pro Gly Gly
1               5                   10                  15

Ser Leu Arg Leu Ser Cys Ala Ala Ser
            20                  25

<210> SEQ ID NO 26
<211> LENGTH: 16
<212> TYPE: PRT
<213> ORGANISM: Homo sapiens

<400> SEQUENCE: 26

Ser Trp Val Arg Gln Ala Pro Gly Lys Gly Leu Glu Phe Val Ser Gly
1               5                   10                  15
```

<210> SEQ ID NO 27
<211> LENGTH: 41
<212> TYPE: PRT
<213> ORGANISM: Homo sapiens

<400> SEQUENCE: 27

Phe Thr Asp Ser Val Lys Gly Arg Phe Thr Ile Ser Arg Asp Asn Ala
1               5                   10                  15

Lys Ser Ser Leu Tyr Leu Gln Met Asn Ser Leu Arg Ala Asp Asp Thr
            20                  25                  30

Ala Phe Tyr Tyr Cys Ala Arg Val Arg
        35                  40

<210> SEQ ID NO 28
<211> LENGTH: 18
<212> TYPE: PRT
<213> ORGANISM: Homo sapiens

<400> SEQUENCE: 28

Ala Trp Tyr Gln Gln Lys Pro Gly Asn Ala Pro Lys Val Leu Ile Tyr
1               5                   10                  15

Ala Ala

<210> SEQ ID NO 29
<211> LENGTH: 36
<212> TYPE: PRT
<213> ORGANISM: Homo sapiens

<400> SEQUENCE: 29

Gln Ser Gly Val Pro Ser Arg Phe Ser Gly Ser Gly Ser Gly Thr Asp
1               5                   10                  15

Phe Thr Leu Thr Ile Ser Ser Leu Gln Pro Glu Asp Phe Ala Thr Tyr
            20                  25                  30

Tyr Cys Gln Gln
        35

<210> SEQ ID NO 30
<211> LENGTH: 16
<212> TYPE: PRT
<213> ORGANISM: Homo sapiens

<400> SEQUENCE: 30

Ser Trp Val Arg Gln Pro Pro Gly Lys Gly Leu Glu Phe Val Ser Gly
1               5                   10                  15

<210> SEQ ID NO 31
<211> LENGTH: 41
<212> TYPE: PRT
<213> ORGANISM: Homo sapiens

<400> SEQUENCE: 31

Phe Thr Asp Ser Val Lys Gly Arg Phe Thr Ile Ser Arg Asp Asn Val
1               5                   10                  15

Lys Ser Ser Leu Tyr Leu Gln Met Asn Ser Leu Arg Ala Asp Asp Thr
            20                  25                  30

Ala Phe Tyr Tyr Cys Ala Arg Val Arg
        35                  40

<210> SEQ ID NO 32
<211> LENGTH: 18
<212> TYPE: PRT

-continued

<213> ORGANISM: Homo sapiens

<400> SEQUENCE: 32

Ala Trp Tyr Gln Gln Lys Pro Gly Asn Ala Pro Lys Leu Leu Ile Tyr
1               5                   10                  15

Ala Ala

<210> SEQ ID NO 33
<211> LENGTH: 36
<212> TYPE: PRT
<213> ORGANISM: Homo sapiens

<400> SEQUENCE: 33

Gln Ser Gly Val Pro Ser Arg Phe Ser Ala Phe Gly Ser Gly Thr Glu
1               5                   10                  15

Phe Thr Leu Thr Ile Ser Ser Leu Gln Pro Glu Asp Phe Ala Thr Tyr
            20                  25                  30

Tyr Cys Gln His
        35

<210> SEQ ID NO 34
<211> LENGTH: 25
<212> TYPE: PRT
<213> ORGANISM: Homo sapiens

<400> SEQUENCE: 34

Glu Val Gln Leu Val Glu Ser Gly Gly Arg Ala Leu Arg Pro Gly Gly
1               5                   10                  15

Ser Leu Arg Leu Ser Cys Ala Ala Ser
            20                  25

<210> SEQ ID NO 35
<211> LENGTH: 16
<212> TYPE: PRT
<213> ORGANISM: Homo sapiens

<400> SEQUENCE: 35

Ser Trp Val Arg Gln Val Pro Gly Lys Gly Leu Glu Phe Val Ser Gly
1               5                   10                  15

<210> SEQ ID NO 36
<211> LENGTH: 41
<212> TYPE: PRT
<213> ORGANISM: Homo sapiens

<400> SEQUENCE: 36

Tyr Thr Asp Ser Val Lys Gly Arg Phe Thr Val Ser Arg Asp Asn Ala
1               5                   10                  15

Lys Asn Ser Leu Tyr Leu His Ile Asn Ser Pro Lys Pro Glu Asp Thr
            20                  25                  30

Ala Leu Tyr Tyr Cys Ala Arg Thr Ser
        35                  40

<210> SEQ ID NO 37
<211> LENGTH: 27
<212> TYPE: PRT
<213> ORGANISM: Homo sapiens

<400> SEQUENCE: 37

Asp Ile Gln Leu Thr Gln Ser Pro Ser Phe Leu Ser Ala Ser Val Gly
1               5                   10                  15

-continued

Asp Arg Ile Thr Ile Thr Cys Arg Ala Ser Gln
              20                  25

<210> SEQ ID NO 38
<211> LENGTH: 18
<212> TYPE: PRT
<213> ORGANISM: Homo sapiens

<400> SEQUENCE: 38

Ala Trp Tyr Gln Gln Arg Pro Gly Lys Ala Pro Asn Leu Leu Ile Tyr
1               5                   10                  15

Ala Ala

<210> SEQ ID NO 39
<211> LENGTH: 36
<212> TYPE: PRT
<213> ORGANISM: Homo sapiens

<400> SEQUENCE: 39

Gln Ser Gly Val Pro Ser Arg Phe Ser Gly Ser Gly Tyr Gly Thr Glu
1               5                   10                  15

Phe Thr Leu Thr Ile Ser Ser Leu Gln Pro Glu Asp Phe Ala Thr Tyr
              20                  25                  30

Tyr Cys Gln His
          35

<210> SEQ ID NO 40
<211> LENGTH: 130
<212> TYPE: PRT
<213> ORGANISM: Homo sapiens

<400> SEQUENCE: 40

Glu Val Gln Leu Val Glu Ser Gly Gly Arg Val Val Arg Pro Gly Gly
1               5                   10                  15

Ser Leu Arg Leu Ser Cys Ala Ala Ser Gly Phe Thr Phe Asp Asp Tyr
              20                  25                  30

Gly Met Ser Trp Val Arg Gln Ala Pro Gly Lys Gly Leu Glu Phe Val
          35                  40                  45

Ser Gly Leu Asn Trp Asn Gly Asp Ile Thr Ala Phe Thr Asp Ser Val
     50                  55                  60

Lys Gly Arg Phe Thr Ile Ser Arg Asp Asn Ala Lys Ser Ser Leu Tyr
65                  70                  75                  80

Leu Gln Met Asn Ser Leu Arg Ala Asp Asp Thr Ala Phe Tyr Tyr Cys
              85                  90                  95

Ala Arg Val Arg Thr Trp Gly Glu Tyr Thr Thr Arg Glu Glu Pro Ile
          100                 105                 110

His Ser Trp Tyr Phe Asp Leu Trp Gly Arg Gly Thr Leu Val Thr Val
          115                 120                 125

Ser Ser
    130

<210> SEQ ID NO 41
<211> LENGTH: 108
<212> TYPE: PRT
<213> ORGANISM: Homo sapiens

<400> SEQUENCE: 41

Asp Ile Gln Leu Thr Gln Ser Pro Ser Phe Leu Ser Ala Ser Val Gly
1               5                   10                  15

```
Asp Arg Val Thr Ile Thr Cys Arg Ala Ser Gln Asp Ile Ser Ser Phe
            20                  25                  30

Leu Ala Trp Tyr Gln Gln Lys Pro Gly Asn Ala Pro Lys Val Leu Ile
        35                  40                  45

Tyr Ala Ala Ser Leu Leu Gln Ser Gly Val Pro Ser Arg Phe Ser Gly
    50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Leu Asn Ser Tyr Pro Leu
                85                  90                  95

Phe Thr Phe Gly Pro Gly Thr Lys Val Asp Ile Lys
            100                 105
```

<210> SEQ ID NO 42
<211> LENGTH: 130
<212> TYPE: PRT
<213> ORGANISM: Homo sapiens

<400> SEQUENCE: 42

```
Glu Val Gln Leu Val Glu Ser Gly Gly Arg Val Val Arg Pro Gly Gly
1               5                   10                  15

Ser Leu Arg Leu Ser Cys Ala Ala Ser Gly Phe Thr Phe Asp Asp Tyr
            20                  25                  30

Gly Met Ser Trp Val Arg Gln Pro Pro Gly Lys Gly Leu Glu Phe Val
        35                  40                  45

Ser Gly Leu Asn Trp Asn Gly Asp Ile Thr Ala Phe Thr Asp Ser Val
    50                  55                  60

Lys Gly Arg Phe Thr Ile Ser Arg Asp Asn Val Lys Ser Ser Leu Tyr
65                  70                  75                  80

Leu Gln Met Asn Ser Leu Arg Ala Asp Asp Thr Ala Phe Tyr Tyr Cys
                85                  90                  95

Ala Arg Val Arg Thr Trp Gly Asp Tyr Thr Thr Gly Glu Glu Ile Ile
            100                 105                 110

Asn Ser Trp Tyr Phe Asp Leu Trp Gly Arg Gly Thr Leu Val Thr Val
        115                 120                 125

Ser Ser
    130
```

<210> SEQ ID NO 43
<211> LENGTH: 108
<212> TYPE: PRT
<213> ORGANISM: Homo sapiens

<400> SEQUENCE: 43

```
Asp Ile Gln Leu Thr Gln Ser Pro Ser Phe Leu Ser Ala Ser Val Gly
1               5                   10                  15

Asp Arg Val Thr Ile Thr Cys Arg Ala Ser Gln Asp Ile Ser Ser Tyr
            20                  25                  30

Leu Ala Trp Tyr Gln Gln Lys Pro Gly Asn Ala Pro Lys Leu Leu Ile
        35                  40                  45

Tyr Ala Ala Ser Leu Leu Gln Ser Gly Val Pro Ser Arg Phe Ser Ala
    50                  55                  60

Phe Gly Ser Gly Thr Glu Phe Thr Leu Thr Ile Ser Ser Leu Gln Pro
65                  70                  75                  80

Glu Asp Phe Ala Thr Tyr Tyr Cys Gln His Leu Lys Ser Tyr Pro Leu
                85                  90                  95
```

Phe Thr Phe Gly Pro Gly Thr Lys Val Asp Ile Lys
            100                 105

<210> SEQ ID NO 44
<211> LENGTH: 130
<212> TYPE: PRT
<213> ORGANISM: Homo sapiens

<400> SEQUENCE: 44

Glu Val Gln Leu Val Glu Ser Gly Gly Arg Ala Leu Arg Pro Gly Gly
1               5                   10                  15

Ser Leu Arg Leu Ser Cys Ala Ala Ser Gly Phe Lys Phe Asp Asp Tyr
            20                  25                  30

Ala Met Ser Trp Val Arg Gln Val Pro Gly Lys Gly Leu Glu Phe Val
        35                  40                  45

Ser Gly Leu Asn Trp Asn Gly Asp Ile Thr Ala Tyr Thr Asp Ser Val
    50                  55                  60

Lys Gly Arg Phe Thr Val Ser Arg Asp Asn Ala Lys Asn Ser Leu Tyr
65                  70                  75                  80

Leu His Ile Asn Ser Pro Lys Pro Glu Asp Thr Ala Leu Tyr Tyr Cys
                85                  90                  95

Ala Arg Thr Ser Ser Trp Gly Asp Tyr Thr Arg Gly Pro Glu Pro Lys
            100                 105                 110

Ile Thr Trp Tyr Phe Asp Leu Trp Gly Arg Gly Thr Leu Val Thr Val
        115                 120                 125

Ser Ser
130

<210> SEQ ID NO 45
<211> LENGTH: 108
<212> TYPE: PRT
<213> ORGANISM: Homo sapiens

<400> SEQUENCE: 45

Asp Ile Gln Leu Thr Gln Ser Pro Ser Phe Leu Ser Ala Ser Val Gly
1               5                   10                  15

Asp Arg Ile Thr Ile Thr Cys Arg Ala Ser Gln Gly Ile Asp Gly Tyr
            20                  25                  30

Leu Ala Trp Tyr Gln Gln Arg Pro Gly Lys Ala Pro Asn Leu Leu Ile
        35                  40                  45

Tyr Ala Ala Ser Leu Leu Gln Ser Gly Val Pro Ser Arg Phe Ser Gly
    50                  55                  60

Ser Gly Tyr Gly Thr Glu Phe Thr Leu Thr Ile Ser Ser Leu Gln Pro
65                  70                  75                  80

Glu Asp Phe Ala Thr Tyr Tyr Cys Gln His Leu Asp Ser Tyr Pro Leu
                85                  90                  95

Phe Thr Phe Gly Pro Gly Thr Lys Val Asp Ile Lys
            100                 105

<210> SEQ ID NO 46
<211> LENGTH: 469
<212> TYPE: PRT
<213> ORGANISM: Influenza A virus

<400> SEQUENCE: 46

Met Asn Pro Asn Gln Lys Ile Ile Thr Ile Gly Ser Val Cys Met Thr
1               5                   10                  15

Ile Gly Met Ala Asn Leu Ile Leu Gln Ile Gly Asn Ile Ile Ser Ile

```
                    20                  25                  30
Trp Ile Ser His Ser Ile Gln Leu Gly Asn Gln Asn Ile Glu Thr
            35                  40                  45
Cys Asn Gln Ser Val Ile Thr Tyr Glu Asn Asn Thr Trp Val Asn Gln
        50                  55                  60
Thr Tyr Val Asn Ile Ser Asn Thr Asn Phe Ala Ala Gly Gln Ser Val
65                  70                  75                  80
Val Ser Val Lys Leu Ala Gly Asn Ser Ser Leu Cys Pro Val Ser Gly
                85                  90                  95
Trp Ala Ile Tyr Ser Lys Asp Asn Ser Val Arg Ile Gly Ser Lys Gly
            100                 105                 110
Asp Val Phe Val Ile Arg Glu Pro Phe Ile Ser Cys Ser Pro Leu Glu
            115                 120                 125
Cys Arg Thr Phe Phe Leu Thr Gln Gly Ala Leu Leu Asn Asp Lys His
        130                 135                 140
Ser Asn Gly Thr Ile Lys Asp Arg Ser Pro Tyr Arg Thr Leu Met Ser
145                 150                 155                 160
Cys Pro Ile Gly Glu Val Pro Ser Pro Tyr Asn Ser Arg Phe Glu Ser
                165                 170                 175
Val Ala Trp Ser Ala Ser Ala Cys His Asp Gly Ile Asn Trp Leu Thr
            180                 185                 190
Ile Gly Ile Ser Gly Pro Asp Asn Gly Ala Val Ala Val Leu Lys Tyr
            195                 200                 205
Asn Gly Ile Ile Thr Asp Thr Ile Lys Ser Trp Arg Asn Asn Ile Leu
        210                 215                 220
Arg Thr Gln Glu Ser Glu Cys Ala Cys Val Asn Gly Ser Cys Phe Thr
225                 230                 235                 240
Val Met Thr Asp Gly Pro Ser Asn Gly Gln Ala Ser Tyr Lys Ile Phe
                245                 250                 255
Arg Ile Glu Lys Gly Lys Ile Val Lys Ser Val Glu Met Asn Ala Pro
            260                 265                 270
Asn Tyr His Tyr Glu Glu Cys Ser Cys Tyr Pro Asp Ser Ser Glu Ile
            275                 280                 285
Thr Cys Val Cys Arg Asp Asn Trp His Gly Ser Asn Arg Pro Trp Val
        290                 295                 300
Ser Phe Asn Gln Asn Leu Glu Tyr Gln Ile Gly Tyr Ile Cys Ser Gly
305                 310                 315                 320
Ile Phe Gly Asp Asn Pro Arg Pro Asn Asp Lys Thr Gly Ser Cys Gly
                325                 330                 335
Pro Val Ser Ser Asn Gly Ala Asn Gly Val Lys Gly Phe Ser Phe Lys
            340                 345                 350
Tyr Gly Asn Gly Val Trp Ile Gly Arg Thr Lys Ser Ile Ser Ser Arg
            355                 360                 365
Asn Gly Phe Glu Met Ile Trp Asp Pro Asn Gly Trp Thr Gly Thr Asp
        370                 375                 380
Asn Asn Phe Ser Ile Lys Gln Asp Ile Val Gly Ile Asn Glu Trp Ser
385                 390                 395                 400
Gly Tyr Ser Gly Ser Phe Val Gln His Pro Glu Leu Thr Gly Leu Asp
                405                 410                 415
Cys Ile Arg Pro Cys Phe Trp Val Glu Leu Ile Arg Gly Arg Pro Lys
            420                 425                 430
Glu Asn Thr Ile Trp Thr Ser Gly Ser Ser Ile Ser Phe Cys Gly Val
            435                 440                 445
```

Asn Ser Asp Thr Val Gly Trp Ser Trp Pro Asp Gly Ala Glu Leu Pro
    450                 455                 460

Phe Thr Ile Asp Lys
465

<210> SEQ ID NO 47
<211> LENGTH: 391
<212> TYPE: DNA
<213> ORGANISM: Homo sapiens

<400> SEQUENCE: 47
gaggtgcagc tggtggagtc tgggggacgt gcgctacggc ctggggggtc cctgagactc        60
tcctgtgcag cctctggatt caagtttgat gattatgcca tgagctgggt ccgccaggtt       120
ccagggaagg gactggagtt tgtctctggt cttaattgga atggtgacat cacagcttat       180
acagactctg tgaagggccg attcactgtc tccagagaca acgccaagaa ctccctgtat       240
ctgcacatca acagtccgaa gcccgaggac acggccctct attattgtgc gagaactagc       300
tcatggggcg attatacaag agggcctgag ccaaagatta cctggtactt cgatctctgg       360
ggccggggca ctctggtcac cgtctcctca g                                      391

<210> SEQ ID NO 48
<211> LENGTH: 391
<212> TYPE: DNA
<213> ORGANISM: Homo sapiens

<400> SEQUENCE: 48
gaggtgcagc tggtggagtc tgggggacgt gtggtacggc cggggggatc cctgcgactc        60
tcctgtgcag cctctggatt caccttttgat gactatggca tgagctgggt ccgccaagct      120
ccagggaagg ggctggaatt tgtctctggt cttaactgga atggagatat cacagctttc       180
acagactctg tgaagggccg attcaccatc tccagagaca acgccaagag ctccctgtat       240
ctgcaaatga acagtctgag agccgacgac acggccttct attactgtgc gagagtgcgg       300
acgtggggcg agtatacaac aagagaggag ccaattcaca gctggtactt cgatctctgg       360
ggccgtggca ccctggtcac cgtctcctca g                                      391

<210> SEQ ID NO 49
<211> LENGTH: 391
<212> TYPE: DNA
<213> ORGANISM: Homo sapiens

<400> SEQUENCE: 49
gaggtgcagc tggtggagtc tgggggacgt gtggtacggc cggggggtc cctgagactc         60 tcctgtgccg cctctggatt cacgtttgat gattatggca tgagttgggt acgccaacct       120
ccagggaagg ggctggagtt tgtctctggt cttaactgga atggagatat cacagctttt       180
acagactctg tgaagggccg attcaccatc tccagagaca acgtcaagag ttccctgtat       240
ttgcaaatga acagtctgag agccgacgac acggccttct attactgtgc gagagtacgg       300
acatggggcg actatacaac aggagaggag ataatcaaca gctggtactt cgatctctgg       360
ggccgtggca ccctggtcac cgtctcctca g                                      391

<210> SEQ ID NO 50
<211> LENGTH: 325
<212> TYPE: DNA
<213> ORGANISM: Homo sapiens

```
<400> SEQUENCE: 50
gacatccagt tgacccagtc tccatccttc ctgtctgcat ctgtaggaga cagagtcacc      60
atcacttgcc gggccagtca ggacattagc agctatttag cctggtatca gcaaaaacca    120
gggaatgccc ctaagctcct gatctatgct gcatccwttt tgcaaagtgg ggtcccatca    180
aggttcagcg cctttggatc tgggacagaa ttcactctca caatcagcag cctgcagcct    240
gaagattttg caacttatta ctgtcaacac cttaagagtt accccctgtt cactttcggc    300
cctgggacca aagtggatat caaac                                          325

<210> SEQ ID NO 51
<211> LENGTH: 325
<212> TYPE: DNA
<213> ORGANISM: Homo sapiens

<400> SEQUENCE: 51
gacatccagt tgacccagtc tccatccttc ctgtctgcat ctgttggaga cagaataacc      60
atcacttgcc gggccagtca gggcattgat ggttatttag cctggtatca gcaaagacca    120
gggaaagccc ctaacctcct gatctatgct gcatcccttt tgcaaagtgg ggtcccatca    180
aggttcagcg gcagtggata tgggacagaa ttcactctca caatcagcag cctgcagcct    240
gaggactttg caacttatta ctgtcaacat cttgacagtt accccctgtt cactttcggc    300
cctgggacca aagtggatat caaac                                          325

<210> SEQ ID NO 52
<211> LENGTH: 325
<212> TYPE: DNA
<213> ORGANISM: Homo sapiens

<400> SEQUENCE: 52
gacatccagt tgacccagtc tccatccttc ctgtctgcat ctgtaggaga cagagtcacc      60
atcacttgcc gggccagtca ggacattagc agtttttag cctggtatca gcaaaaacca     120
gggaatgccc ctaaggtcct gatctatgct gcgtccwttt tgcagagtgg ggtcccatca    180
aggttcagcg gcagtggatc tgggacagat ttcactctca caatcagcag cctgcaacct    240
gaagatttcg caacttatta ctgtcaacag cttaatagtt accccctgtt cactttcggc    300
cctgggacca aagtggatat caaac                                          325
```